US012731475B2

(12) United States Patent
Thayer et al.

(10) Patent No.: US 12,731,475 B2
(45) Date of Patent: Sep. 8, 2026

(54) SECURITY SYSTEM APPLICATION

(71) Applicant: SimpliSafe, Inc., Boston, MA (US)

(72) Inventors: Jordan Thayer, Hopkinton, MA (US); Dan Sundell, Medford, MA (US); Charles Laurans, Brookline, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/830,658

(22) Filed: Sep. 11, 2024

(65) Prior Publication Data

US 2025/0095466 A1 Mar. 20, 2025

Related U.S. Application Data

(60) Provisional application No. 63/584,078, filed on Sep. 20, 2023.

(51) Int. Cl.

| | |
|---|---|
| ***G06F 3/0481*** | (2022.01) |
| ***G06F 3/04842*** | (2022.01) |
| ***G06F 3/0488*** | (2022.01) |
| ***G08B 13/196*** | (2006.01) |

(52) U.S. Cl.

CPC ..... *G08B 13/19682* (2013.01); *G06F 3/0481* (2013.01); *G06F 3/04842* (2013.01); *G06F 3/0488* (2013.01)

(58) Field of Classification Search

None

See application file for complete search history.

(56) References Cited

U.S. PATENT DOCUMENTS

| | | | | |
|---|---|---|---|---|
| 7,426,512 | B1 | 9/2008 | Ben-Natan | |
| 8,861,804 | B1 * | 10/2014 | Johnson | G06F 16/587 382/218 |
| 9,307,269 | B2 | 4/2016 | Martin et al. | |
| 9,448,704 | B1 * | 9/2016 | Belhumeur | G06F 16/532 |

(Continued)

FOREIGN PATENT DOCUMENTS

| | | | |
|---|---|---|---|
| CN | 105191331 | A | 12/2015 |
| CN | 107067504 | A | 8/2017 |

(Continued)

OTHER PUBLICATIONS

U.S. Appl. No. 18/926,893, filed Oct. 25, 2024 (158 pages).

(Continued)

*Primary Examiner* — Tuyetlien T Tran

(74) *Attorney, Agent, or Firm* — Secant IP, P.L.L.C.

(57) ABSTRACT

A method includes rendering, via a touchscreen, a graphical user interface comprising a first control configured to receive a selection of a location monitored by a first device and a second control configured to receive a selection of a setting to apply to a system. The system includes the first device and a second device. The second device is configured to communicate with the first device. The setting specifies a first mode of operation of the first device and a second mode of operation of the second device. The second mode of operation prohibits communication between the first and second devices. The method further includes receiving, via the touchscreen, the selection of the setting via the second control and applying the selection to the system to configure the first device to operate in a first mode and the second device to operate in the second mode.

15 Claims, 54 Drawing Sheets

(56) References Cited

U.S. PATENT DOCUMENTS

| | | | |
|---|---|---|---|
| 9,728,077 | B1 | 8/2017 | Fu et al. |
| 10,679,443 | B2 | 6/2020 | Grigorov et al. |
| 11,218,297 | B1 | 1/2022 | Hegg et al. |
| 11,403,413 | B2 | 8/2022 | Ojha et al. |
| 11,632,373 | B2 | 4/2023 | Parimi et al. |
| 12,118,864 | B2 | 10/2024 | Sundell et al. |
| 12,154,386 | B2 | 11/2024 | Gupta et al. |
| 12,293,132 | B2 | 5/2025 | Hirukawa |
| 12,300,080 | B2 | 5/2025 | Nalen et al. |
| 12,500,885 | B2 | 12/2025 | Hsu et al. |
| 2004/0024851 | A1 | 2/2004 | Naidoo et al. |
| 2006/0095539 | A1 | 5/2006 | Renkis |
| 2006/0155851 | A1 | 7/2006 | Ma et al. |
| 2006/0176167 | A1 | 8/2006 | Dohrmann |
| 2006/0209857 | A1 | 9/2006 | Hicks, III |
| 2008/0055423 | A1 | 3/2008 | Ying et al. |
| 2008/0284580 | A1 | 11/2008 | Babich et al. |
| 2008/0311879 | A1 | 12/2008 | Martin et al. |
| 2010/0245107 | A1* | 9/2010 | Fulker ...................... G08B 5/00 345/173 |
| 2011/0010761 | A1 | 1/2011 | Doyle |
| 2011/0090334 | A1 | 4/2011 | Hicks, III et al. |
| 2011/0131131 | A1 | 6/2011 | Griffin et al. |
| 2012/0001755 | A1 | 1/2012 | Conrady |
| 2013/0061309 | A1 | 3/2013 | Diaz-Cuellar et al. |
| 2013/0276061 | A1 | 10/2013 | Chebiyyam et al. |
| 2013/0282180 | A1 | 10/2013 | Layton |
| 2014/0250126 | A1 | 9/2014 | Baldwin et al. |
| 2014/0267716 | A1 | 9/2014 | Child et al. |
| 2015/0095352 | A1 | 4/2015 | Lacey |
| 2015/0156031 | A1 | 6/2015 | Fadell et al. |
| 2015/0312050 | A1 | 10/2015 | Warren |
| 2015/0339912 | A1 | 11/2015 | Farrand et al. |
| 2016/0191864 | A1 | 6/2016 | Siminoff et al. |
| 2016/0300465 | A1* | 10/2016 | Britton ............. G08B 13/19697 |
| 2016/0328894 | A1 | 11/2016 | Zhang |
| 2017/0003829 | A1 | 1/2017 | Wilde et al. |
| 2017/0018167 | A1 | 1/2017 | Dey et al. |
| 2017/0024408 | A1 | 1/2017 | Foley et al. |
| 2017/0070563 | A1 | 3/2017 | Sundermeyer et al. |
| 2017/0195625 | A1 | 7/2017 | Mahar et al. |
| 2017/0324624 | A1 | 11/2017 | Taine et al. |
| 2018/0018081 | A1 | 1/2018 | Dattilo-Green et al. |
| 2018/0124606 | A1 | 5/2018 | Macy et al. |
| 2018/0157835 | A1 | 6/2018 | Nos |
| 2019/0043326 | A1* | 2/2019 | Madden ................. H04N 7/185 |
| 2019/0245869 | A1 | 8/2019 | Dawes et al. |
| 2019/0286901 | A1 | 9/2019 | Blanco et al. |
| 2019/0378176 | A1 | 12/2019 | O'Brien |
| 2020/0090662 | A1 | 3/2020 | Castro et al. |
| 2020/0226416 | A1* | 7/2020 | Bapat ............... G08B 13/19645 |
| 2020/0304875 | A1 | 9/2020 | Krishnan et al. |
| 2020/0327315 | A1 | 10/2020 | Mullins |
| 2021/0037174 | A1 | 2/2021 | Meganathan et al. |
| 2021/0042527 | A1* | 2/2021 | Ton-That ............... G06V 10/82 |
| 2021/0165898 | A1 | 6/2021 | Weiss et al. |
| 2021/0165917 | A1 | 6/2021 | Yu et al. |
| 2021/0302052 | A1 | 9/2021 | Trinh |
| 2021/0329165 | A1 | 10/2021 | Liu et al. |
| 2021/0334399 | A1 | 10/2021 | Wright et al. |
| 2021/0377276 | A1 | 12/2021 | Dasari et al. |
| 2022/0027511 | A1 | 1/2022 | Watkins |
| 2022/0057815 | A1* | 2/2022 | Raz ..................... F41H 13/0081 |
| 2022/0114851 | A1 | 4/2022 | Carter |
| 2022/0157139 | A1* | 5/2022 | Subramany ...... G08B 13/19613 |
| 2022/0240058 | A1 | 7/2022 | Conner |
| 2022/0357801 | A1* | 11/2022 | Udall ..................... G06V 40/20 |
| 2022/0366727 | A1* | 11/2022 | Gupta .................... G06V 20/52 |
| 2022/0382840 | A1* | 12/2022 | Weston .................. G06V 40/30 |
| 2022/0417473 | A1 | 12/2022 | Davidson et al. |
| 2023/0114650 | A1* | 4/2023 | Keith, Jr. .............. G06F 21/316 726/7 |
| 2023/0214097 | A1 | 7/2023 | Pearson et al. |
| 2023/0316229 | A1 | 10/2023 | Lalwani et al. |
| 2024/0019984 | A1 | 1/2024 | Iwamoto |
| 2024/0256693 | A1 | 8/2024 | Wong et al. |
| 2024/0290196 | A1* | 8/2024 | Suzuki ................... G06V 20/52 |
| 2024/0395093 | A1 | 11/2024 | Ming et al. |
| 2025/0095371 | A1 | 3/2025 | Thayer et al. |

FOREIGN PATENT DOCUMENTS

| | | | |
|---|---|---|---|
| CN | 110910549 | A | 3/2020 |
| CN | 111985663 | A | 11/2020 |
| CN | 117238068 | A | 12/2023 |
| EP | 3422237 | A1 | 1/2019 |
| JP | 2009-098971 | A | 5/2009 |
| KR | 1841882 | B1 | 5/2018 |
| WO | WO2010008479 | A2 | 1/2010 |
| WO | WO2014072910 | A1 | 5/2014 |
| WO | WO2014144628 | A2 | 9/2014 |

OTHER PUBLICATIONS

IPCOM000191225D, Advanced Video Management Systems. 21 pages, Dec. 22, 2009. (Year: 2009).

Raty, Tomi, Johannes Oikarinen, Mikko Nieminen, and Mikko Lindholm. "Sensor data collection of the Single Location Surveillance Point System." In Seventh IEEE/ACIS International Conference on Computer and Information Science (icis 2008), pp. 382-387. IEEE, 2008. (Year: 2008).

Moustafa, Hassnaa, Eve M. Schooler, Gang Shen, and Sanjana Karnath. "Remote monitoring and medical devices control in eHealth." In 2016 IEEE 12th International Conference on Wireless and Mobile Computing, Networking and Communications (WiMob), pp. 1-8. IEEE, 2016. (Year: 2016).

Abrams et al., "Video Content Analysis with Effective Response", 2007 IEEE Conference on Technologies for Homeland Security, doi:10.1109/THS.2007.370020 (May 2007).

Onarlioglu, Kaan, Willam Robertson, and Engin Kirda. "Overhaul: Input-driven access control for better privacy on traditional operating systems." In 2016 46th Annual IEEE/IFIP International Conference on Dependable Systems and Networks (DSN), pp. 443-454. IEEE, 2016. (Year: 2016).

Stream, "SFU, MCU or P2P: What's the Difference Between These WebRTC Architectures?" Getstream.io, Inc. Sep. 9, 2022, https://getstream.io/blog/what-is-a-selective-forwarding-unit-in-webrtc/ (Retrived Apr. 25, 2025).

U.S. Appl. No. 18/987,603, filed Dec. 19, 2024, (79 pages).

* cited by examiner

FIG. 1

SECURITY SYSTEM APPLICATION

CROSS REFERENCE TO RELATED APPLICATIONS

This application claims the benefit of U.S. Provisional Patent Application 63/584,078 (filed 20 Sep. 2023), the entire disclosure of which is hereby incorporated herein by reference.

TECHNICAL FIELD

Aspects of the technologies described herein relate to graphical user interfaces and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques rendering, via a touchscreen or other display device, a graphical user interface comprising a first control configured to receive a selection of a location monitored by a first device and a second control configured to receive a selection of a setting to apply to a system. The system includes the first device and a second device. The second device is configured to communicate with the first device. The setting specifies a first mode of operation of the first device and a second mode of operation of the second device. The second mode of operation prohibits communication between the first and second devices. The method further includes receiving, via the touchscreen, the selection of the setting via the second control and applying the selection to the system to configure the first device to operate in a first mode and the second device to operate in the second mode. Systems and computer readable media housing instructions to perform the process summarized above are also contemplated.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 1 is a schematic diagram of a security system, according to some examples described herein.

DETAILED DESCRIPTION

Figures 2, 3:
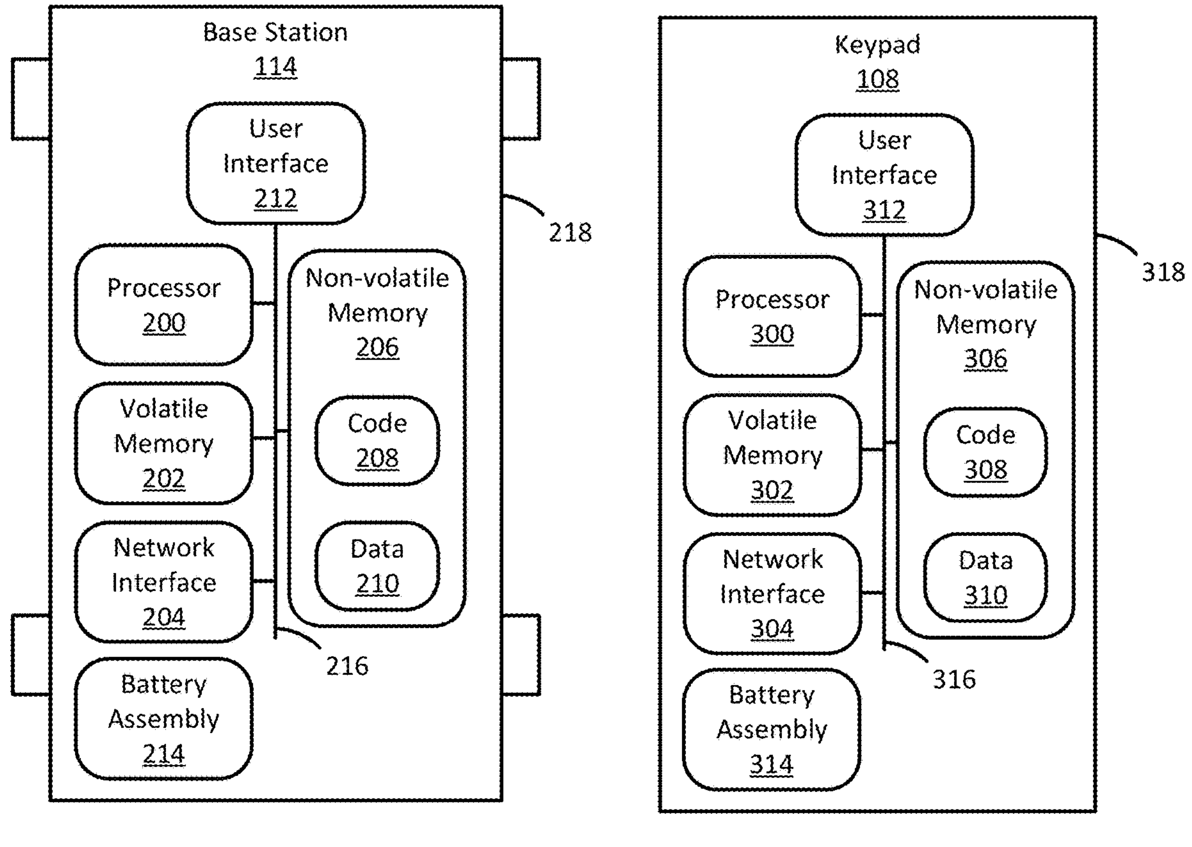
FIG. 2 is a schematic diagram of a base station, according to some examples described herein.
FIG. 3 is a schematic diagram of a keypad, according to some examples described herein.

As summarized above, at least some examples disclosed herein are directed to systems configured to execute an "app" (e.g., a security application) that is specifically designed to efficiently utilize the constrained dimensions of touchscreen interfaces found in many mobile computing devices, such as smartphones, tablets, and laptop computers. In these examples, the app controls its host mobile computing device to render a graphical user interface (GUI) that includes a limited set of densely interconnected screens linked to effectuate particular workflows. The dense interconnection of the screens enables a user to navigate between any two screens with a minimal number of interactions, which is especially helpful given the limited space afforded by touchscreens within mobile computing devices. Additionally, the workflow focus manifest in the screens and links of the GUI help the app to collect information that increases the efficiency of the overall security system. For instance, in at least one example, the workflow facilitated by the app promotes collection of profile information that can be used to reduce false alarms. Reduction of false alarms provides a host of benefits, including decreased power consumption, decreased unnecessary escalations to security system personnel, decreased alarm fatigue, and increased customer satisfaction. In addition, some examples enable a user to quickly and easily control when, where, and how their locations are accessible to and monitored by monitoring personnel. This control of information flow and user privacy promotes customer satisfaction and efficient utilization of computing resources, both at customer locations and in the cloud.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Figure 1:
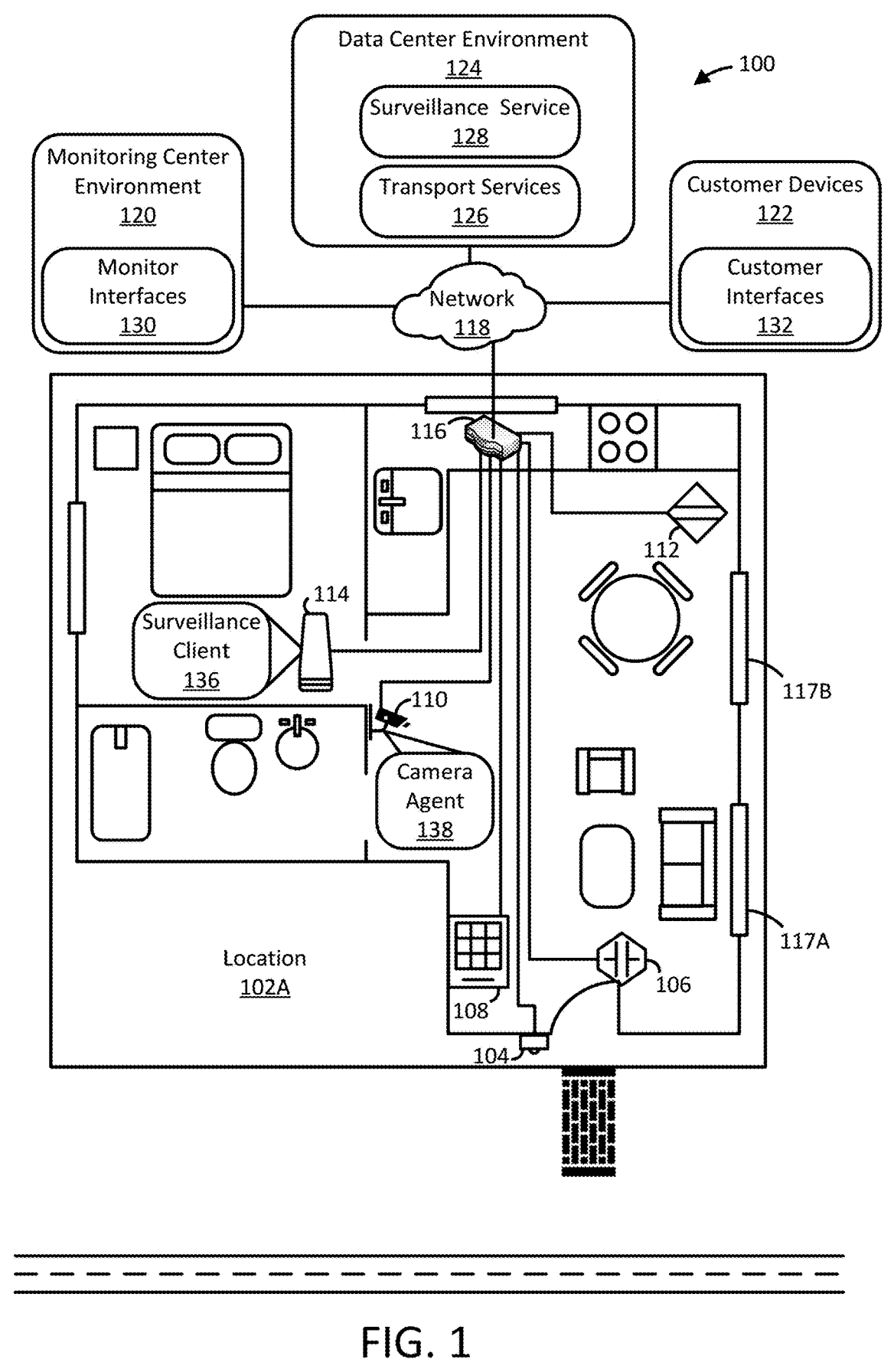

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 54). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. The image capture devices 104 and 110 can also acquire ambient sound, generate audio data based on the acquired sound, and communicate the audio data to the base station 114, the monitor interface 130, and/or the customer interfaces 132. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a hallway of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4A and 4B). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In other examples, the APIs can be implemented using a data query and manipulation language such as GraphQL. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, a 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
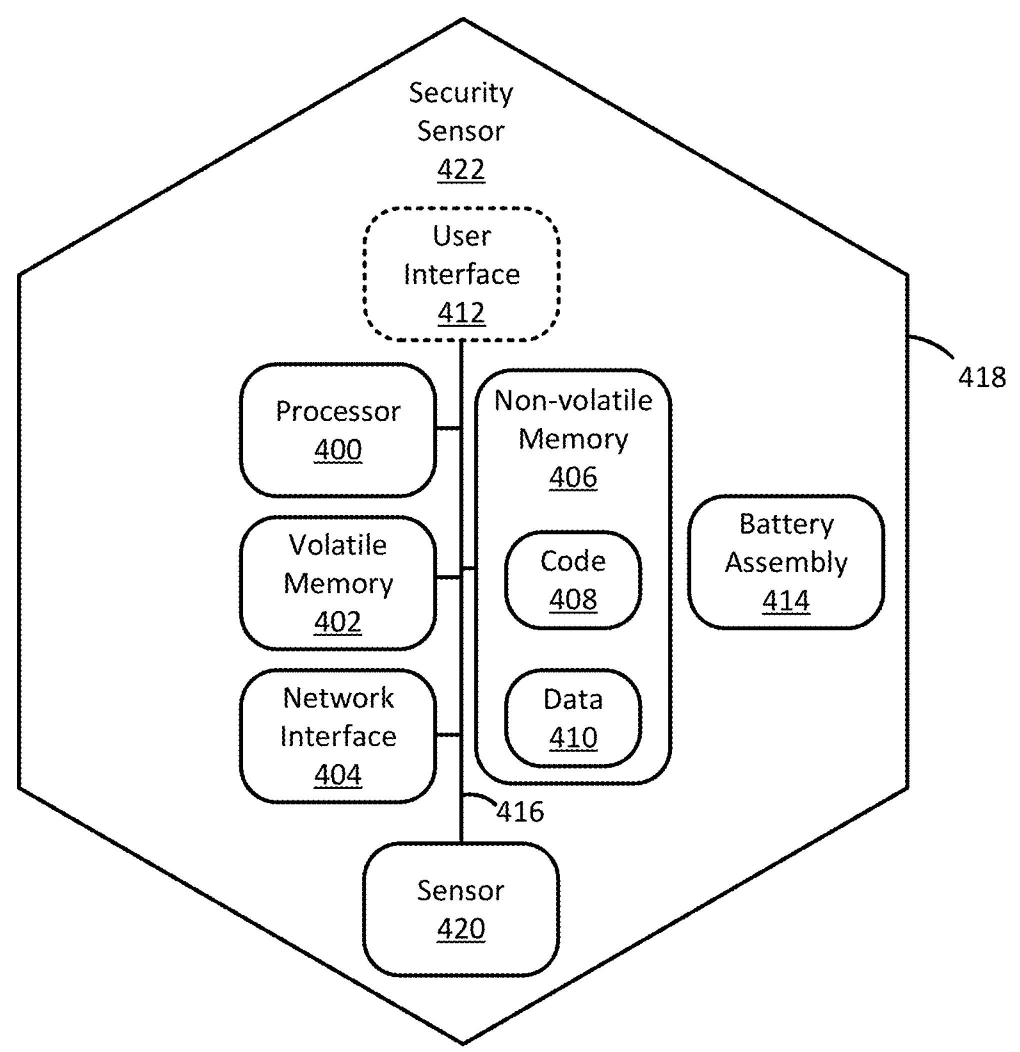
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
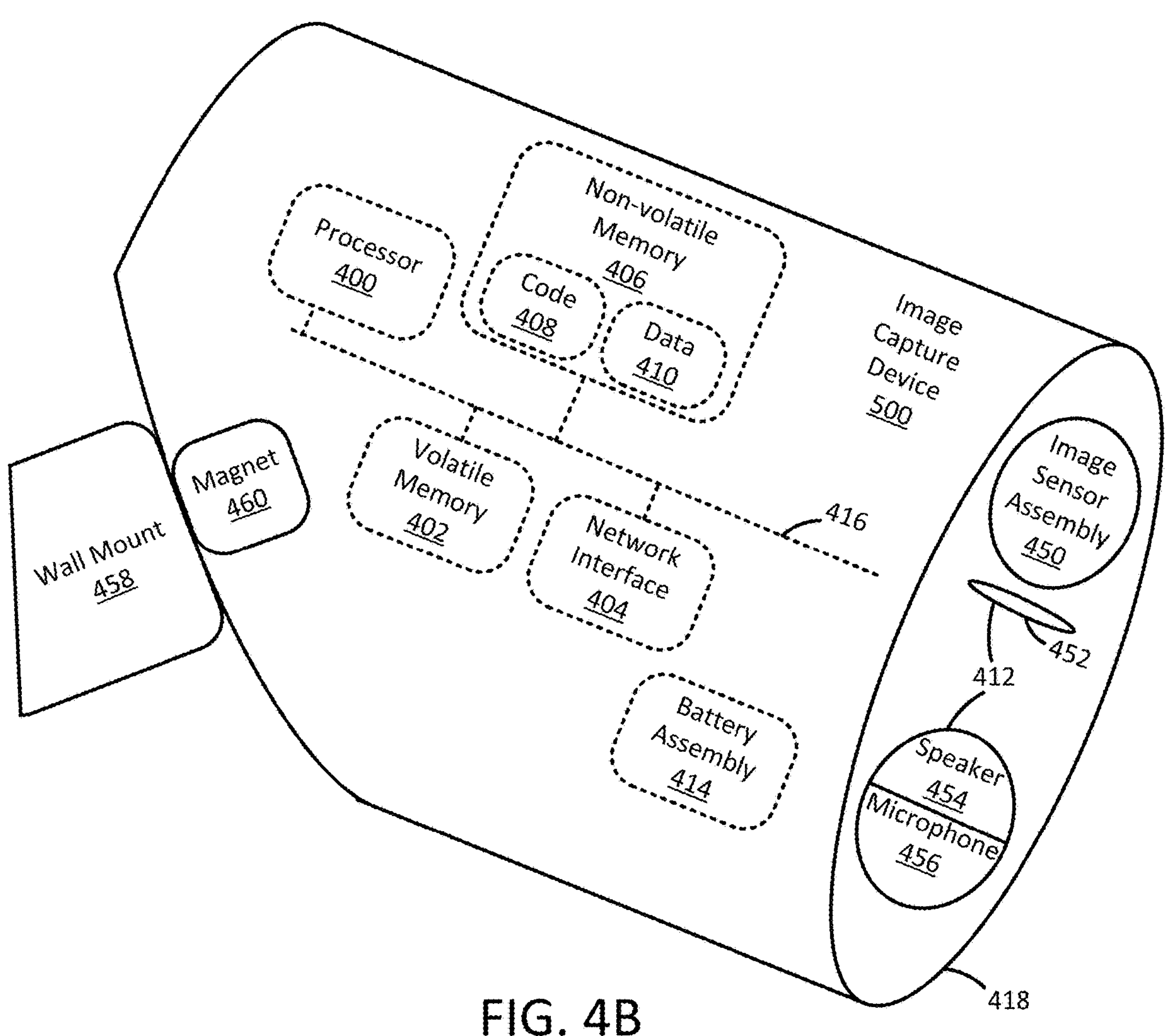
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be stream to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
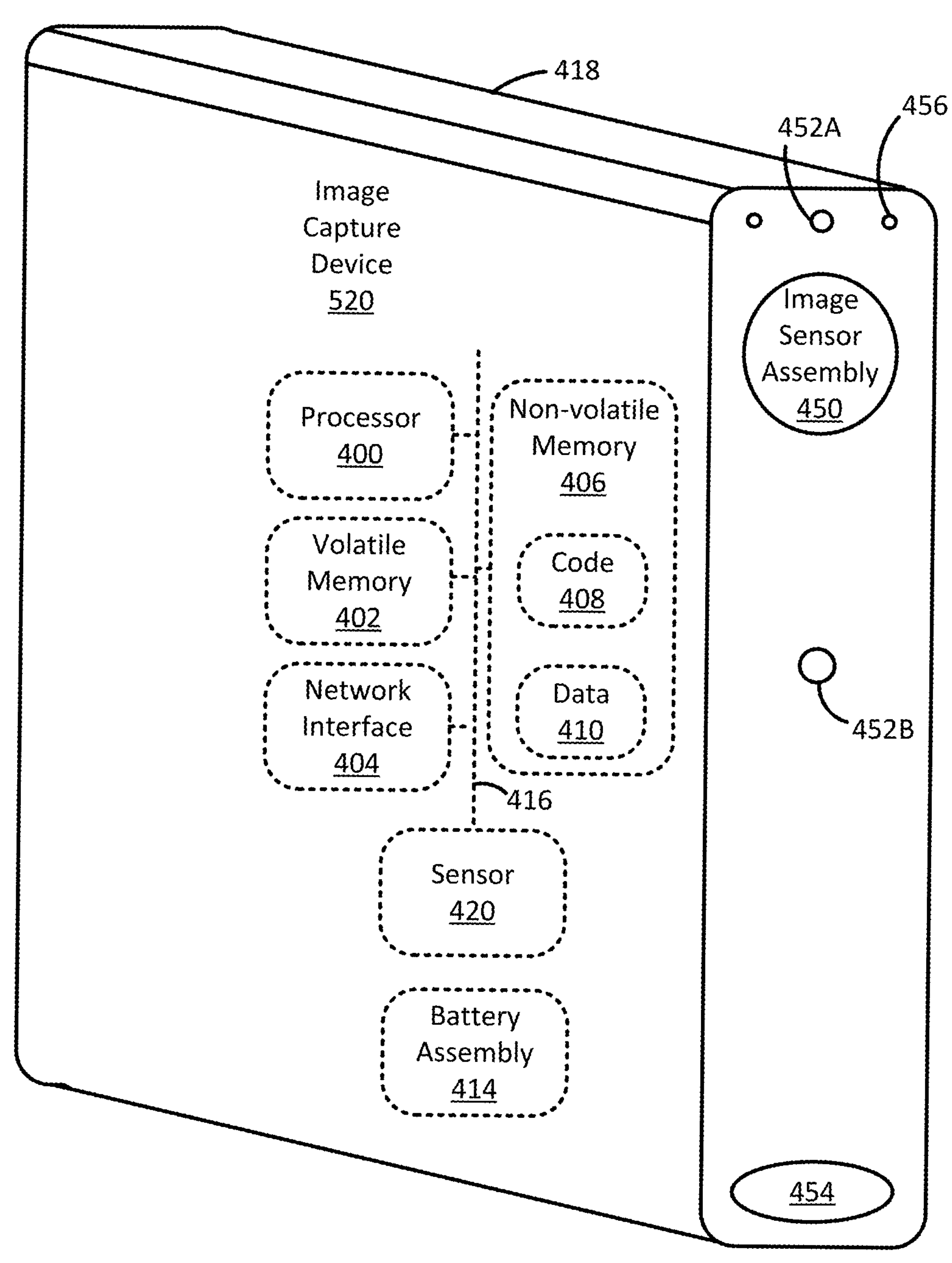
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
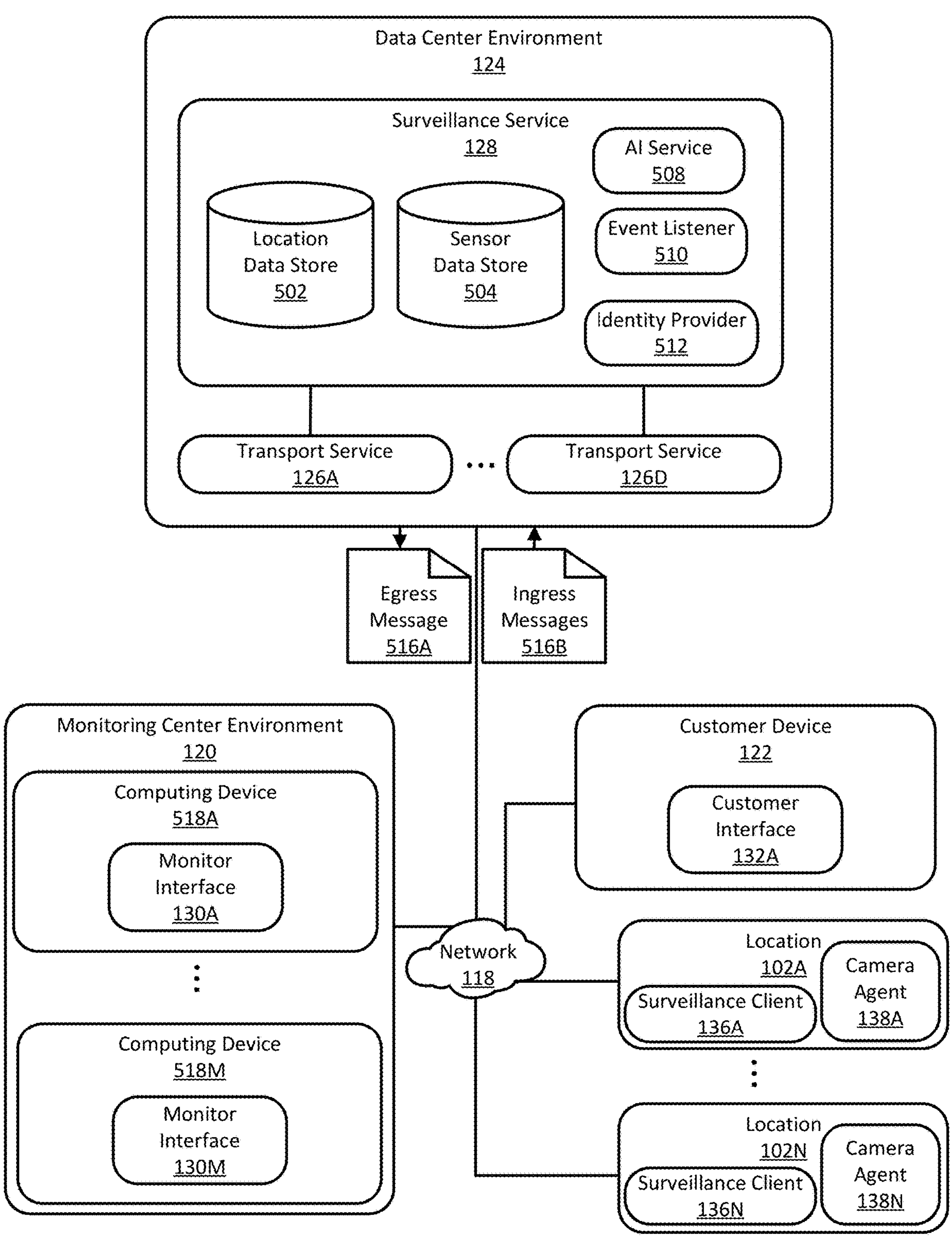
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
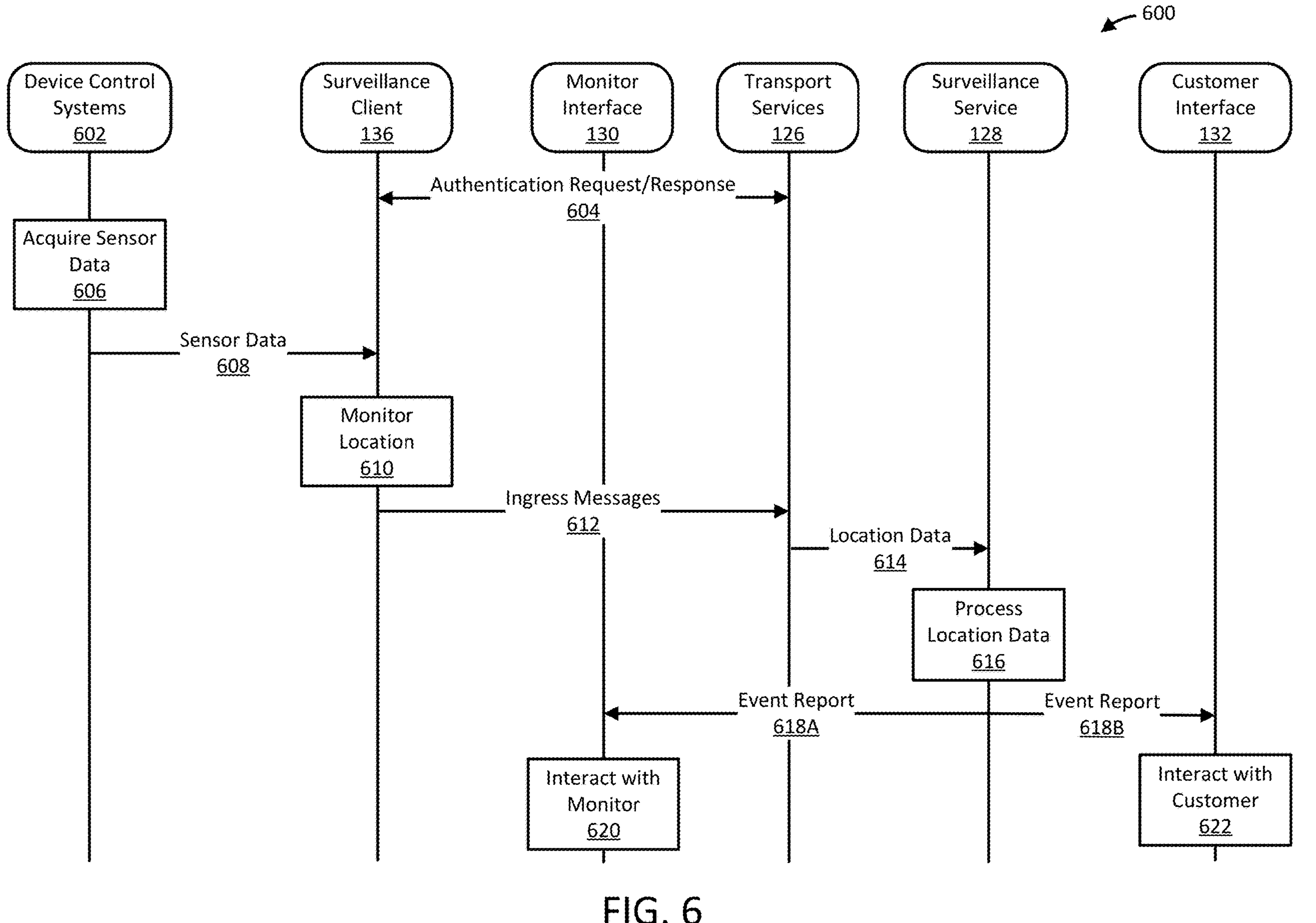
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the transport service 126 receives a security token from the identity provider and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If a threshold quantity of the three processes (such as one, two, or three) indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Some examples described herein are directed to an app that is specifically designed to efficiently utilize the constrained dimensions of touchscreen interfaces found in many mobile computing devices, such as smartphones, tablets, and laptop computers. In these examples, the app controls its host mobile computing device to render a graphical user interface (GUI) that includes a limited set of densely interconnected screens linked to effectuate particular workflows. The dense interconnection of the screens enables a user to navigate between any two screens with a minimal number of interactions, which is especially helpful given the limited space afforded by touchscreens within mobile computing devices. Additionally, the workflow focus manifests in the screens and links of the GUI help the app to collect information that increases the efficiency of the overall security system. For instance, in at least one example, the workflow facilitated by the app promotes collection of profile information that can be used to reduce false alarms. Reduction of false alarms provides a host of benefits, including decreased power consumption, decreased unnecessary escalations to security system personnel, decreased alarm fatigue, and increased customer satisfaction. In addition, some examples enable a user to quickly and easily control when, where, and how their locations are accessible to and monitored by monitoring personnel. This control of information flow and user privacy promotes customer satisfaction and efficient utilization of computing resources, both at customer locations and in the cloud.

FIGS. 7, 12, 14, 15, 17, 19, 21, 23, 25, 27, 28, 30, 33, 34, 36, 38, 40, 41, 43, 45, 47, and 49-52 collectively illustrate processes executed by a mobile computing device under control of an app (e.g., the customer interface 132 of FIG. 1) to interact with a user of a security system (e.g., the security system 100 of FIG. 1).

Figure 7:
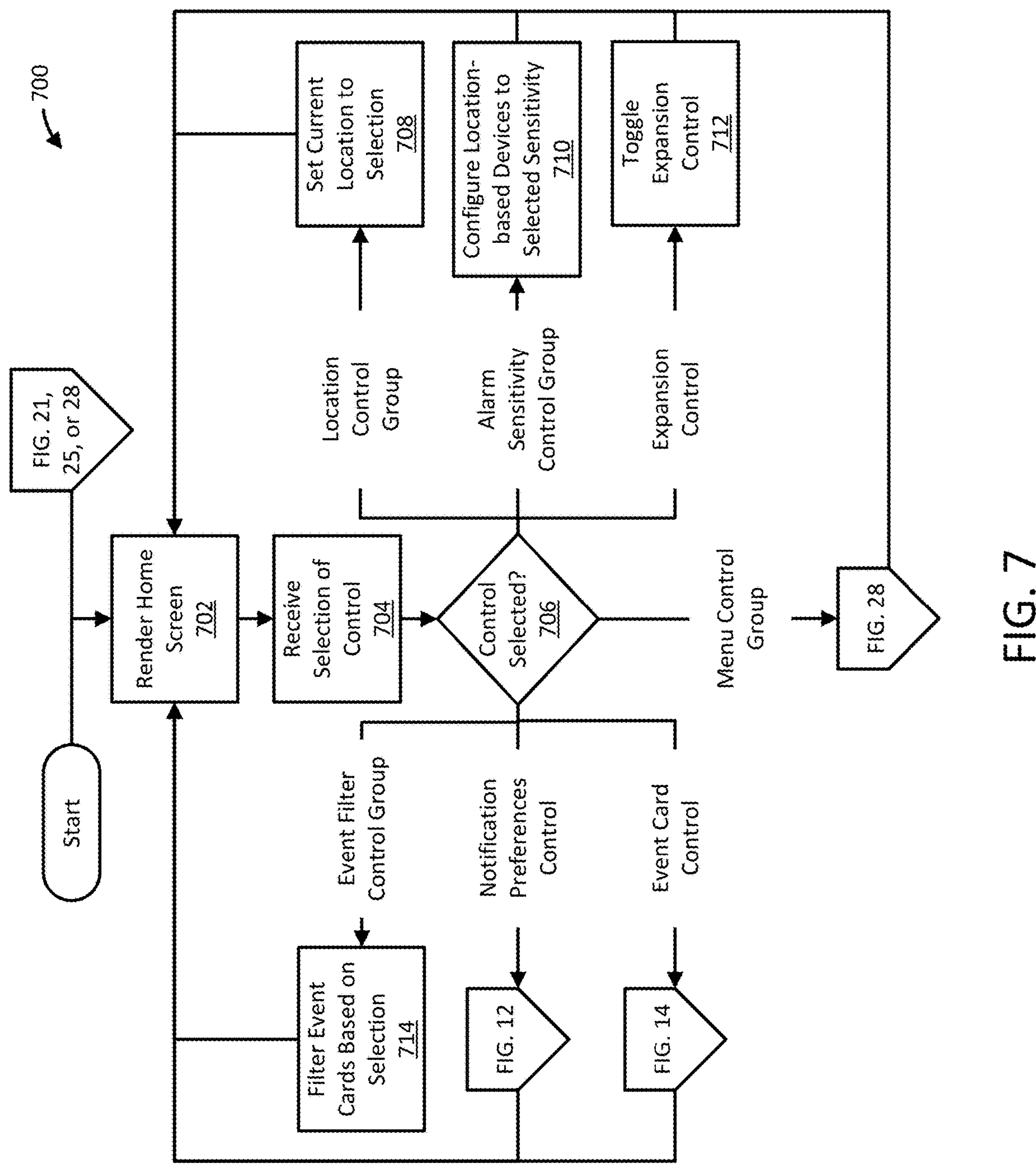
FIG. 7 is a flow diagram illustrating a home screen provisioning process, according to some examples described herein.
Figure 8:
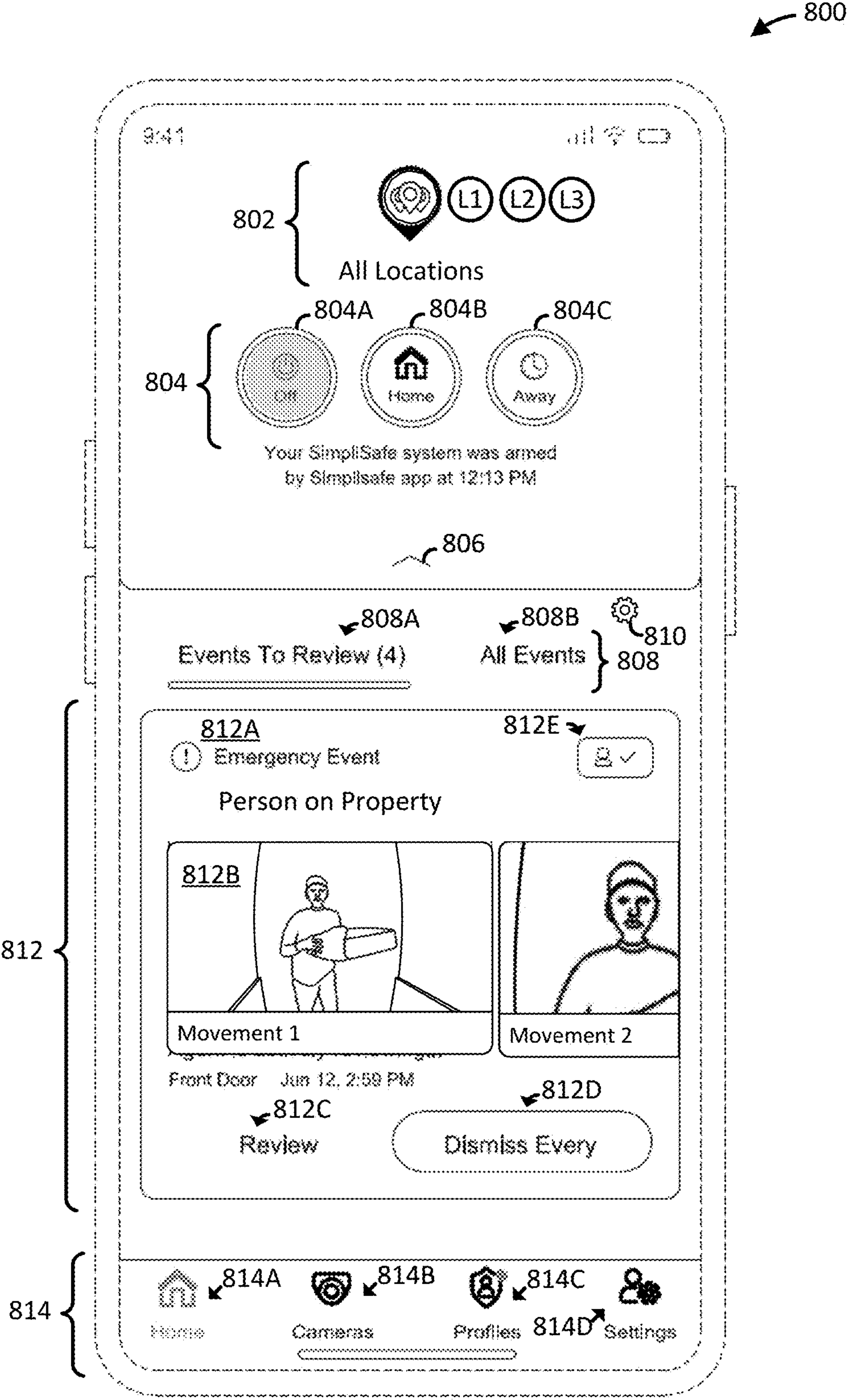
FIG. 8 is a front view of a home screen, according to some examples described herein.

As shown in FIG. 7, home screen provisioning process 700 starts with the app controlling a mobile computing device that hosts the app to render 702 a home screen via a touchscreen of the mobile computing device. FIG. 8 illustrates one example of a home screen 800 that can be rendered in some examples. As shown in FIG. 8, the home screen 800 includes a location control group 802, an alarm sensitivity control group 804, an expansion control 806, an event filter control group 808, a notification preference control 810, one or more event card controls 812, and a menu control group 814.

Figure 9:
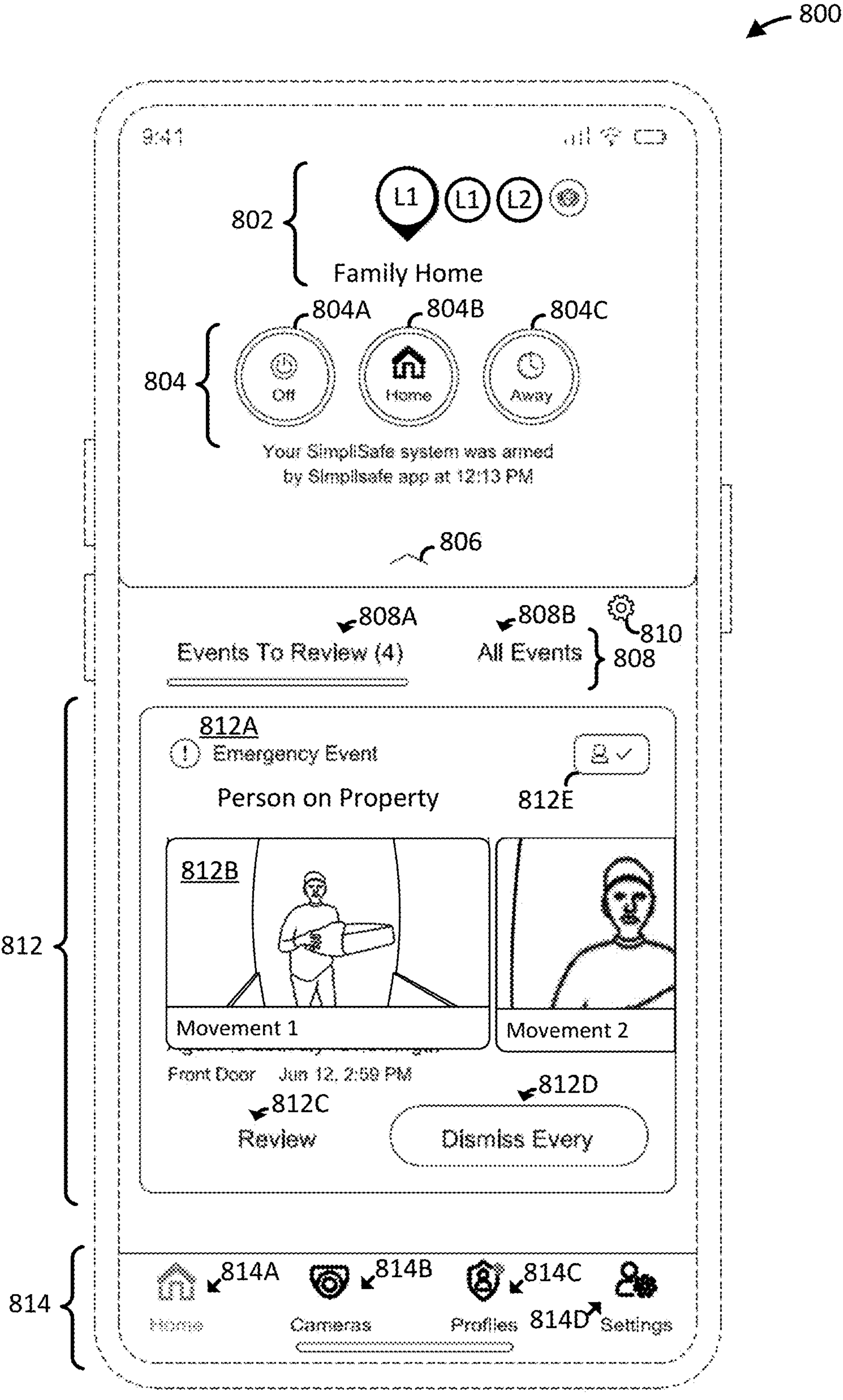
FIG. 9 is another front view of a home screen, according to some examples described herein.

In some examples, the user can select the location control group 802 to select a current location context for the home screen 800. As shown in FIG. 8, the current location context for the home screen 800 is set to all locations. FIG. 9 illustrates an example of the home screen 800 in which the current location context is set to location 1. In some examples, the app is configured to interact with the user via multiple selections within the location control group. For instance, in one example, upon detecting a first selection of the location control group 802, the app expands or otherwise adjusts the location control group 802 to reveal individual icons for individual configured locations belonging to the current user account. This approach enables a location to be selected with one additional motion (e.g., a tap) rather than requiring text entry or some other more complex selection method. Moreover, consolidation and expansion of less often used groups of controls allows the app to incorporate more controls within individual screens, thus decreasing the need for intra-screen navigation.

In some examples, the user can select a button of the alarm sensitivity control group 804 to initiate a change of alarm sensitivity for the location-based devices residing at the current location. As shown in FIG. 8, the alarm system status control group includes an off button 804A, a home button 804B, and an away button 804C. Individual buttons within the alarm sensitivity control group may be associated with a set of configurable data that specifies sensitivity settings for the location-based devices. For example, the off button 804A may be associated with a set of sensitivity settings that, when applied by the location-based devices, configure the location-based devices to not sound an alarm or otherwise report detected events (or even detect events in the first place, in some examples). Location-based devices configured in this manner may be referred to as being "disarmed". The away button 804C may be associated with a set of sensitivity settings that, when applied by the location-based devices, configure the location-based devices to sound an alarm or otherwise report detected events. Location-based devices configured in this manner may be referred to as being "armed". The home button 804B may be associated with a set of sensitivity settings that, when applied by the location-based devices, configure the location-based devices to sound an alarm or otherwise report detected events only where activity is detected by a subset of devices as to allow people to remain in the home without causing a false alarm (e.g., a glass break event, a window contact break event, etc.). Location-based devices configured via this set of settings may be armed or disarmed. In some examples, the app alters the appearance of selected and unselected buttons within the control group to indicate a currently selected button. For instance, as shown in FIG. 8, the off status button 804A is highlighted (e.g., shaded) and the other buttons 804B and 804C are not highlighted.

In some examples, the sensitivity settings associated with the individual buttons 804A-804C may further, when applied by a surveillance service (e.g., the surveillance service 128 of FIG. 1) and/or the location-based devices, configure the surveillance service and/or the location-based devices to prevent any access to the location-based devices via monitoring interfaces (e.g. the monitoring interfaces 130 of FIG. 1). For instance, in certain examples, the sensitivity settings associated with the off button 804A and the home button 804B, when applied by the surveillance service and the location-based devices, configure the surveillance service and the location-based devices to not forward any information to the monitoring interfaces. Application of these sensitivity setting may further prevent the monitoring interfaces from establishing connections to the location-based devices. Further, in some examples, the sensitivity settings associated with the away button 804C, when applied by the surveillance service and the location-based devices, configure the surveillance service and the location-based devices to forward information to the monitoring interfaces, provided that the user account associated with the location-based devices has been setup and configured for the security system to be monitored by monitoring personnel. Application of these sensitivity settings may further allow the monitoring interfaces to establish connections to the location-based devices.

Figure 10:
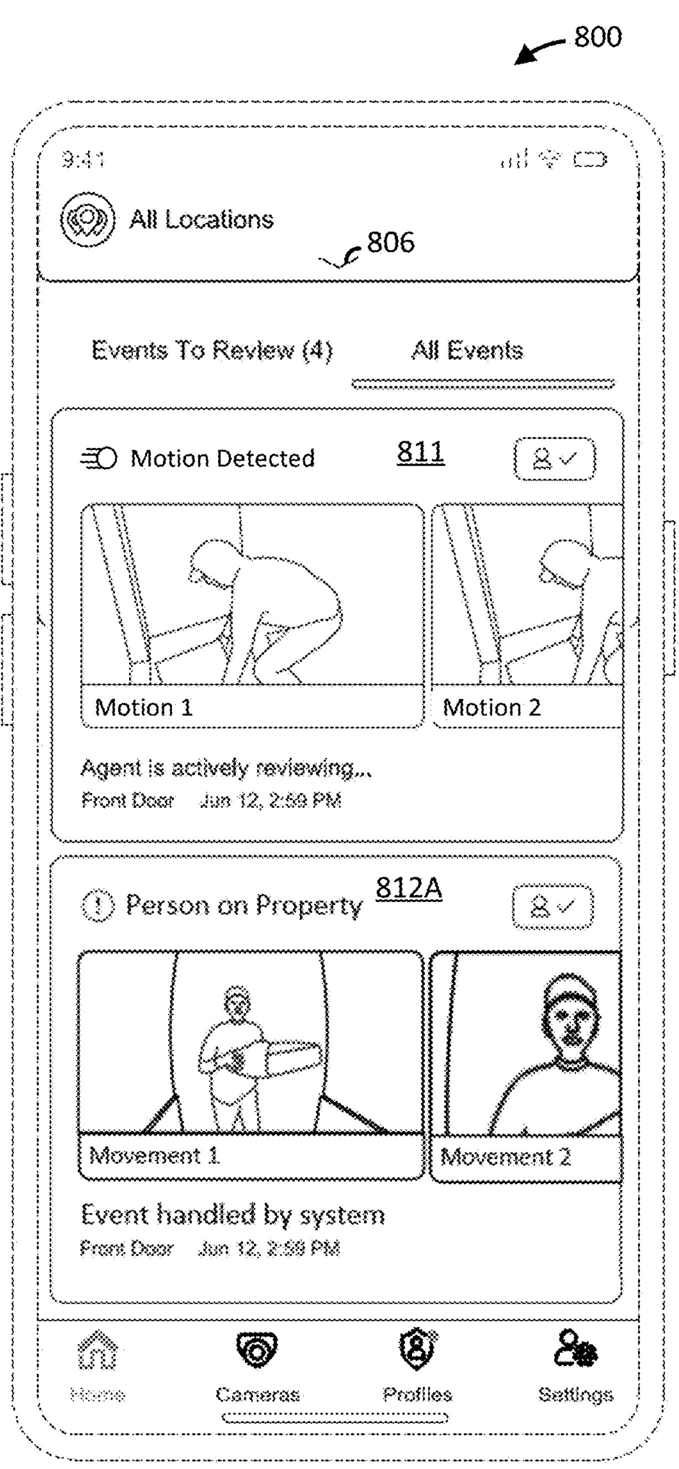
FIG. 10 is another front view of a home screen, according to some examples described herein.

In some examples, the user can select the expansion control 806 to adjust an amount of screen area devoted to the control groups 802 and 804. For instance, in the examples shown in FIGS. 8 and 9, the app visualizes the expansion control 806 as an upward or downward pointing chevron. As shown in FIG. 8, the expansion control 806 is in an expanded state as indicated by its presentation as an upward pointing chevron. As shown in FIG. 10, the expansion control 806 is in a compressed state as indicated by its presentation as a downward pointing chevron.

Figures 29A, 29B:
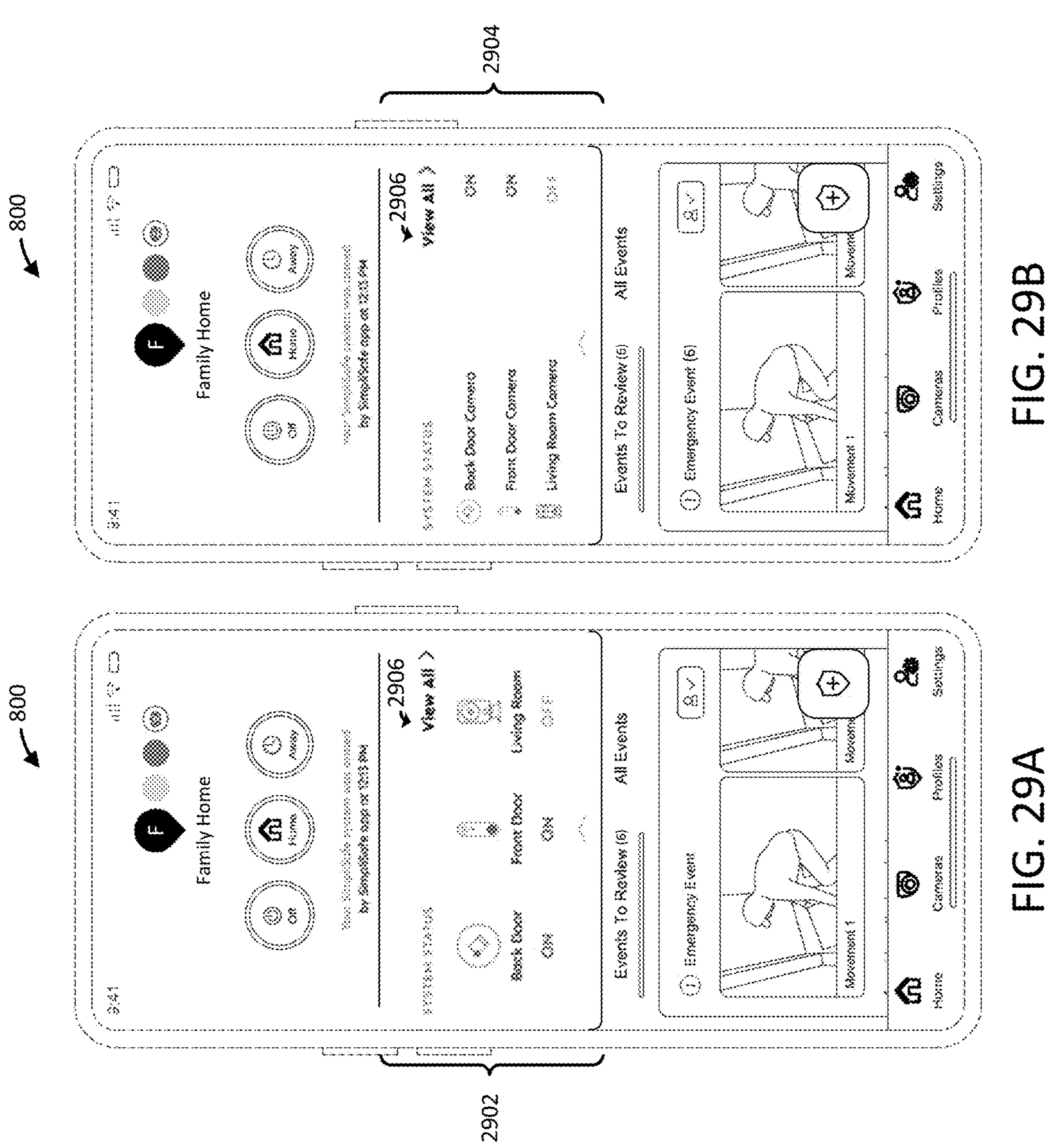
FIG. 29A is another front view of a home screen, according to some examples described herein.
FIG. 29B is another front view of a home screen, according to some examples described herein.
Figures 53A, 53B:
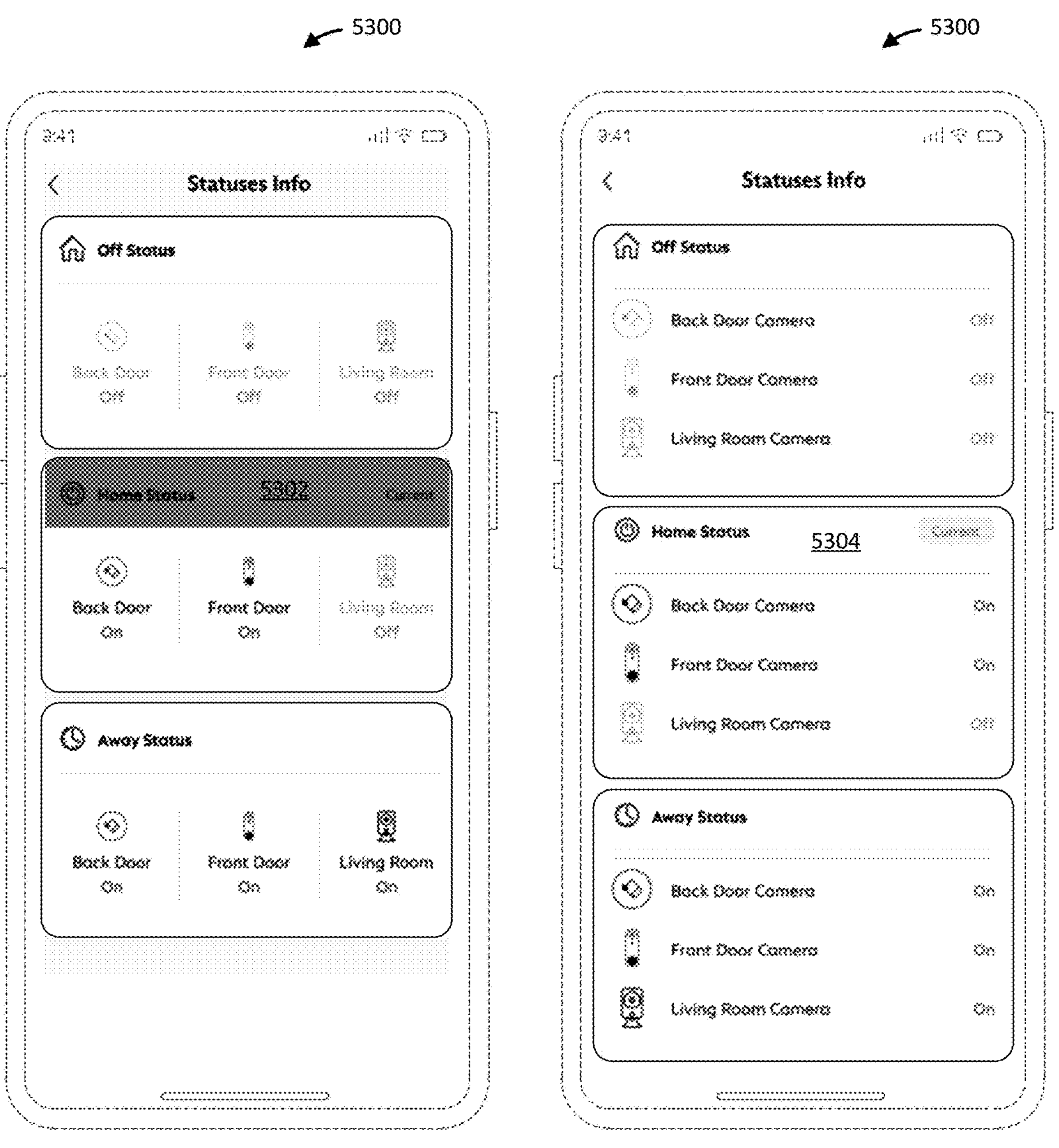
FIG. 53A is a front view of a sensitivity setting review screen, according to some examples described herein.
FIG. 53B is a front view of another sensitivity setting review screen, according to some examples described herein.

FIGS. 29A and 29B illustrate examples of the home screen 800 in which additional controls are included, within the expansion area devoted to the control groups 802 and 804, to indicate the effect of the current selection of the alarm sensitivity control group 804. As shown in FIG. 29A, the home screen 800 includes a status control group 2902 that indicates the status of individual devices under the current selection of the alarm sensitivity control group 804. FIG. 29B depicts another status control group 2904 that also indicates the status of individual devices under the current selection of the alarm sensitivity control group 804 but uses a different visualization. Both of the control groups 2902 and 2904 include a view all control 2906. The user can select the view all control 2906 to navigate to a screen that indicates the status of the location-based devices under individual selections of the alarm sensitivity control group 804. FIGS. 53A and 53B illustrate examples of such a screen 5300. As shown in FIGS. 53A and 53B, each example of the screen 5300 includes controls that indicate location-based device status by available alarm sensitivity control group 804 selections. In some examples, the app alters the appearance of controls within the screen 5300 to indicate the current selection of the alarm sensitivity control group 804. For instance, as shown in FIG. 53A, a home status control group 5302 is highlighted (e.g., shaded) and the other control groups are not highlighted. Likewise, as shown in FIG. 53B, a home status control group 5304 is highlighted (e.g., labeled "Current") and the other control groups are not highlighted.

Returning to the home screen 800 of FIG. 8, in some examples, the user can select a control of the event filter control group 808 to filter events to review that are reported from the current location. As shown in FIG. 8, the filter events control group includes an events-to-review control 808A and an all-events control 808B. In addition, in FIG. 8, the events to review control 808A is selected and, as a result, the app limits the one or more events card controls 812 displayed to a quantity, such as four or five, that have not yet been reviewed by the user. FIG. 10 illustrates another example of the home screen 800 in which the user has selected the all-events control 808B, and the app displays all events associated with the current location. In some examples, the app alters the appearance of selected and unselected controls within the control group to indicate a currently selected control. For instance, as shown in FIG. 8, the events to review control 808A is highlighted (e.g., underlined) and the all-events control 808B is not highlighted.

Figure 11:
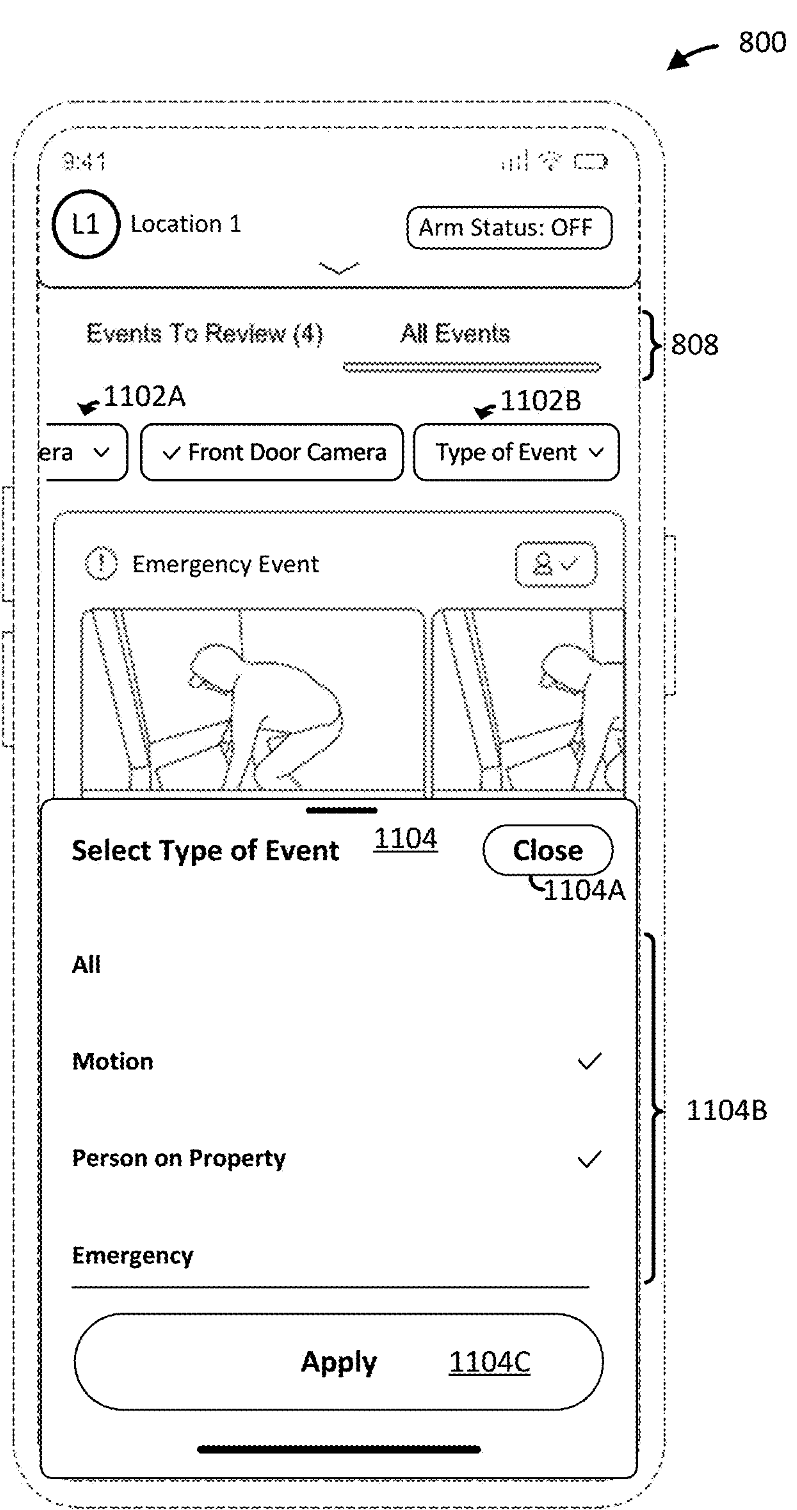
FIG. 11 is another front view of a home screen, according to some examples described herein.

FIG. 11 illustrates another example of the home screen 800 in which the app is configured to interact with the user via multiple selections initiated by selection of the all-events control 808B. As shown in FIG. 11, the all-events control 808B has been altered to include a camera filter control 1102A and an event type control 1102B. The additional filter controls 1102A and 1102B allow the user to narrow the event card controls displayed in the home screen to those associated with events having selected attributes. As is further shown in FIG. 11, the user has selected the "Front Door Camera" for the camera filter control 1102A, thereby indicating that events originating from the "Front Door Camera" are of interest. The user has further selected the event type control 1102B and, as a result, is prompted with the selection control group 1104. The selection control group 1104 includes a close button 1104A, a list of selectable event types 1104B, and an apply button 1104C. The list of selectable event types 1104B includes All, Motion, Person on Property, and Emergency items. The user may toggle selection of any of these items by tapping the item on the touchscreen. To save the currently selected items, and apply a filter based thereon, the user may select the apply button 1104C. To close the control group 1104, the user may select the close button 1104A. This list-based approach to item selection enables creation of helpful filters with a few gestures (e.g., taps) that may be performed with a single hand rather than requiring text entry or some other more complex selection method.

Referring back to FIG. 8, in some examples, the user can select the preferences control 810 to navigate to a notification preferences screen configured to interact with the user to establish or modify notification preferences. For instance, in some examples, the notification preferences screen includes controls configured to receive preferences regarding push notifications and/or email communications, such as whether to notify the user when a reportable event (e.g., an alarm) occurs, whether to push notifications through muted or silenced phone settings, and/or whether to notify the user when a malfunction of the security system occurs.

In some examples, the user can select a control of the one or more event card controls 812 to review, dismiss, or initiate other workflows involving an event reported from the current location and depicted within the selected event card control. As shown in FIG. 8, the Person on Property event card control 812A includes a thumbnail control 812B, a review button 812C, a dismiss button 812D, and an event handling status control 812E. The thumbnail control 812B includes an image of a person captured at the current location. In one implementation, tapping on a thumbnail control plays a recorded video associated with the event, while a performing a press-and-hold gesture prompts the user to create a profile associated with the person appearing in the thumbnail. The user can select the dismiss button 812D to remove the event card control 812A from the current rendering of the home screen 800 and to prevent future rendering of the event card control 812A via selection of the events to review control 808A. The user can select the review button 812C to navigate to an event details screen, such as the event details screen 1600 described further below with reference to FIG. 16. The event handling status control 812E indicates a current status of handling of the event by monitoring personnel. As shown in FIG. 8, the event handling status control 812E includes a checkmark indicating that the event has been handled by monitoring personnel. FIG. 10 illustrates the Person on Property event card control 812A subsequent to its review by the user. As shown in FIG. 10, the app displays the Person on Property event card control 812A along with the Motion Detected event card control 811 in response to selection of the all-events control 808B.

Figure 13:
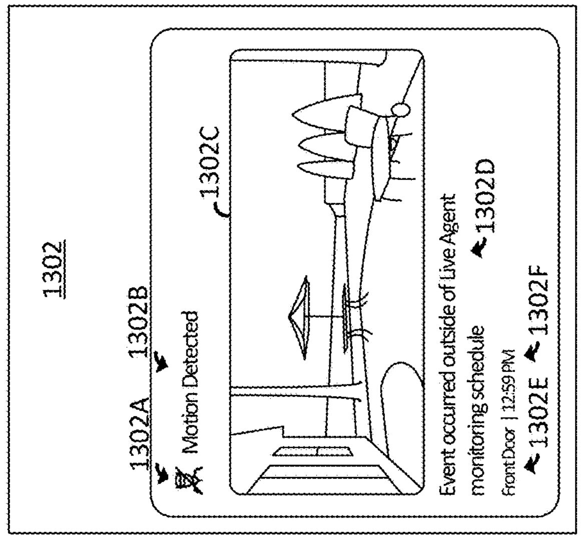
FIG. 13 is a front view of several event card controls, according to some examples described herein.
Figure 13:
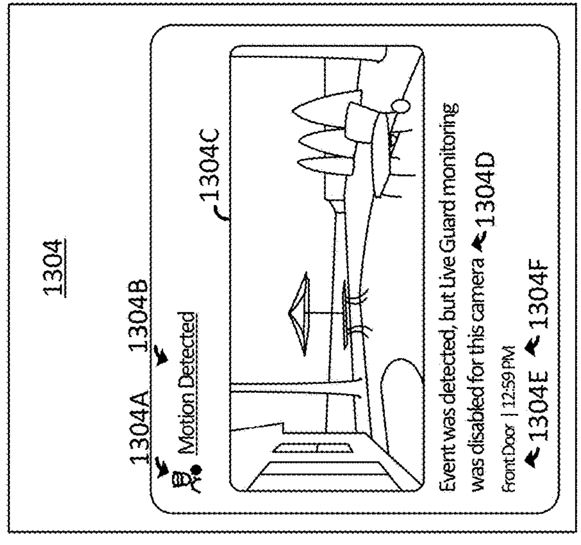
Figure 13:
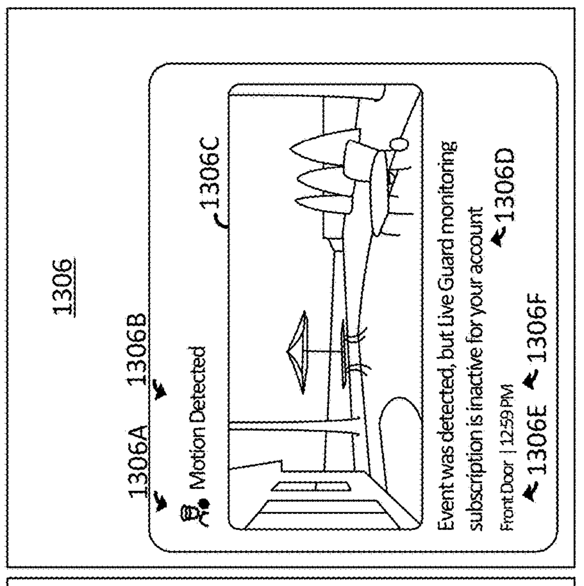
Figure 13:
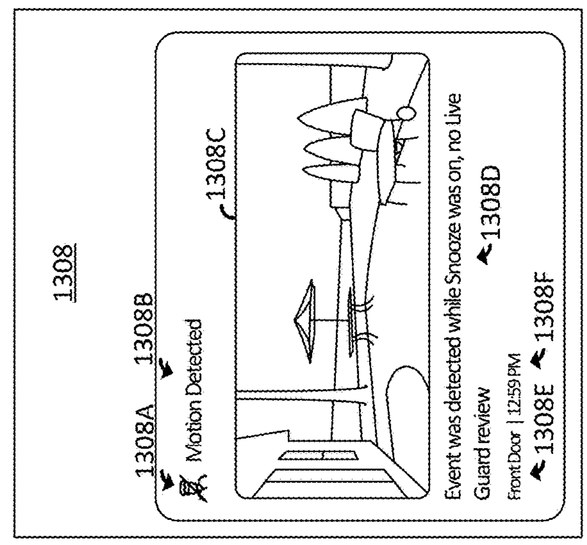
Figure 13:
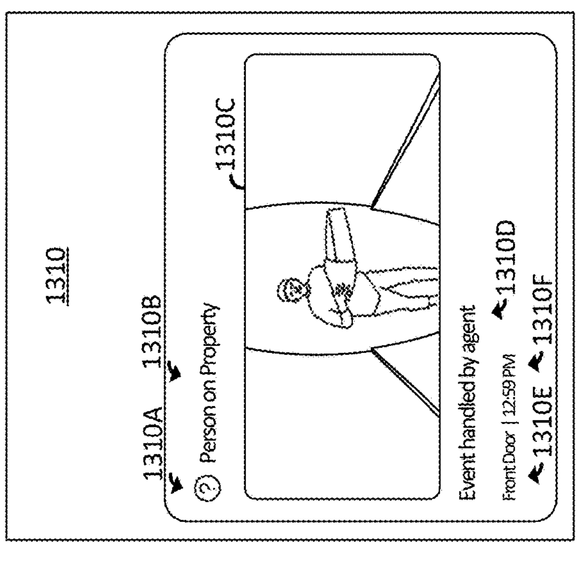

FIG. 13 illustrates other examples of event card controls 1302-1310 that may be used to display information regarding events associated with the controls in various examples. As shown in FIG. 13, the event card control 1302 includes an agent icon 1302A, an event type control 1302B, a thumbnail control 1302C, a description control 1302D, an originating device control 1302E and a timestamp control 1302F. Within the context of FIG. 13, agent icons indicate a level of involvement of monitoring personnel (e.g., via the monitoring interface 130 of FIG. 1) in handling the event associated with the event card control. In this example, the agent icon 1302A indicates that the event occurred outside of scheduled monitoring hours. Within the context of FIG. 13, event type controls indicate a type of event detected by a location-based device. In this example, the event type control 1302B indicates that a motion event was detected. Within the context of FIG. 13, thumbnail controls include an image representative of the detected event. In this example, the thumbnail control 1302C includes an image used to detect the motion event. Within the context of FIG. 13, description controls describe the level of involvement of monitoring personnel in handling the event and, in some examples, a reason for the level of involvement. In this example, the description control 1302D states that "Event occurred outside of Live Agent monitoring schedule". Within the context of FIG. 13, originating device controls indicate a location-based device that reported the event. In this example, the originating device control 1302E indicates that the event was detected by a device identified as "Front Door". Within the context of FIG. 13, timestamp controls indicate a time at which the event was detected. In this example, the timestamp control 1302F indicates that the event was detected at 12:59 p.m.

The remainder of the event card controls 1304-1310 illustrated in FIG. 13 include the same controls as the event card control 1302 with the following points of distinction. In the event card control 1304, the agent icon 1304A indicates that monitoring was disabled for the "Front Door" camera, and the description control 1304D recites "Event was detected, but Live Guard monitoring was disabled for this camera". In the event card control 1306, the agent icon 1306A indicates that no paid monitoring subscription exists for the currently authenticated user account, and the description control 1306D recites "Event was detected, but Live Guard monitoring subscription is inactive for your account". In the event card control 1308, the agent icon 1308A indicates that the event was detected while monitoring was disabled (e.g., via a snooze function), and the description control 1308D recites "Event was detected while Snooze was on, no Live Guard review". In the event card control 1310, the agent icon 1310A indicates that the event was detected while automatic face matching was disabled, and the description control 1310D recites "Event handled by agent".

Returning to the home screen 800 illustrated in FIG. 8, the user can select a button of the menu control group 814 to navigate to another screen within the GUI. As shown in FIG. 8, the menu control group includes a home button 814A, a cameras button 814B, a profiles button 814C, and a settings button 814D. The user can select the home button 814A to navigate to a home screen, such as the home screen 800. The user can select the cameras button 814B to navigate to a cameras screen, such as the cameras screen 3100 described further below with reference to FIG. 31. The user can select the profiles button 814C to navigate to a profiles screen, such as the profiles screen 3500 described further below with reference to FIG. 35. The user can select the settings button 814D to navigate to a settings screen, such as the settings screen 4800 described further below with reference to FIG. 48. In some examples, the app alters the appearance of selected and unselected buttons within the control group to indicate a currently selected button. For instance, as shown in FIG. 8, the home button 814A is highlighted (e.g., shaded) and the buttons 814B-814D are not highlighted.

Returning to the process 700 with reference to FIG. 7, the app receives 704 input selecting a control of the home screen 800. For instance, in some examples, the app receives a message from an operating system or other code (e.g., a runtime engine of a development platform, a virtual machine, etc.) executing on the mobile computing device.

The message may include information regarding an interaction between the touchscreen and a user. For instance, the message may specify a location, duration of contact(s), and any movement detected on the touchscreen. Alternatively or additionally, the message may specify an identifier of a control of the home screen and a type of selection (e.g., a tap, a double tap, a swipe, a long press, etc.).

Continuing with the process 700, the app determines 706 which control is selected by the input. For instance, in some examples, the app identifies the control of the home screen selected and the type of selection based on the received message. In some examples, the app makes this determination by identifying the location specified in the message as being within an area of the touchscreen occupied by the control and by classifying the selection type using the duration of contact(s) specified in the message. Alternatively or additionally, the app may make this determination by reading an identifier of the control and the type of selection from the message.

Continuing with the process 700, if the app determines that a location control group (e.g., the location control group 802 of FIG. 8) is selected, the app interacts with the user to set 708 the current location to a location specified by user input. For example, the location may be an individual location (e.g., the user's home, office, vacation home, etc.) or may be all locations associated with the user's account with the security system. In some examples, the operation 708 may involve rendering adjustments to the location control group to prompt the user for additional input specifying a particular location to be used as the current location and receipt of such input, as described above with reference to the location group control 802.

Continuing with the process 700, if the app determines that a button (e.g., one of the buttons 804A-804C of FIG. 8) of an alarm sensitivity control group (e.g., the alarm sensitivity control group 804 of FIG. 8) is selected, the app interoperates 710 with the security system to instruct the location-based devices residing at the current location and/or a surveillance service (e.g., the surveillance service 128 of FIG. 1) to apply a set of sensitivity settings associated with the selected button. The interoperation between the app and the location-based devices and/or the surveillance service may involve one or more messages communicated from the mobile computing device hosting the app to the one or more location-based devices. Alternatively or additionally the interoperation between the app and the location-based devices may involve cloud-based transport services (e.g., the transport services 126 of FIG. 1).

Continuing with the process 700, if the app determines that an expansion control (e.g., the expansion control 806 of FIG. 8) is selected, the app toggles 712 the state of the expansion control and controls the host mobile computing device to re-render the home screen.

Continuing with the process 700, if the app determines that a control (e.g., one of the controls 808A or 808B) of a filter control group (e.g. the filter control group 808 of FIG. 8) is selected, the app identifies 714 events that pass a filter associated with the selected control, generates event card controls (e.g., the one or more event card controls 812 of FIG. 8) for the events identified as passing, and controls the host mobile computing device to render the one or more generated event card controls. In some examples, to identify events that pass the filter, the app first determines the identity of the selected filter control. If the app determines that the all-events control is selected, the app identifies all events associated with the current location as passing the filter. If the app determines that the events for review control is selected, the app identifies, as passing the filter, events that have not been previously reviewed via operation of an event card control, as described further below with reference to FIG. 14.

In some examples, upon detecting a first selection of the all-events control 808B, the app expands or otherwise adjusts the all-events control 808B to reveal additional filter controls, such as the additional filter controls 1102 described above with reference to FIG. 11. Via these controls, the app prompts for and receives input specifying values of attributes (e.g., originating camera/device, event type, etc.) for filtering the events prior to generating and displaying event card controls. In some examples, the app can display additional GUI controls, such as the selection control group 1104, that are configured to prompt for and receive selections of attributes for the additional filter controls.

Figure 12:
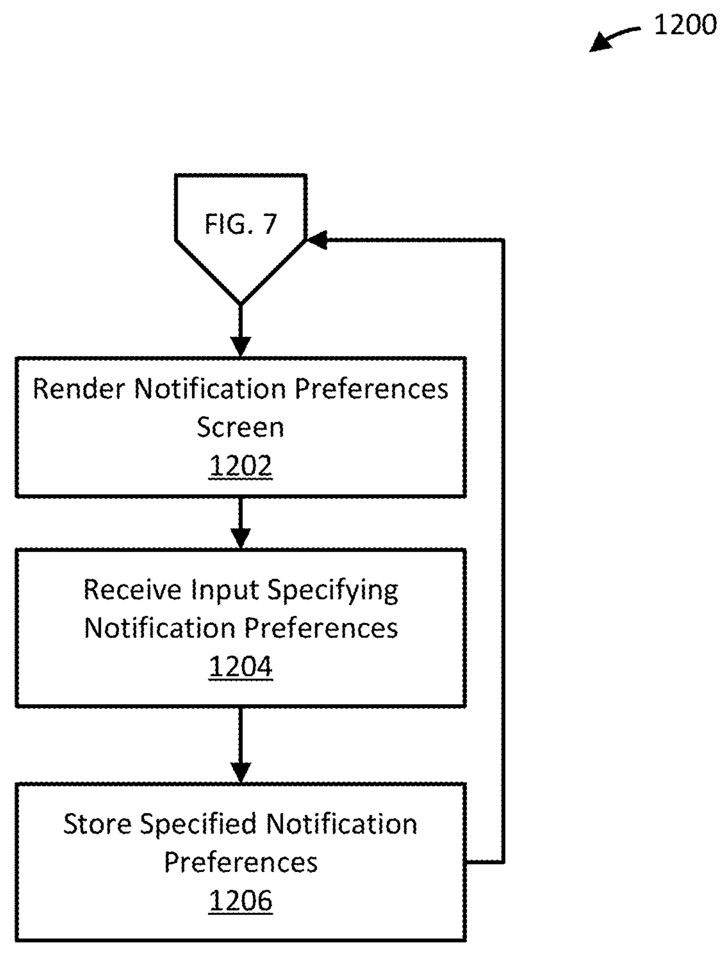
FIG. 12 is a flow diagram illustrating notification preferences configuration process, according to some examples described herein.

Continuing with the process 700, if the app determines that a notification preferences control (e.g., the notification preferences control 810 of FIG. 8) is selected, the app executes a configuration process to update notification preferences. FIG. 12 illustrates an example of such a process, configuration process 1200. As shown in FIG. 12, the process 1200 starts with the app controlling 1202 the host mobile computing device to render a notification preferences screen. This notification preferences screen may include, for example, controls configured to prompt for and receive notification configuration information. This notification configuration information may specify, for example, whether a user wishes to receive push notifications at all, whether to notify the user when a reportable event (e.g., an alarm) occurs, whether to push notifications through muted or silenced phone settings, and/or whether to notify the user when a malfunction of the security system occurs. Other examples of notification configuration information will be apparent with the benefit of this disclosure.

Continuing with the process 1200, the app receives 1204, via the controls, user input specifying the notification configuration information and stores 1206 the notification configuration information. It should be noted that, in some examples, the operation 1206 may include communication of the notification information to other parts (e.g., the surveillance service and/or the location-based devices) of the security system via one or more messages. These other parts of the security system may apply the notification configuration information to, for example, cease or start communication of push notifications to the host mobile computing device. Concluding the process 1200, the app resumes execution of the process 700.

Figure 14:
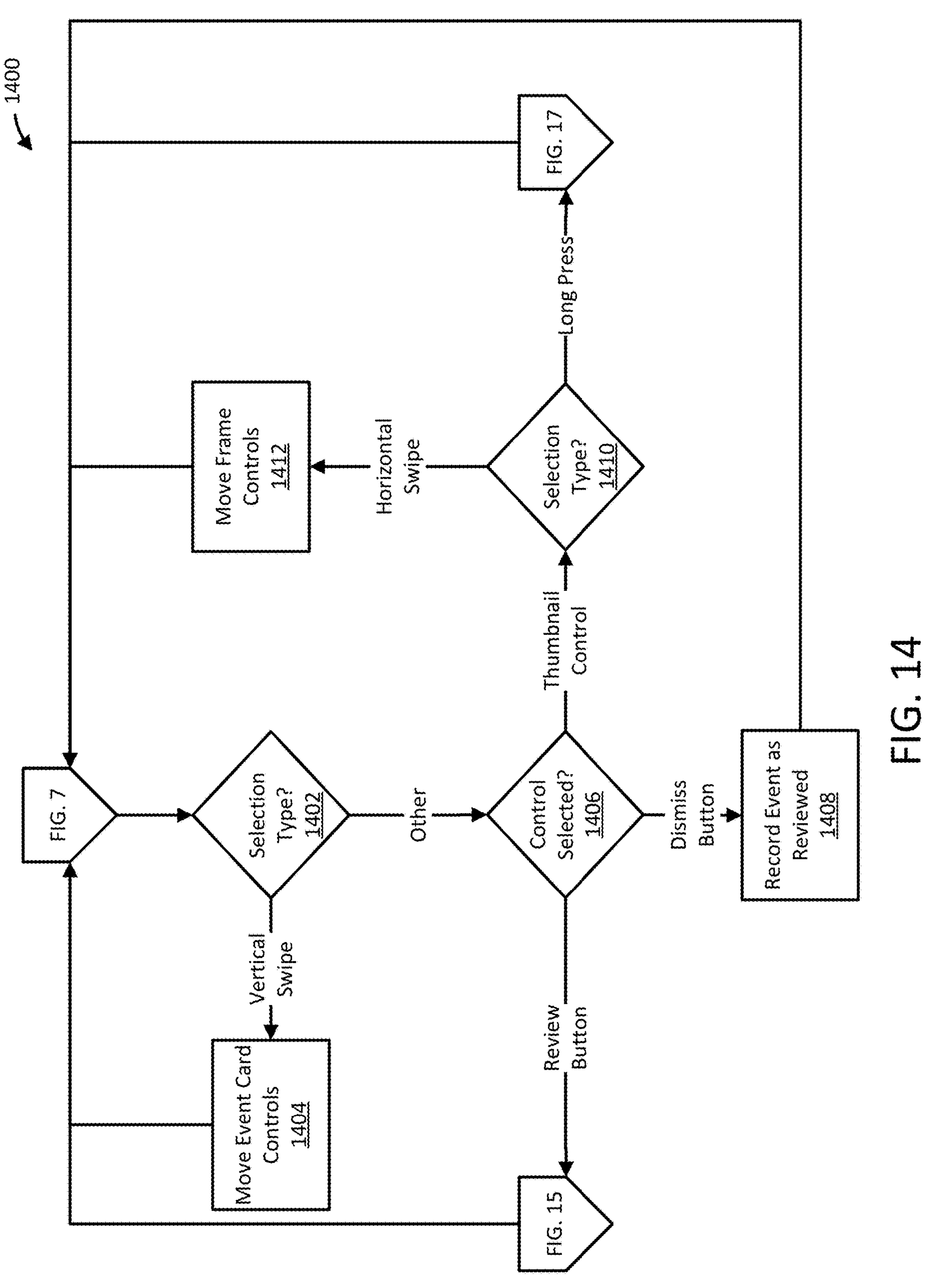
FIG. 14 is a flow diagram illustrating an event card selection handling process, according to some examples described herein.

Continuing with the process 700, if the app determines that an event card control (e.g., one of the event card controls 812 of FIG. 8) is selected, the app executes an event card handling process. FIG. 14 illustrates an example of such a process, event card handling process 1400. As shown in FIG. 14, the process 1400 starts with the app determining 1402 a type of selection detected for the event card control. For instance, in some examples, the app identifies the type of selection by executing the processing described above with reference to the operation 704 of FIG. 7. If the app determines that the event card control is swiped vertically (e.g., toward to top or the bottom of the home screen), the app moves 1404 the one or more event card controls in the direction of the swipe at a speed proportional to the speed of the swipe.

Continuing with the process 1400, the app determines 1406 which control (e.g., one of controls 812A-812D of FIG. 8) within the event card control is selected. For instance, in some examples, the app identifies the control within the event card control selected and the type of selection by executing the processing described above with reference to the operation 706 of FIG. 7.

Continuing with the process 1400, if the app determines that a dismiss button (e.g., the dismiss button 812D of FIG. 8) is selected, the app records 1408 (e.g., in a locally stored and/or remotely stored data structure) the event associated with the event card control as having a reviewed status.

Figure 15:
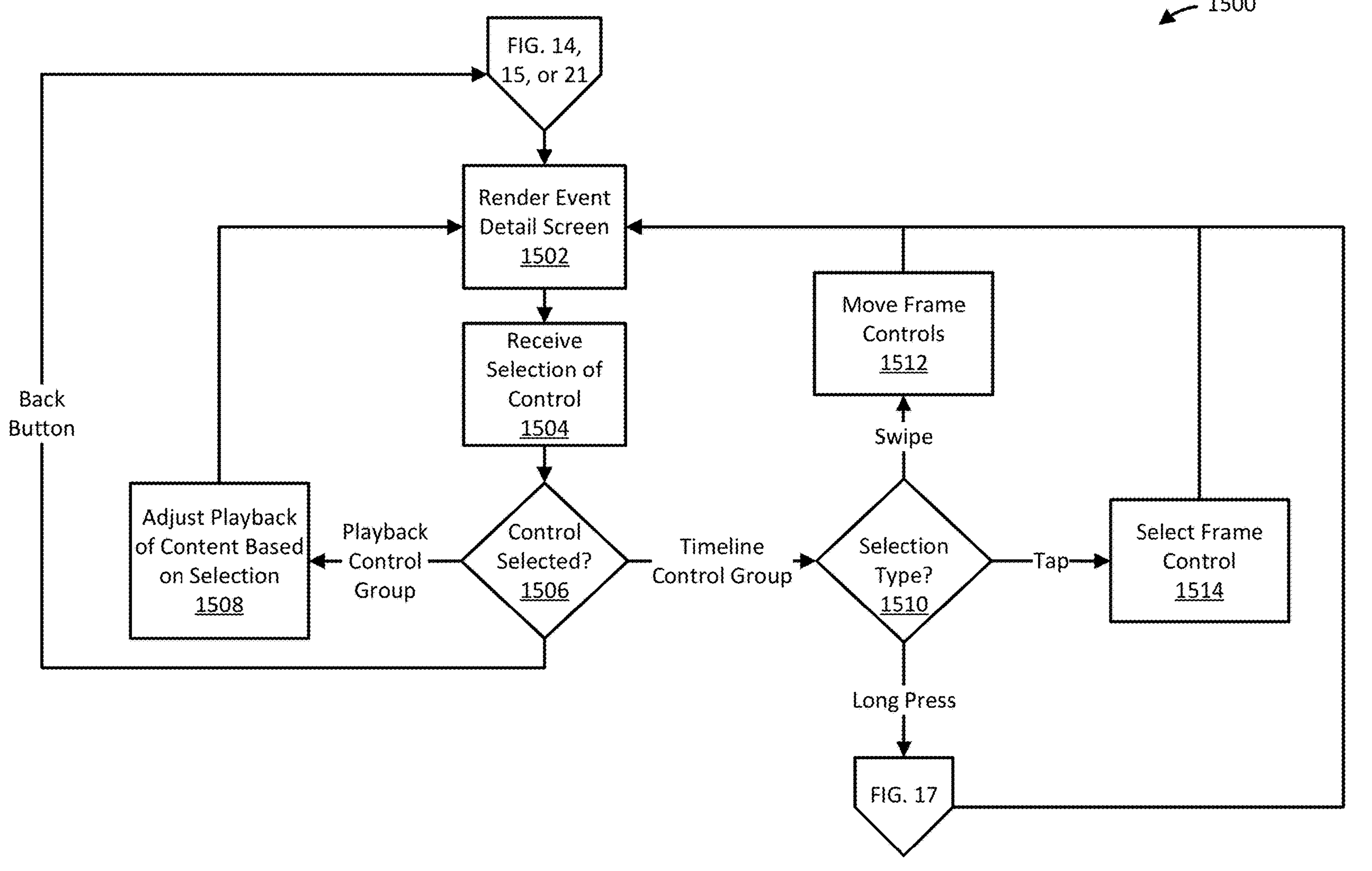
FIG. 15 is a flow diagram illustrating event review process, according to some examples described herein.
Figure 17:
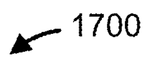
FIG. 17 is a flow diagram illustrating an add to profile process, according to some examples described herein.
Figure 17:
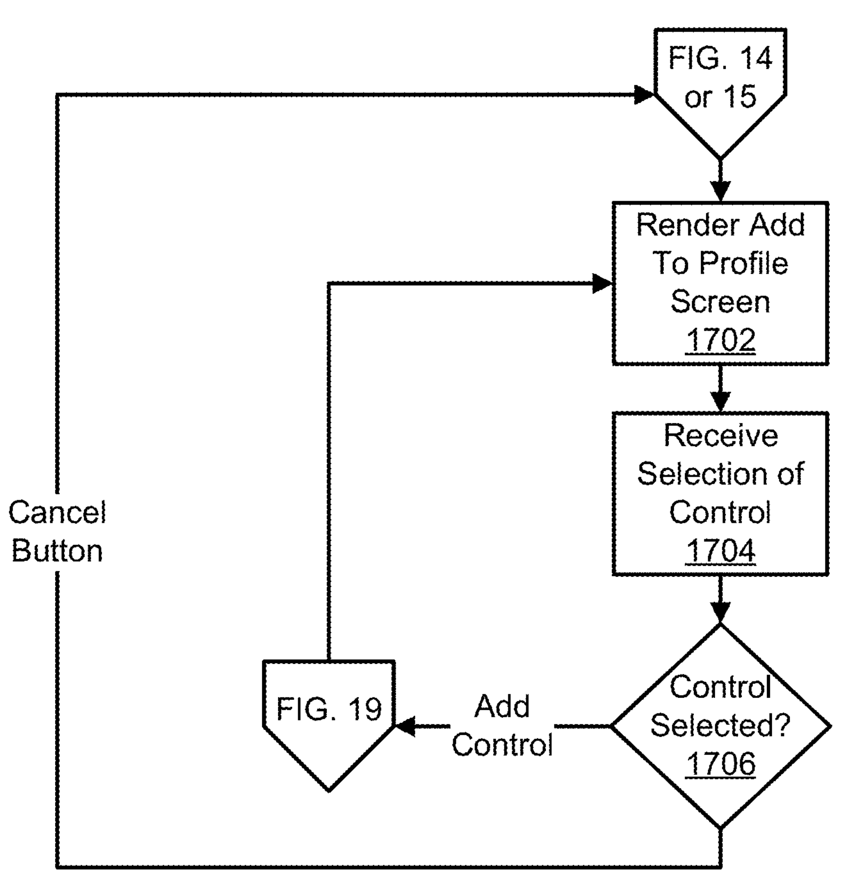

Continuing with the process 1400, if the app determines that a review button (e.g., the review button 812C of FIG. 8) is selected, the app executes an event review process. FIG. 15 illustrates an example of such a process, event review process 1500 and will be described further below. If the app determines 1406 that a thumbnail control (e.g., the thumbnail control 812B of FIG. 8) is selected, the app determines 1410 the type of selection of the thumbnail control. If the app determines that the thumbnail control is swiped horizontally (e.g. toward the left or the right of the home screen), the app moves 1412 the thumbnail control, and other thumbnail controls adjacent to the thumbnail control, in the direction of the swipe at a speed proportional to the speed of the swipe. If the app determines that the thumbnail control was long pressed (e.g., held for 500 milliseconds, 1000 milliseconds, 1500 milliseconds, 2000 milliseconds, or longer depending on the implementation of the app), the app executes an add to profile process. FIG. 17 illustrates an example of such a process, add to profile process 1700 as will be described further below.

Figure 16:
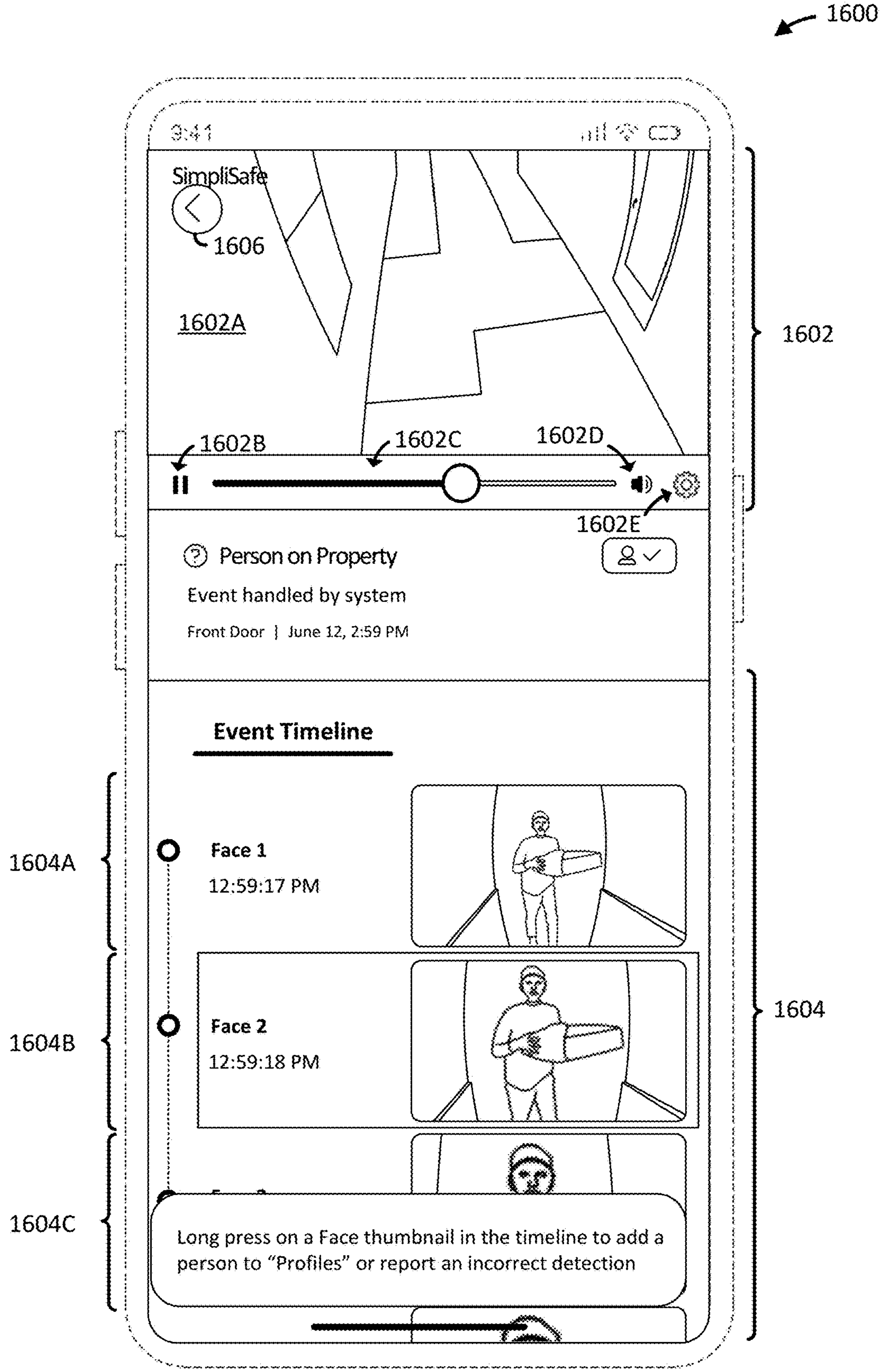
FIG. 16 is a front view of an event details screen, according to some examples described herein.

Turning now to FIG. 15, an example event review process 1500 is illustrated. As shown in FIG. 15, the process 1500 starts with the app controlling the host mobile computing device to render 1502 an event detail screen via the touchscreen. FIG. 16 illustrates one example of an event details screen 1600 that can be rendered in some examples. As shown in FIG. 16, the event details screen 1600 includes a playback control group 1602, a timeline control 1604, and a back button 1606. The user can select the back button 1606 to navigate to the previously rendered screen. The playback control group 1602 includes a display area control 1602A, a play button 1602B, a position slider 1602C, a mute button 1602D, and a configuration button 1602E. The timeline control group 1604 includes frame controls 1604A-1604C.

In some examples, the user can select a playback control within the playback control group 1602 to manipulate playback of content related to an event. For instance, in some examples, the user can select the play button 1602B to toggle between playing and pausing playback of the content within the display area control 1602A. The user can select (e.g., via a slow swipe/slide) the position slider 1602C to relocate the time index of playback of the content within the display area control 1602A. The user can select the mute button 1602D to toggle between muting and unmuting audio playback of the content. The user can select the configuration button 1602E to access playback configuration settings, such as playback rate, quality, etc.

In some examples, the user can select a frame control within the timeline control group 1604 to adjust positioning of the frame controls 1604A-1604C within the details screen 1600 or initiate other workflows involving the image displayed within the selected frame control. In certain examples, the app alters the appearance of selected and unselected frame controls 1604A-1604C within the timeline control group to indicate a currently selected frame control. As shown in FIG. 16, the frame control 1604B is currently selected. As such, the frame control 1604B is highlighted (e.g., outlined and/or shaded) and the other frame controls 1604A and 1604C are not highlighted. The user may move all of the one or more frame controls 1604A-1604C by, for example, sliding a selected control toward the top or the bottom of the details screen 1600. In some examples, the user can long press a frame control to initiate a workflow to add the image within the frame control to a profile, as will be described further below.

Returning to the process 1500, the app receives 1504 input selecting a control of the details screen 1600. For instance, in some examples, the app receives the input selecting the control by executing the processing described above with reference to the operation 704 of FIG. 7.

Continuing with the process 1500, the app determines 1506 which control of the details screen 1600 is selected. For instance, in some examples, the app identifies the control and the type of selection by executing the processing described above with reference to the operation 706 of FIG. 7.

Continuing with the process 1500, if the app determines that a control of the playback control group 1602 is selected, the app adjusts 1508 playback of the event content in accordance with the selected control. As explained above, adjusting 1508 may include toggling between pause and play, adjusting volume, moving to a different location within the content, etc.

Continuing with the process 1500, if the app determines that a control of the timeline control group 1604 is selected, the app next determines 1510 the type of selection. If the app determines that the type of the selection is a swipe, the app moves 1512 the frame controls 1604A-1604C in the direction of the swipe at a speed proportional to the speed of the swipe. If the app determines that the type of the selection is a tap, the app visually highlights 1514 the selected control.

Figure 18:
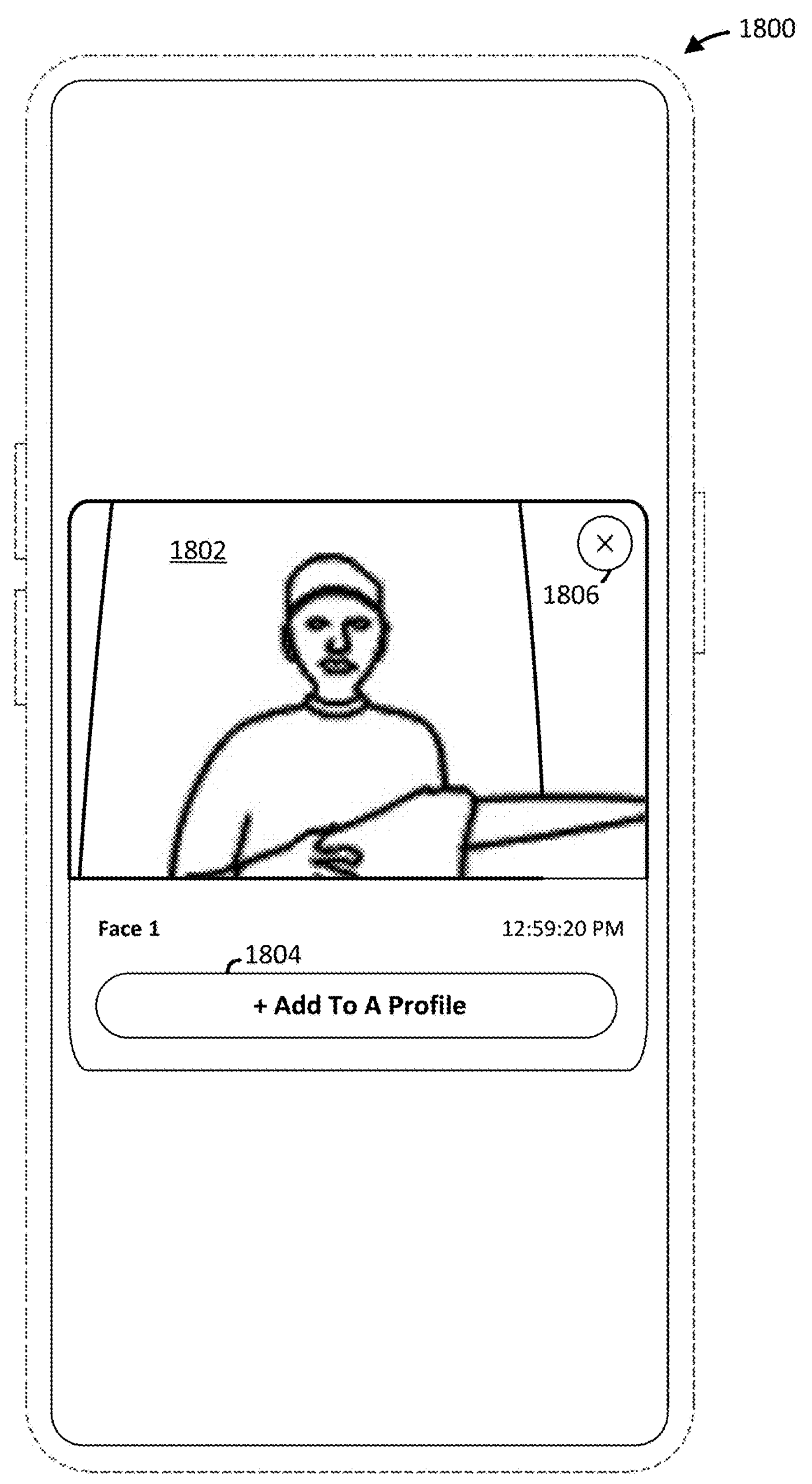
FIG. 18 is a front view of an add to profile screen, according to some examples described herein.

Continuing with the process 1500, if the app determines that the type of the selection is a long press, the app executes an add to profile process. FIG. 17 illustrates an example of such a process, add to profile process 1700. As shown in FIG. 17, the process 1700 starts with the app controlling the host mobile computing device to render 1702 an add to profile screen via the touchscreen. FIG. 18 illustrates one example of an add to profile screen 1800 that can be rendered in some examples. As shown in FIG. 18, the add to profile screen 1800 includes a face clip control 1802, an add to profile button 1804, and a cancel button 1806. The user can select the cancel button 1806 to navigate to the previously rendered screen. As illustrated in FIG. 18, the face clip control 1802 displays an image captured by a location-based device and recognized as depicting a person by the security system or the location-based device. In some examples, the user can select the add to profile button 1804 to confirm that the user wishes to continue the previously initiated workflow of adding a face clip from the image shown in the face clip control to a profile.

Returning to the process 1700, the app receives 1704 input selecting a control of the screen 1800. For instance, in some examples, the app receives the input selecting the control by executing the processing described above with reference to the operation 704 of FIG. 7.

Continuing with the process 1700, the app determines 1706 which control of the screen 1800 is selected. For instance, in some examples, the app identifies the control and the type of selection by executing the processing described above with reference to the operation 706 of FIG. 7.

Figure 19:
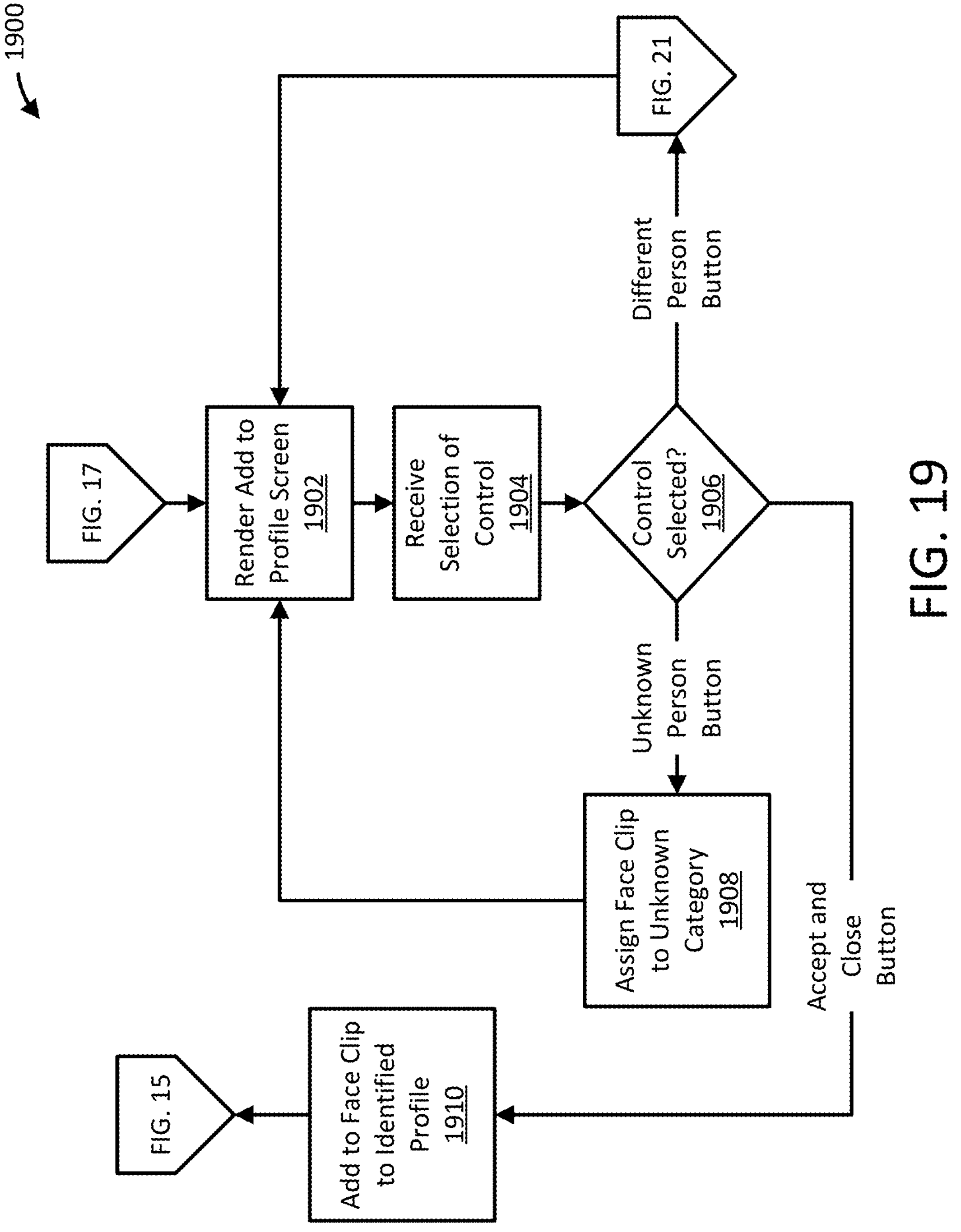
FIG. 19 is a flow diagram illustrating a profile confirmation process, according to some examples described herein.
Figure 20:
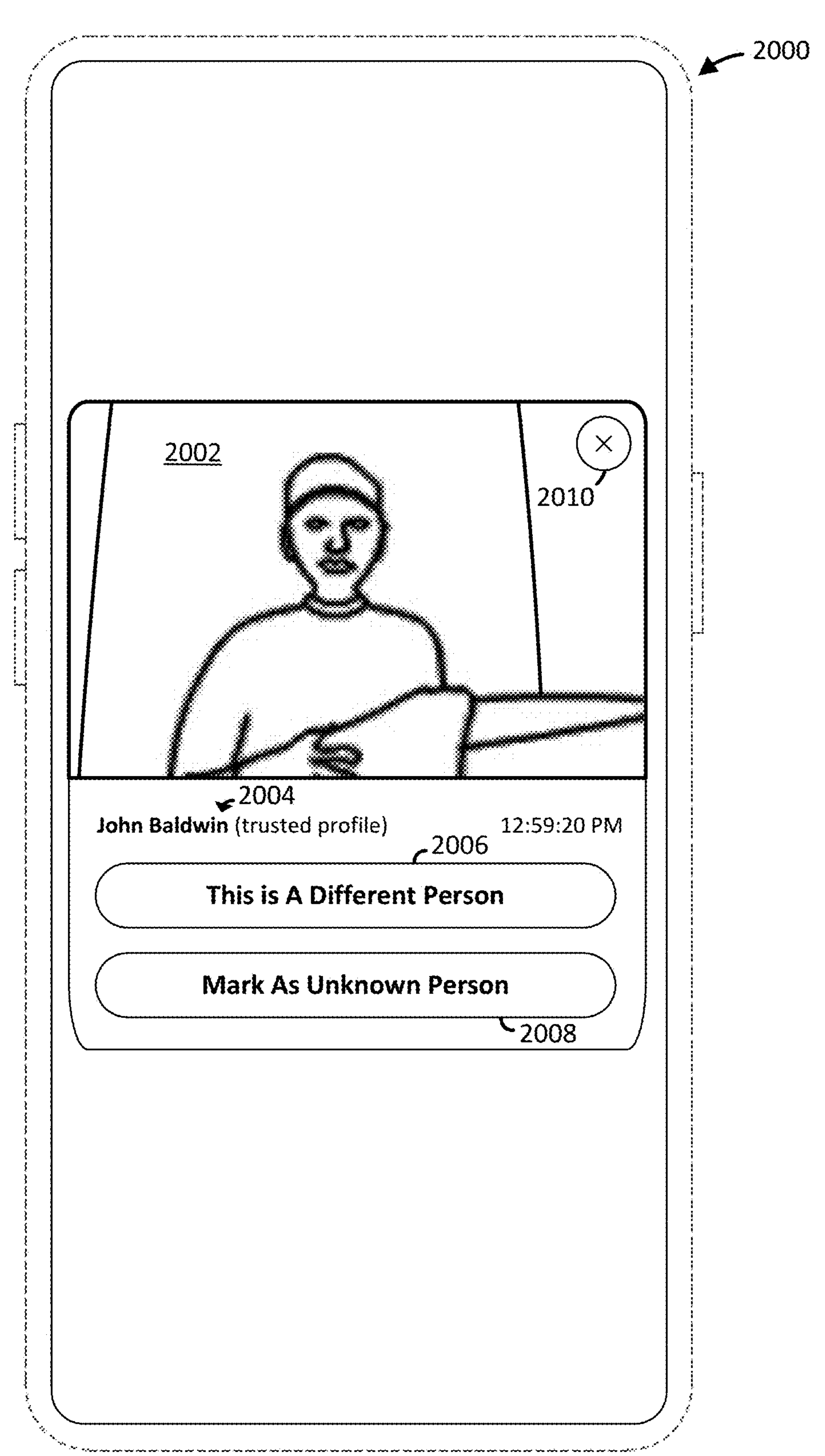
FIG. 20 is a front view of a profile confirmation screen, according to some examples described herein.

Continuing with the process 1700, if the app determines that the cancel button 1806 is selected, the app returns to the previously executing process. If the app determines that the add to profile button 1804 was selected, the app executes a profile confirmation process. FIG. 19 illustrates an example of such a process, profile confirmation process 1900. As shown in FIG. 19, the process 1900 starts with the app controlling the host mobile computing device to render 1902 a profile confirmation screen via the touchscreen. FIG. 20 illustrates one example of a profile confirmation screen 2000 that can be rendered in some examples. As shown in FIG. 20, the screen 2000 includes a face clip control 2002, a profile identification control 2004, a profile selection button 2006, a mark unknown button 2008, and a confirm and close button 2010. The user can select the confirm and close button 2010 to confirm the association between the face clip included in the face clip control 2002 and the profile identified by the profile identification control 2004 and navigate to the previously rendered screen.

In some examples, the profile identification control 2004 includes an identifier (e.g., a name) of a profile of a person the security system recognizes within the image displayed in the face clip control 2002. The user can select the profile selection button 2006 to indicate that the security system has misrecognized the person, and the user wishes to correct this error and associate the image with a different, potentially new, profile. The user can select the mark unknown button 2008 to indicate that the security system has misrecognized the person, and the user wishes to correct this error without associating the image with a profile.

Returning to the process 1900, the app receives 1904 input selecting a control of the screen 2000. For instance, in some examples, the app receives the input selecting the control by executing the processing described above with reference to the operation 704 of FIG. 7.

Continuing with the process 1900, the app determines 1906 which control of the screen 2000 is selected. For instance, in some examples, the app identifies the control and the type of selection by executing the processing described above with reference to the operation 706 of FIG. 7.

Continuing with the process 1900, if the app determines that the confirm and close button 2010 is selected, the app associates 1910 the face clip included within the face clip control 2002 with the profile identified by the profile identification control 2004 and returns to the process 1500 of FIG. 15. If the app determines that the mark unknown button 2008 is selected, the app assigns 1908 the face clip included in the face clip control 2002 to a category of unknown. In some examples, such face clips are retained for potential addition to a profile via subsequent processes and screens, such as the processes and screens described below with reference to FIGS. 45 and 46.

Figure 21:
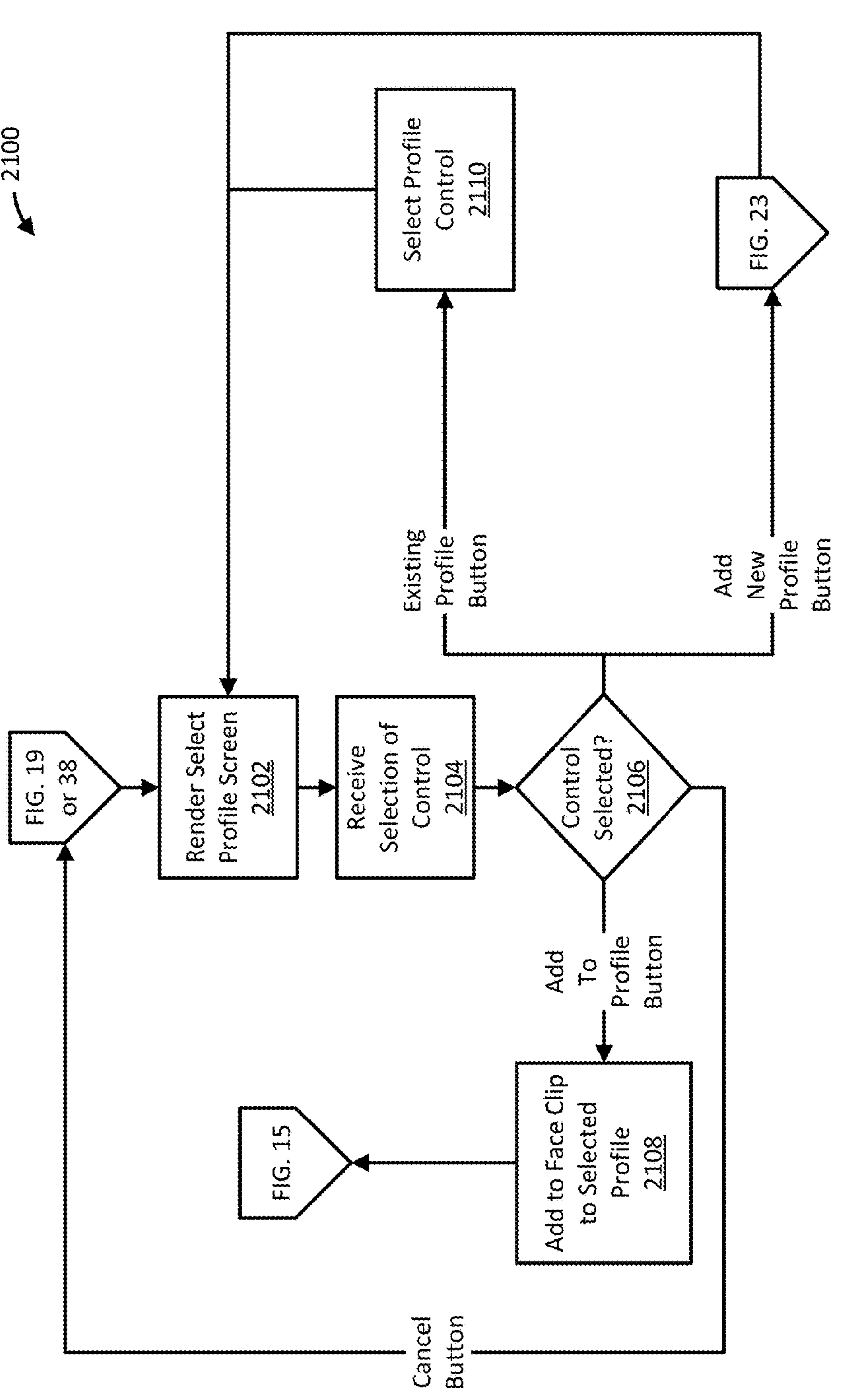
FIG. 21 is a flow diagram illustrating a profile selection process, according to some examples described herein.
Figure 22:
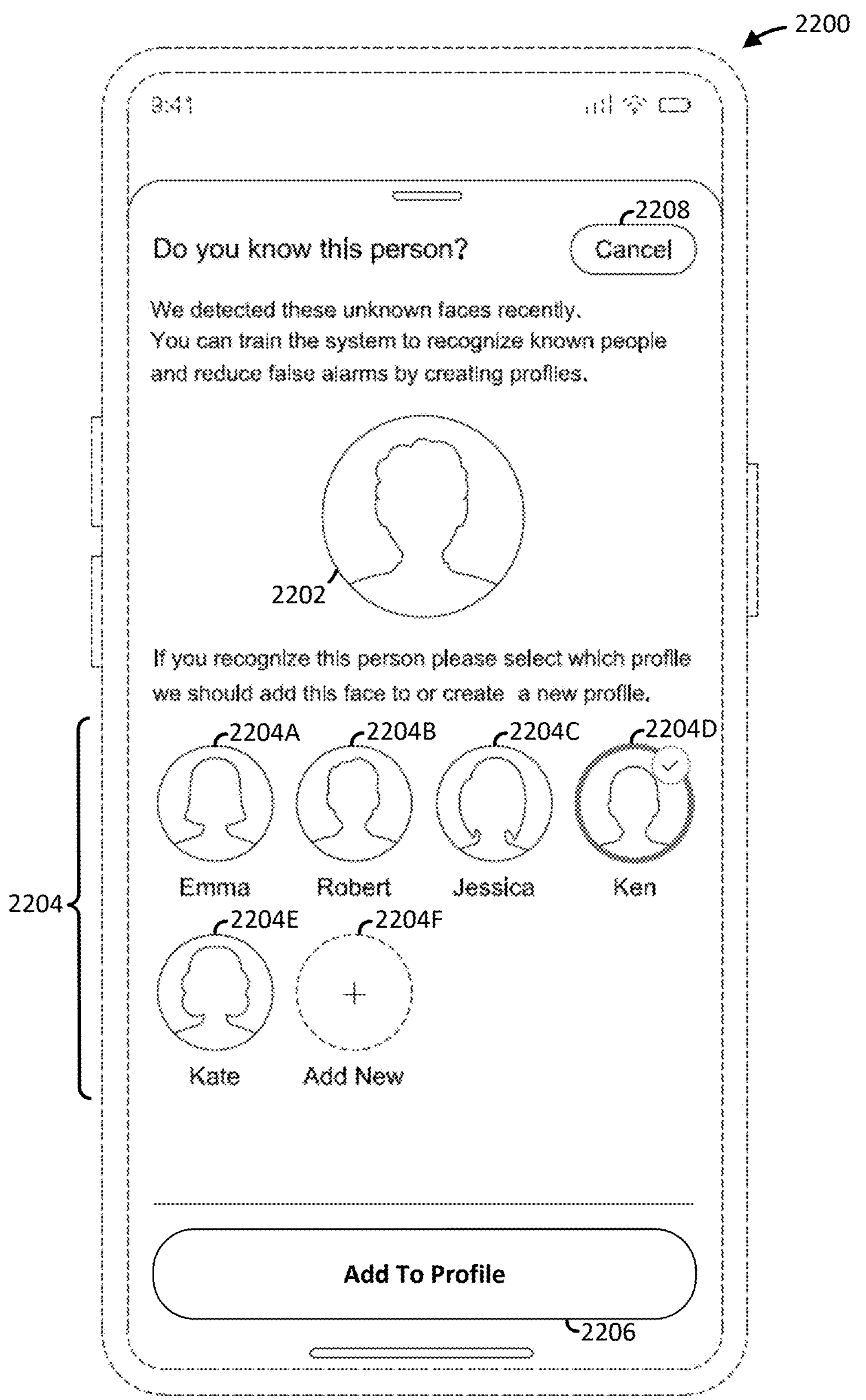
FIG. 22 is a front view of a profile selection screen, according to some examples described herein.

Continuing with the process 1900, if the app determines that the profile selection button 2006 is selected, the app executes a profile selection process. FIG. 21 illustrates an example of such a process, profile selection process 2100. As shown in FIG. 21, the process 2100 starts with the app controlling the host mobile computing device to render 2102 a profile selection screen via the touchscreen. FIG. 22 illustrates one example of a profile selection screen 2200 that can be rendered in some examples. As shown in FIG. 22, the profile selection screen 2200 includes a face clip control 2202, a profile control group 2204, an add to profile button 2206, and a cancel button 2208. The user can select the cancel button 2208 to navigate to the previously rendered screen. The profile control group 2204 includes existing profile buttons 2204A-2204E and a new profile button 2204F.

In some examples, the face clip control 2202 includes an image targeted for association with a profile. The user can select a profile with which to associate the image by selecting one of the existing profile buttons 2204A-2204E or the new profile button 2204F. In some examples, the app alters the appearance of selected and unselected buttons within the control group to indicate a currently selected button. For instance, as shown in FIG. 22, the existing profile button 2204D is highlighted (e.g., encircled and checked) and the other buttons existing profile buttons 2204A-2204C and 2204E are not highlighted.

In some examples, the user can select the add to profile button 2206 to associate the image included in the face clip control 2202 with the profile associated with the currently selected existing profile button. This association provides labeled training data to the security system, thereby enabling further training of the AI service to increase accurate recognition of the person associated with the profile. In some examples, the user can select the new profile button 2204F to create a new profile with which the image included in the face clip control 2202 can be associated.

Returning to the process 2100, the app receives 2104 input selecting a control of the screen 2200. For instance, in some examples, the app receives the input selecting the control by executing the processing described above with reference to the operation 704 of FIG. 7.

Continuing with the process 2100, the app determines 2106 which control of the screen 2200 is selected. For instance, in some examples, the app identifies the control and the type of selection by executing the processing described above with reference to the operation 706 of FIG. 7.

Continuing with the process 2100, if the app determines that the cancel button 2208 is selected, the app returns to the previously executing process. If the app determines that one of existing profile buttons 2204A-2204E is selected, the app marks 2110 the select button for subsequent processing and highlights the selected button. If the app determines that the add to profile button 2206 is selected, the app associates 2108 the face clip included within the face clip control 2202 with the profile associated with the currently selected existing profile button.

Figure 23:
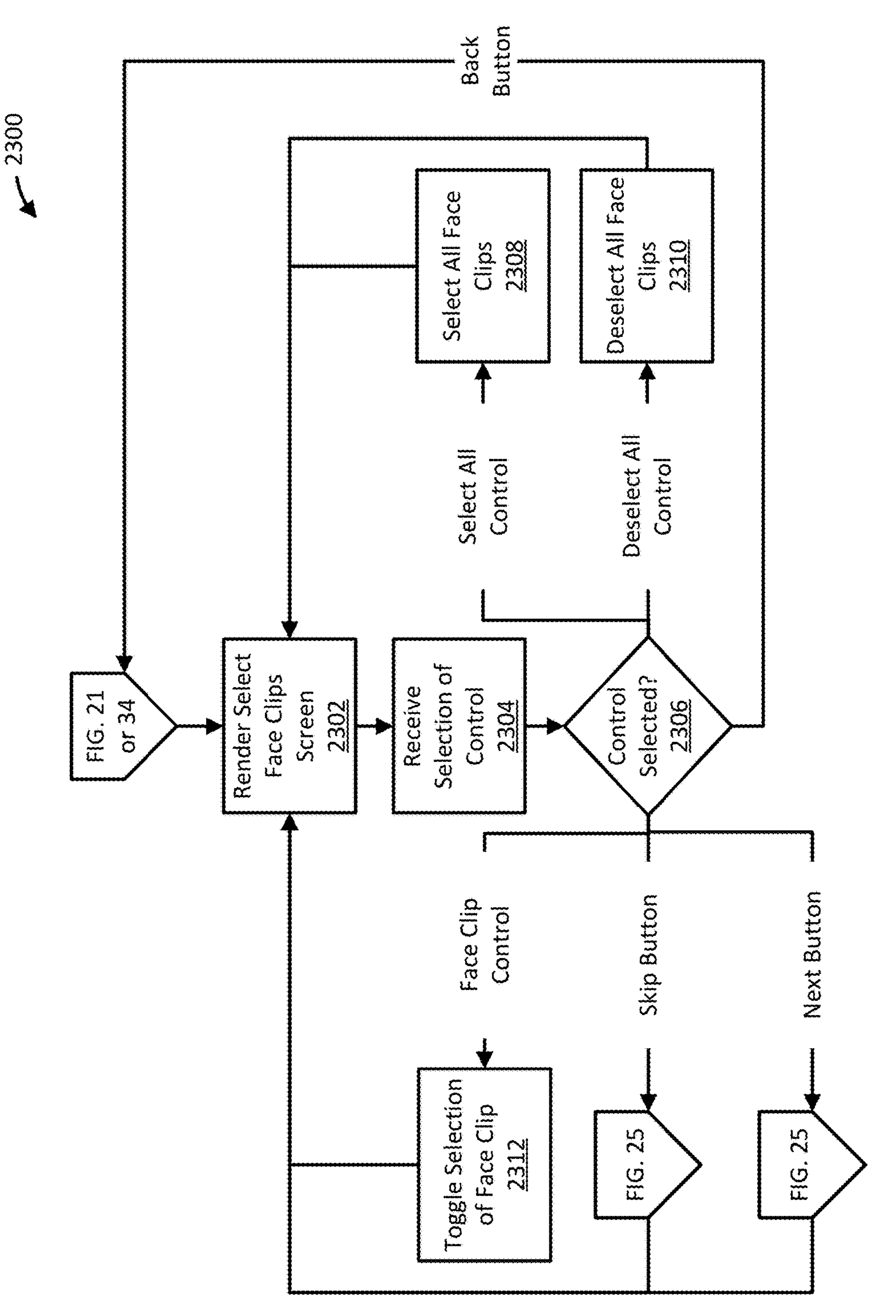
FIG. 23 is a flow diagram illustrating face clip selection process, according to some examples described herein.
Figure 24:
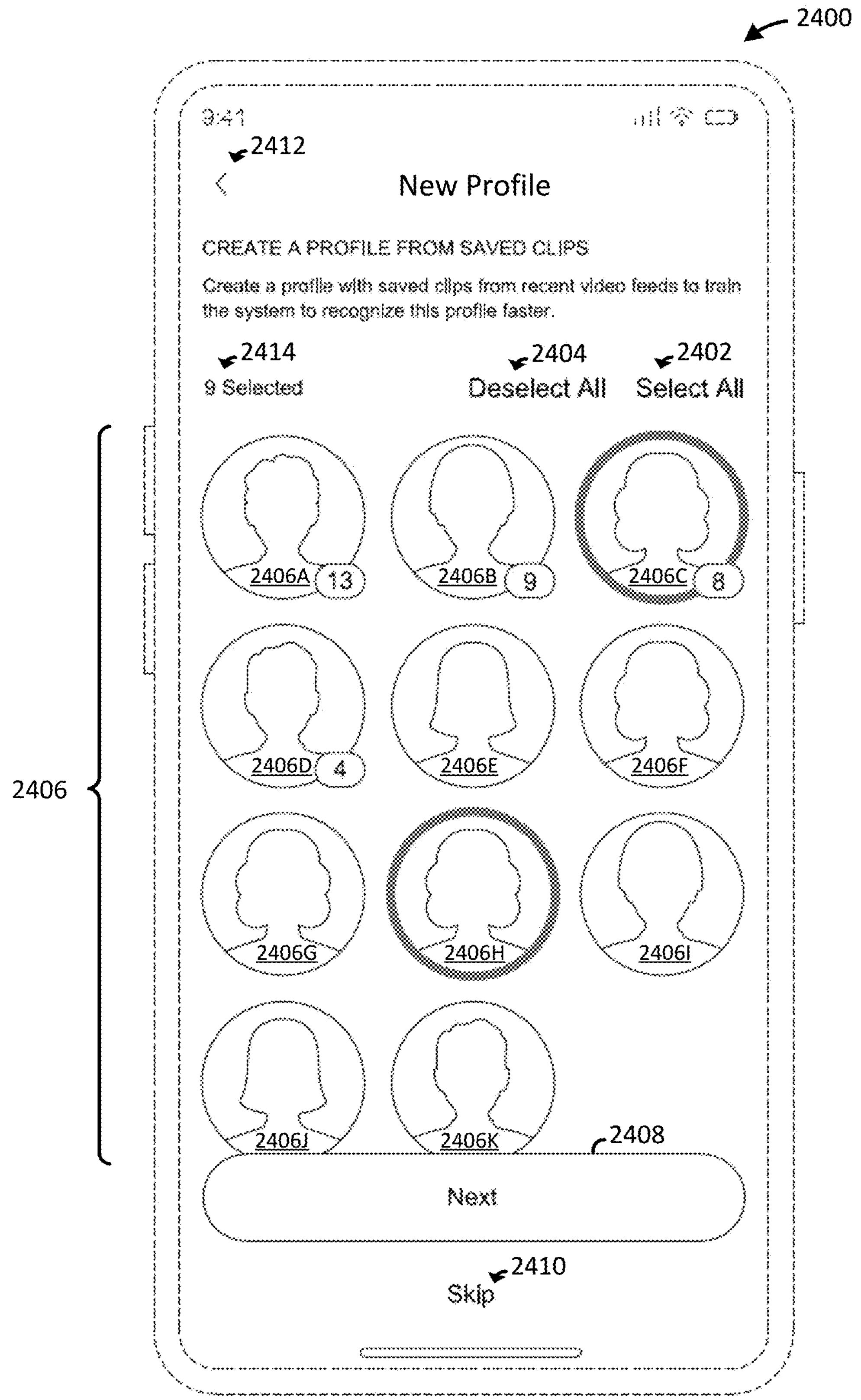
FIG. 24 is a front view of a face clip selection screen, according to some examples described herein.

Continuing with the process 2100, if the app determines that the new profile button 2204F is selected, the app executes a face clip selection process. FIG. 23 illustrates an example of such a process, face clip selection process 2300. As shown in FIG. 23, the process 2300 starts with the app controlling the host mobile computing device to render 2302 a face clips selection screen via the touchscreen. FIG. 24 illustrates one example of a face clips selection screen 2400 that can be rendered in some examples. As shown in FIG. 24, the clip selection screen 2400 includes a select all control 2402, a deselect all control 2404, a clip control group 2406, a next button 2408, a skip control 2410, a back button 2412, and a total selected control 2414. The clip control group 2406 includes face clip controls 2406A-2406K. In some implementations the face clips selection screen 2400 is configured to indicate a new profile recommendation based on, for example, visitor frequency as derived from a quantity of clips stored over a specified duration.

In some examples, individual face clip controls within the clip control group 2406 include a face clip (e.g., an image recognized by the security system as depicting a human face). In these examples, individual face clip controls can also include a number indicating a count of distinct face clips stored in the security system for the person. As shown in FIG. 24, the face clip control 2406A indicates that the security system has 13 face clips stored for the person depicted in the face clip control 2406A. Similarly, face clip controls 2406B-2406D indicate security system storage of 9, 8, and 4 face clips for the persons depicted in face clip controls 2406B-2406D. Where the security system stores only a single face clip for a person, no number may be included in the face clip control associated with the person, as illustrated by controls 2406E-2406K. Further, in some examples, the total selected control 2414 indicates a total number of face clips currently marked for subsequent processing.

In some examples, the user can select any one of the controls 2406A-2406K to mark the control for subsequent processing. As shown in FIG. 24, controls 2406C and 2406H are marked. Marked controls can be highlighted (e.g., encircled) in some examples.

In some examples, the user can select the deselect all control 2404 to unmark all face clip controls within the control group 2406, and the user can select the select all control 2402 to mark all face clip controls within the control group 2406. In certain examples, the user can select the next button 2408 to proceed with the new profile workflow using the marked face clips. The user can select the skip control 2410 to proceed with the new profile workflow without using any face clips. The user can select the back button to return to the previous screen.

Returning to the process 2300, the app receives 2304 input selecting a control of the screen 2400. For instance, in some examples, the app receives the input selecting the control by executing the processing described above with reference to the operation 704 of FIG. 7.

Continuing with the process 2300, the app determines 2306 which control of the screen 2400 is selected. For instance, in some examples, the app identifies the control and the type of selection by executing the processing described above with reference to the operation 706 of FIG. 7.

Continuing with the process 2300, if the app determines that the back button 2412 is selected, the app returns to the previously executing process. If the app determines that the select all control 2402 is selected, the app marks 2308 all face clip controls 2406A-2406K. If the app determines that the deselect all control 2404 is selected, the app unmarks 2310 all marked face clip controls 2406A-2406K. If the app determines that one of the face clip controls 2406A-2406K is selected, the app toggles 2312 marking of the selected face clip control for subsequent processing.

Figure 25:
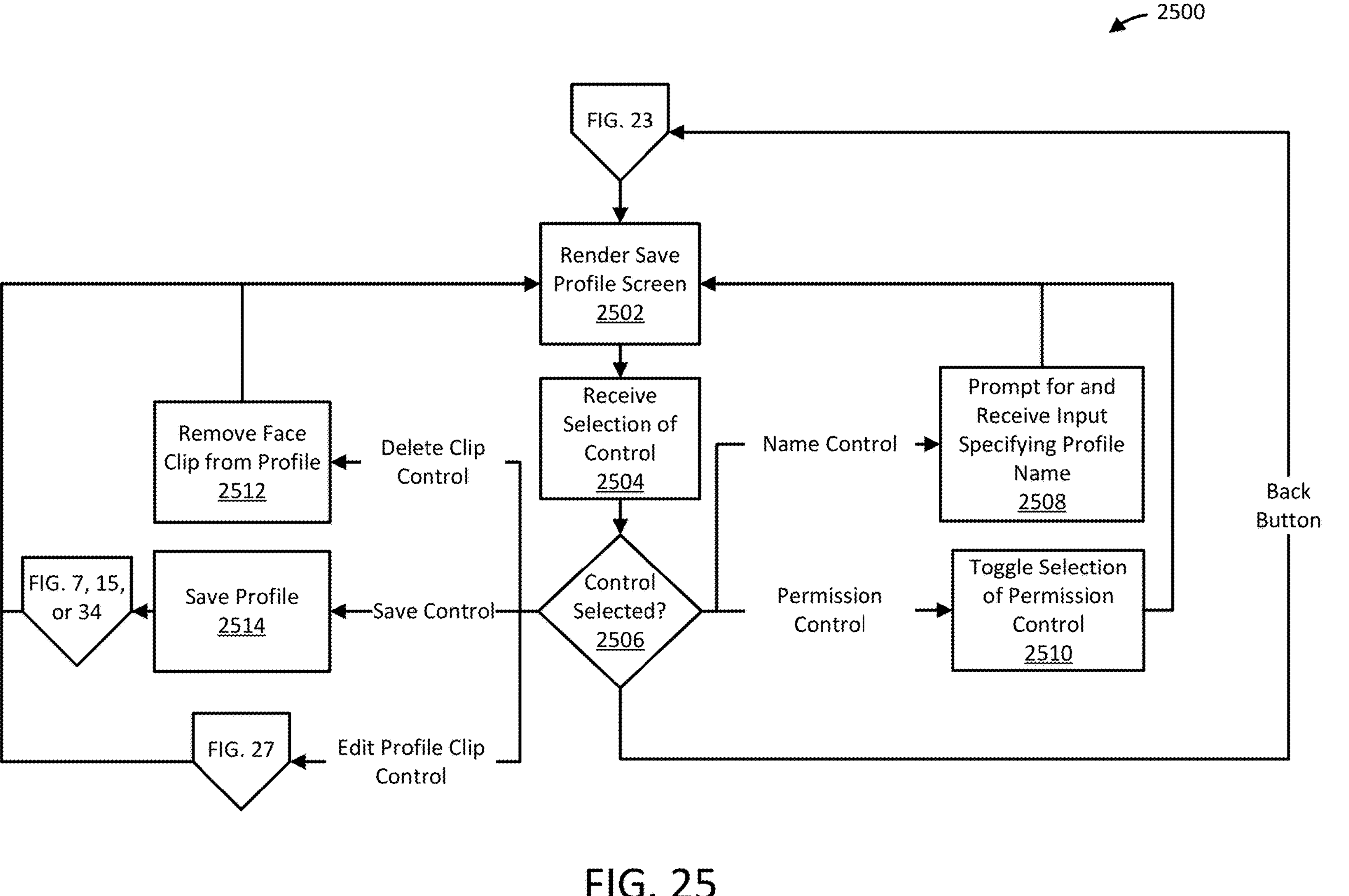
FIG. 25 is a flow diagram illustrating a save profile process, according to some examples described herein.
Figure 26:
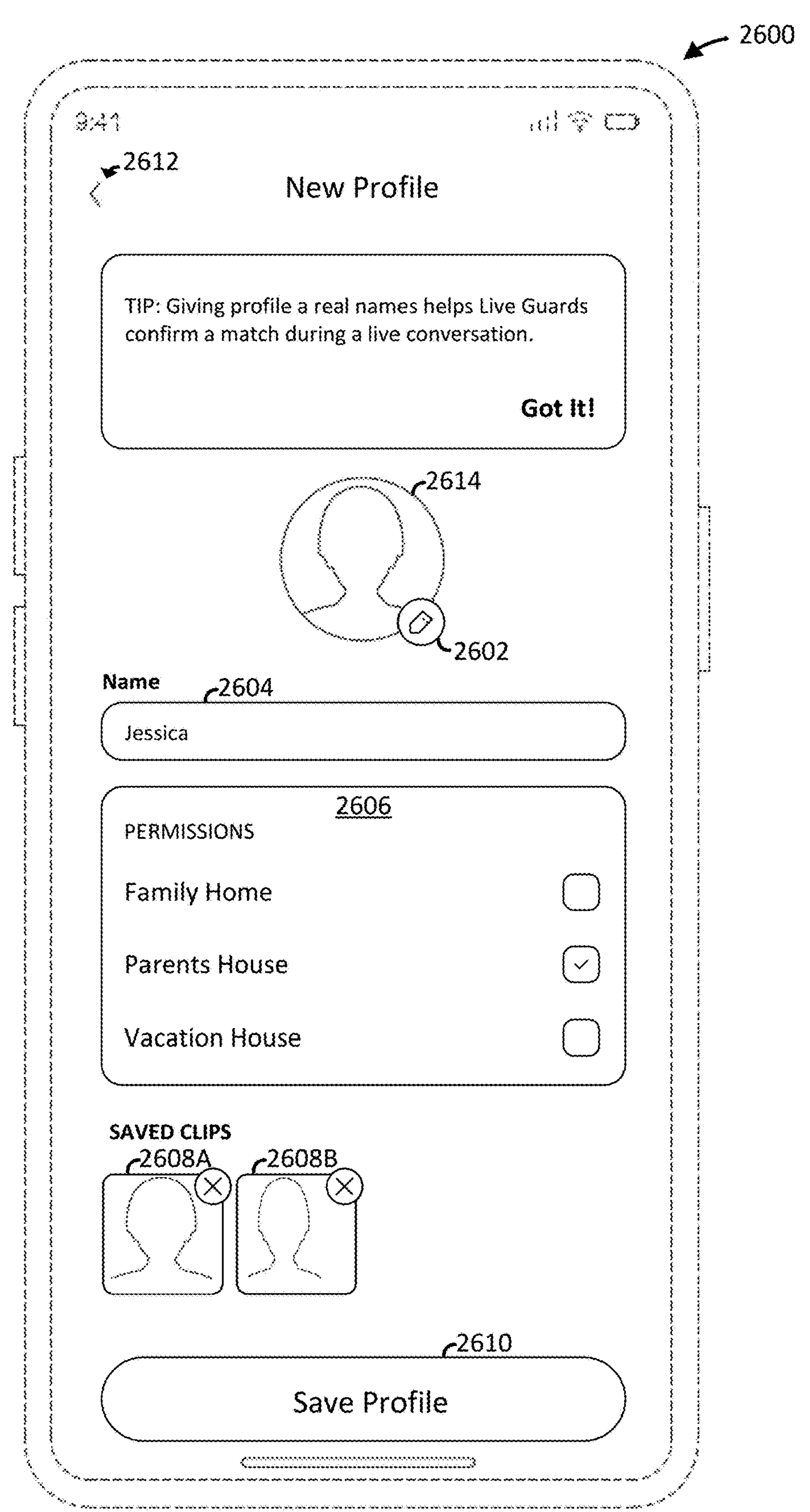
FIG. 26 is a front view of a save profile screen, according to some examples described herein.

Continuing with the process 2300, if the app determines that either the next button 2408 or the skip control 2410 is selected, the app executes a save profile process. FIG. 25 illustrates an example of such a process, save profile process 2500. As shown in FIG. 25, the process 2500 starts with the app controlling the host mobile computing device to render 2502 a save profile screen via the touchscreen. FIG. 26 illustrates one example of a save profile screen 2600 that can be rendered in some examples. As shown in FIG. 26, the save profile screen 2600 includes an edit profile clip button 2602, a profile name control 2604, a permissions list control 2606, delete clip controls 2608A and 2608B, a save profile button 2610, a back button 2612, and a profile clip control 2614. Through the save profile screen 2600 and the controls included therein, the app enables the user to save profiles of persons trusted to visit locations associated with the currently authenticated user account. In an alternative implementation, the app enables the user to save profiles of person who are not trusted to visit locations associated with the currently authenticated user account, wherein detection of an untrusted person can trigger an alarm event.

In some examples, the profile clip control 2614 includes a face clip representative of the person associated with the profile being created. The face clip initially included in the profile clip control may be selected by the security system based, for example, on completeness and clarity metrics of the face clip calculated by the security system, as described herein. In some examples, the completeness metric is based on a percentage of landmarks positively identified in the face clip. If no face clips have been selected for the profile, the app may include a generic image within the profile clip control 2614. The name control 2604 can include a textual identifier of the profile (e.g., a person's name). The textual identifier can include any alphanumeric character. The permissions list control 2606 indicates locations at which the person in the profile is welcome to visit without initiating an alarm. The delete clip controls 2608A and 2608B include face clips that are currently associated with the profile (e.g., by being marked within the screen 2400 of FIG. 24).

In some examples, the user can effectuate a number of changes to the current profile of the save profile screen 2600 via the controls included therein. For instance, in certain examples, the user can change the face clip displayed in the profile clip control by selecting the edit profile clip button 2602. The user can select the name control 2604 to enter a name for the profile. The user can select a control within the permissions list control 2606 to mark a location associated with the control as being welcome to visitation by the person associated with the profile without sounding an alarm. The user can select one of the delete clip controls 2608A and 2608B to disassociate the face clip depicted within the control from the profile. The user can save changes made to the profile, and complete the new profile workflow, by selecting the save profile button 2610.

Returning to the process 2500, the app receives 2504 input selecting a control of the screen 2600. For instance, in some examples, the app receives the input selecting the control by executing the processing described above with reference to the operation 704 of FIG. 7.

Continuing with the process 2500, the app determines 2506 which control of the screen 2600 is selected. For instance, in some examples, the app identifies the control and the type of selection by executing the processing described above with reference to the operation 706 of FIG. 7.

Continuing with the process 2500, if the app determines that the back button 2612 is selected, the app returns to the previously executing process. If the app determines that the name control 2604 is selected, the app prompts for and receives 2508 input specifying a name for the profile to be saved. If the app determines that a control of the permissions list control 2606 was selected, the app toggles 2510 marking of the selected control. If the app determines that a delete clip control (e.g., one of delete clip controls 2608A and 2608B) is selected, the app disassociates 2512 the selected face clip depicted within the selected control from the profile. If the app determines that the save profile button 2610 is selected, the app saves 2514 the profile. It should be noted that the operation 2514 may involve saving profile information locally and/or remotely, so that the security system as a whole can utilize the information to recognize persons permitted to visit specified locations without the visit resulting in an alarm.

Figure 27:
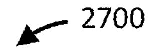
FIG. 27 is a flow diagram illustrating profile face clip selection process, according to some examples described herein.
Figure 27:
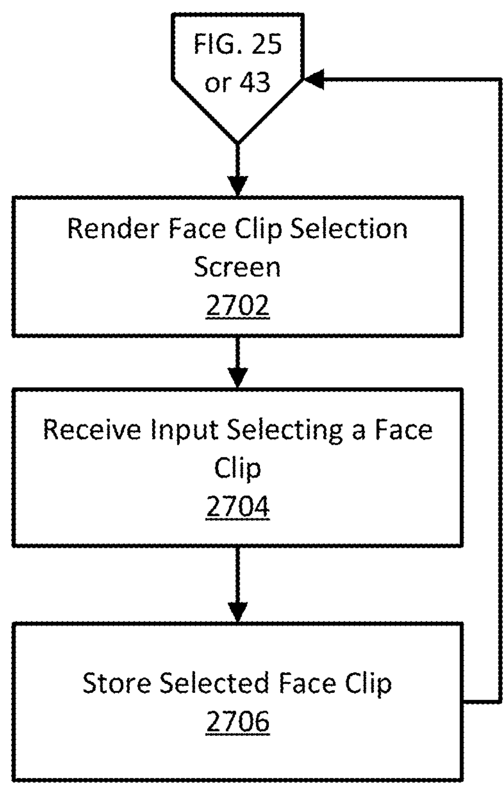

Continuing with the process 2500, if the app determines that the edit profile clip button 2602 is selected, the app executes a configuration process to update the face clip associated with the profile. FIG. 27 illustrates an example of such a process, configuration process 2700. As shown in FIG. 27, the process 2700 starts with the app controlling 2702 the host mobile computing device to render a face clip edit screen. This face clip edit screen may include, for example, controls configured to prompt for and receive selection of a face clip to be used for the profile.

Continuing with the process 2700, the app receives 2704, via the controls, user input specifying the face clip to be used to represent the profile and stores 2706 an association between the profile and the face clip. It should be noted that, in some examples, the operation 2706 may include communication of the association between the profile and the face clip to other parts (e.g., the surveillance service) of the security system via one or more messages.

Figure 28:
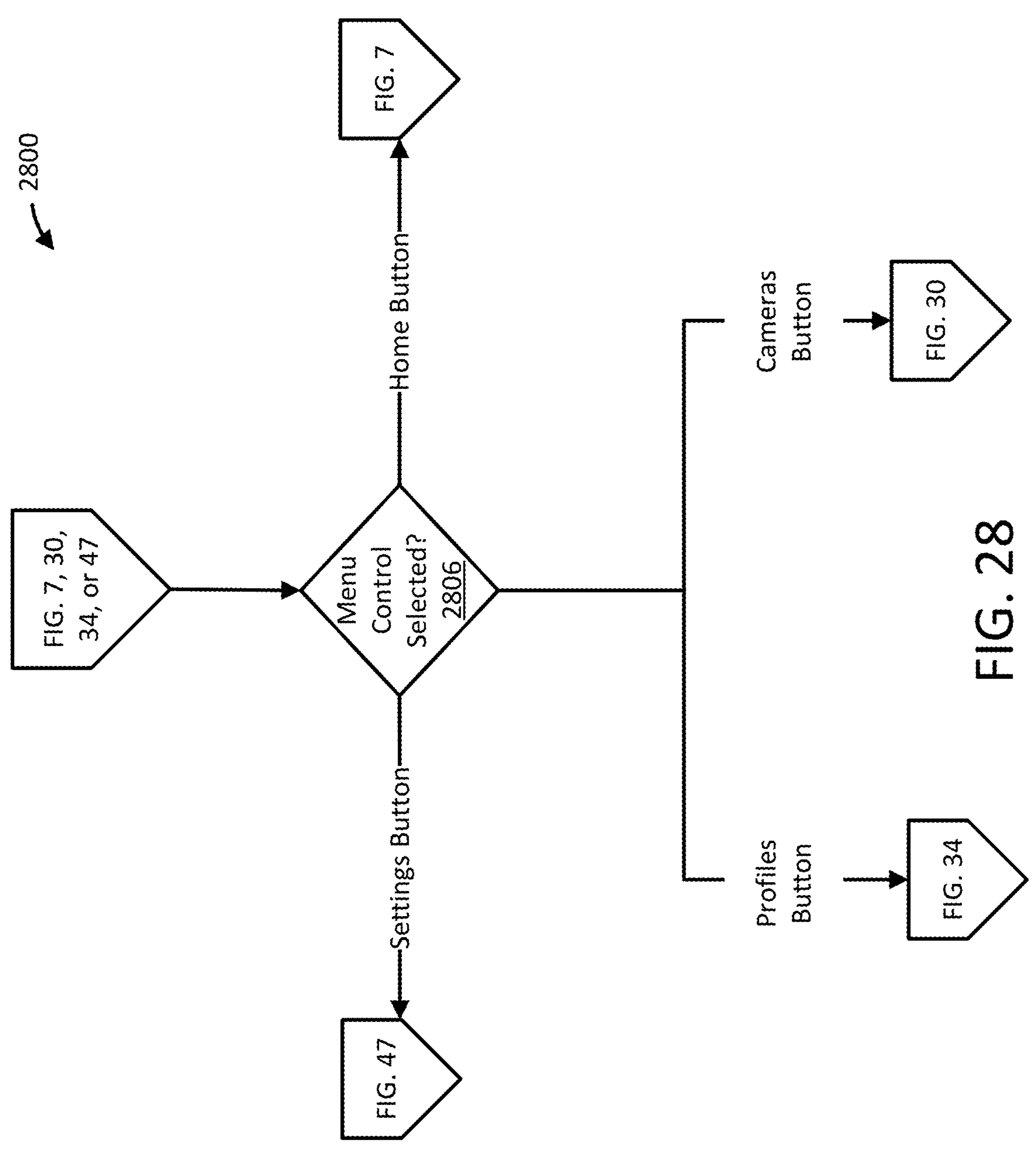
FIG. 28 is a flow diagram illustrating a menu control handling process, according to some examples described herein.

Returning to the process 700 of FIG. 7, if the app determines that a control of the menu control group 814 is selected, the app executes a navigation operation 2806 as illustrated in FIG. 28. For example, if the app determines that the home button 814A is selected, the app renders the home screen 800 by executing the process 700. If the app determines that the cameras button 814B is selected, the app renders a camera screen 3100 by executing a camera screen provisioning process 3000 that is described further below. If the app determines that the profiles button 814C is selected, the app renders a profiles screen 3500 by executing a profiles screen provisioning process 3400 that is described further below. If the app determines that the settings button 814D is selected, the app renders a settings screen 4800 by executing a settings screen provisioning process 4700 that is described further below.

Figure 30:
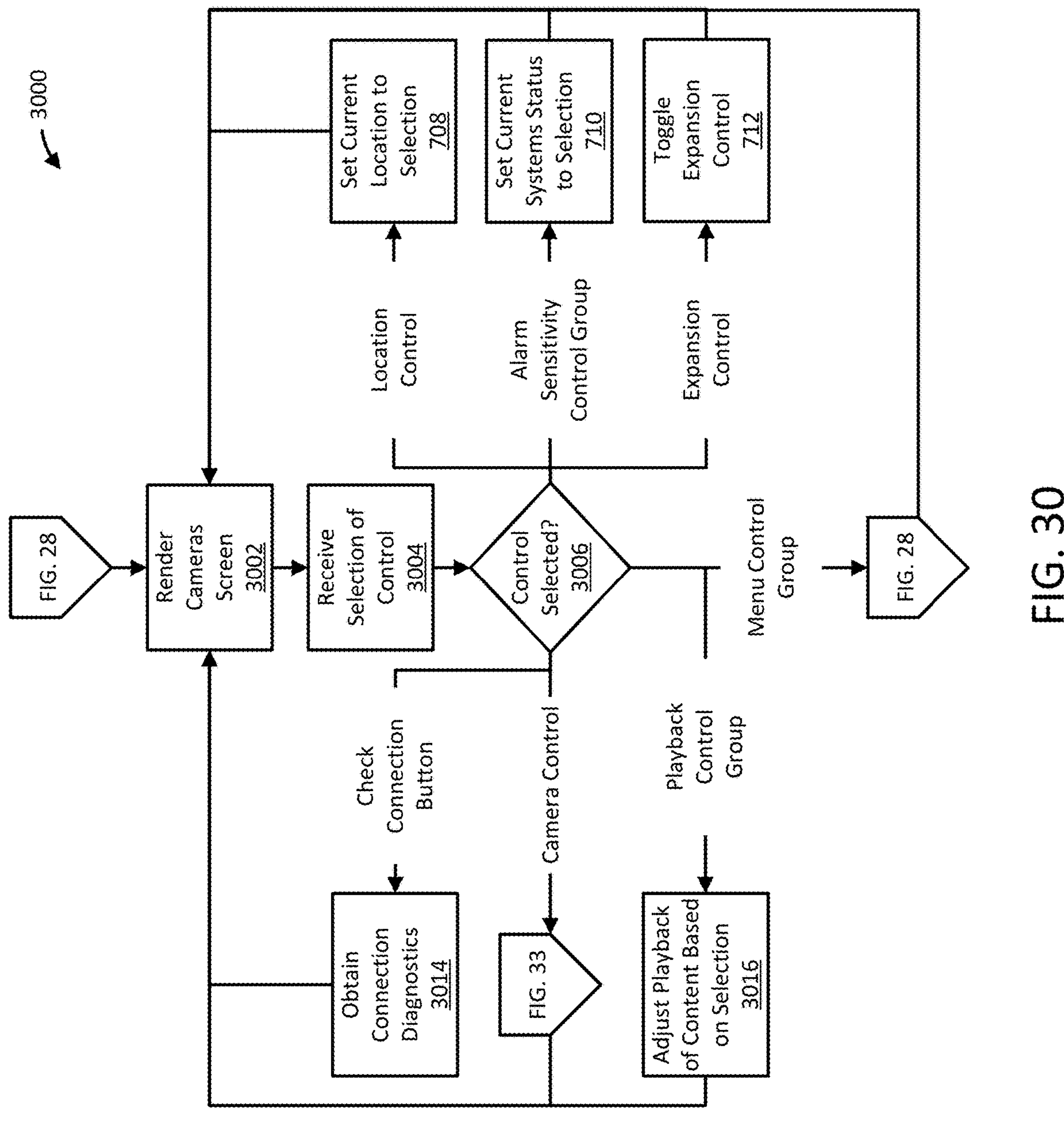
FIG. 30 is flow diagram illustrating a cameras screen provisioning process, according to some examples described herein.
Figure 31:
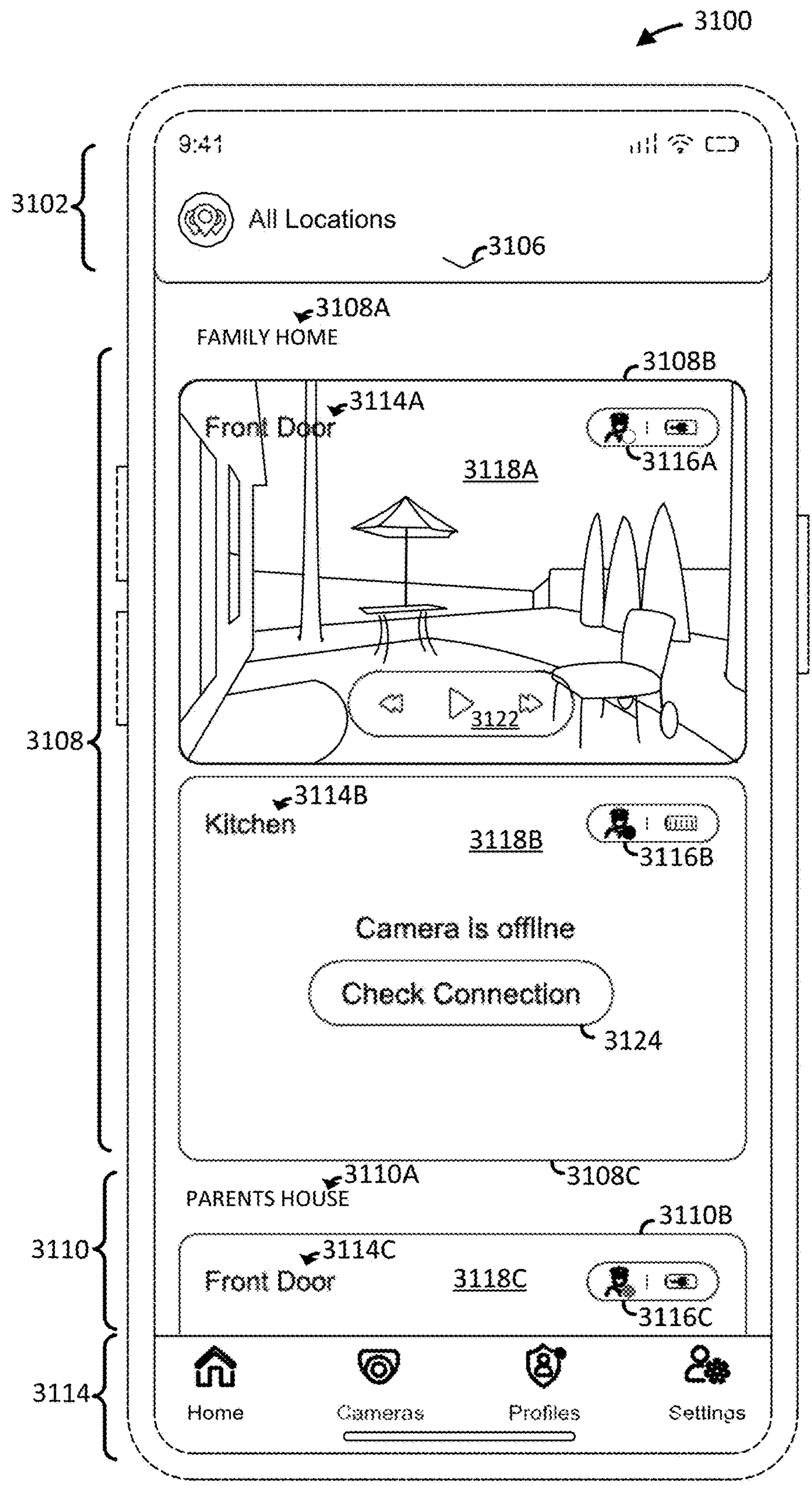
FIG. 31 is a front view of a cameras screen, according to some examples described herein.

Turning now to FIG. 30, the camera screen provisioning process 3000 is illustrated. As shown in FIG. 30, the process 3000 starts with the app controlling the host mobile computing device to render 3002 a cameras screen via the touchscreen. FIG. 31 illustrates one example of a cameras screen 3100 that can be rendered in some examples. As shown in FIG. 31, the cameras screen 3100 includes a location control group 3102, an expansion control 3106, camera control groups 3108 and 3110, and a menu control group 3114. The camera control group 3108 includes a location identifier control 3108A and camera controls 3108B and 3108C. The cameras screen 3100 optionally includes a "play all" control that causes playback to commence for all cameras associated with a monitored location (or for all monitored locations). The camera control group 3110 includes a location identifier control 3110A and a camera control 3110B. The individual camera controls 3108B, 3108C, and 3110B include camera identifier controls 3114A-3114C, camera status controls 3116A-3116C, and display areas 3118A-3118C. The camera control 3108B includes a playback control group 3122. A particular camera control 3108B optionally has an aspect ratio corresponding to an aspect ratio of the camera providing the video in the particular camera control 3108B. The camera control 3108C includes a check connection button 3124. Through the camera screen 3100 and the controls included therein, the app enables the user to view images captured by cameras at one or more locations associated with the authenticated user account.

Figure 32A:
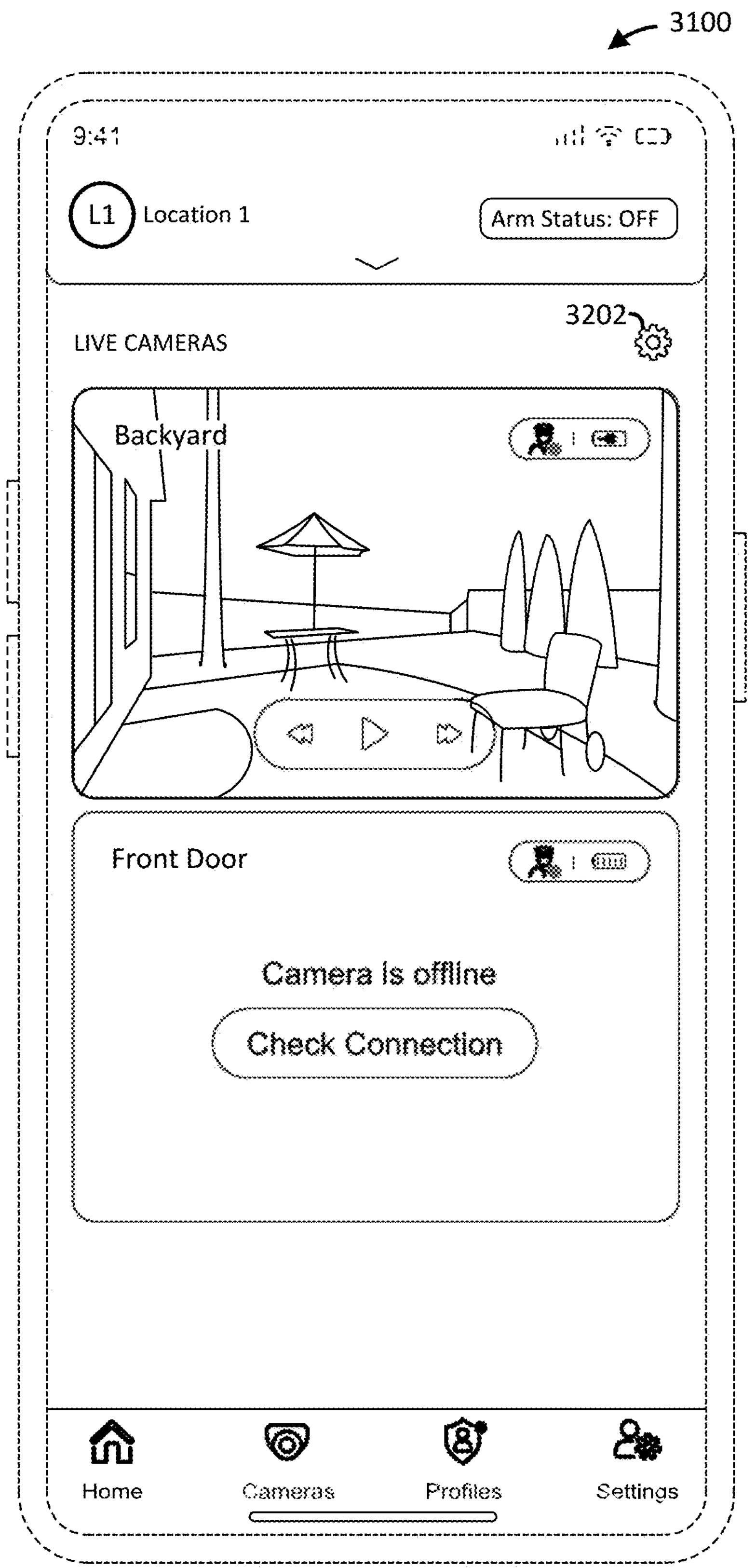
FIG. 32A is another front view of a cameras screen, according to some examples described herein.

In some examples, the location control group 3102, the expansion control 3106, and the menu control group 3114 operate within the screen 3100 as do the location control group 802, the expansion control 806, and the menu control group 814 within the screen 800. As such, the location control group 3102, the expansion control 3106, and the menu control group 3114 are not described further here for purposes of brevity. The camera control groups 3108 and 3110 organize the camera controls 3108B, 3108C, and 3110B by location. For instance, as shown in FIG. 31, the location identifier controls 3108A and 3110A include textual identifiers (e.g., names) of locations at which cameras associated with the camera controls 3108B, 3108C, and 3110B reside. If a user selects a particular location via operation of the location control group 3102, the app may omit, limit, or change the text included in the one or more of the location identifier controls 3108A and 3110A. For instance, FIG. 32A illustrates the screen 3100 where a particular location is selected. As shown in FIG. 32A, the location identifier controls 3108A and 3110A are omitted and a camera configuration control 3202 is added. The user can select the camera configuration control 3202 to navigate to a camera configuration screen configured to receive and store camera configuration preferences using a process analogous to the process 700 described above with reference to FIG. 7.

In some examples, the app utilizes the display areas 3118A, 3118B, and 3118C for a variety of purposes. Where a camera associated with a display area is connected to the security system and operational, the app allows the user to review content acquired by the camera via the display area. As shown in FIG. 31, the display area 3118A includes content acquired by a camera identified by the camera identifier control 3114A. The user may interact with the playback control group 3122 to review the content (which may include audio and video content) acquired by the camera. Where a camera associated with a display area is not connected to the security system, the app allows the user to initiate a diagnostic process to troubleshoot the root cause of the disconnected state of the camera. As shown in FIG. 31, the display area 3118B includes the check connection button 3124 and indicates that the camera identified by the camera identifier control 3114B is offline. The user may interact with the check connection button 3124 to initiate the diagnostic process. By presenting the check connection button 3124 within the display area 3118B, as opposed to a separate configuration screen, the app helps the user to initiate the diagnostic process more quickly.

In some examples, the app indicates power and monitoring status information via the camera status controls 3116A-3116C. For instance, as shown in FIG. 31, the control 3116A indicates that the camera identified by the camera identifier control 3114A is coupled to external power (e.g., by including a plug symbol), and monitored by a monitoring service (e.g., by including an agent symbol with a circle of a particular color). In contrast, the control 3116B indicates that the camera identified by the camera identifier control 3114B is coupled to fully charged battery power (e.g., by including a full battery symbol), and not monitored by a monitoring service (e.g., by including an agent symbol with a circle of a particular color).

Returning to the process 3000, the app receives 3004 input selecting a control of the screen 3100. For instance, in some examples, the app receives the input selecting the control by executing the processing described above with reference to the operation 704 of FIG. 7.

Continuing with the process 3000, the app determines 3006 which control of the screen 3100 is selected. For instance, in some examples, the app identifies the control and the type of selection by executing the processing described above with reference to the operation 706 of FIG. 7.

Continuing with the process 3000, if the app determines that the location control group 3102 is selected, the app sets the location context for the screen 3100 by executing the processing described above with reference to the operation 708 of FIG. 7.

Continuing with the process 3000, if the app determines that the expansion control 3106 is selected, the app executes the processing described above with reference to the operation 712 of FIG. 7.

Continuing with the process 3000, if the app determines that the alarm sensitivity control group (not shown in FIG. 31, but available via the expansion control 3106) is selected, the app executes the processing described above with reference to the operation 710 of FIG. 7.

Continuing with the process 3000, if the app determines that the menu control group 3114 is selected, the app executes the processing described above with reference to the operation 2806 of FIG. 28.

Continuing with the process 3000, if the app determines that the check connection button 3124 is selected, the app initiates 3014 a diagnostic process to attempt to identify a root cause of the camera's offline status. For instance, in some examples, the app controls its host mobile computing device to interoperate with a router (e.g., the router 116 of FIG. 1) or other network forwarding device (e.g., the base station 114 of FIG. 1) to request diagnostic information regarding a network or data link layer connection between the camera and the router and/or the forwarding device. This diagnostic information can include, for example, a signal strength measurement. In some examples, the network forwarding device may attempt to connect with the offline camera via a direct connection. This direct connection may utilize a sub-GHz network interface. In certain examples, the app may further attempt to establish a PAN connection with the offline camera as part of the diagnostic process. In some examples, the app controls its host device to display additional information gathered as part of the diagnostic process via a camera control including the selected check connection button 3124.

Continuing with the process 3000, if the app determines that a control of the playback control group 3122 is selected, the app adjusts 3016 playback of the camera content, within the display area housing the playback control group 3122, in accord with the selected control. Adjusting 3016 may include toggling between pause and play, adjusting volume, moving to a different location within the content, etc.

Figure 32B:
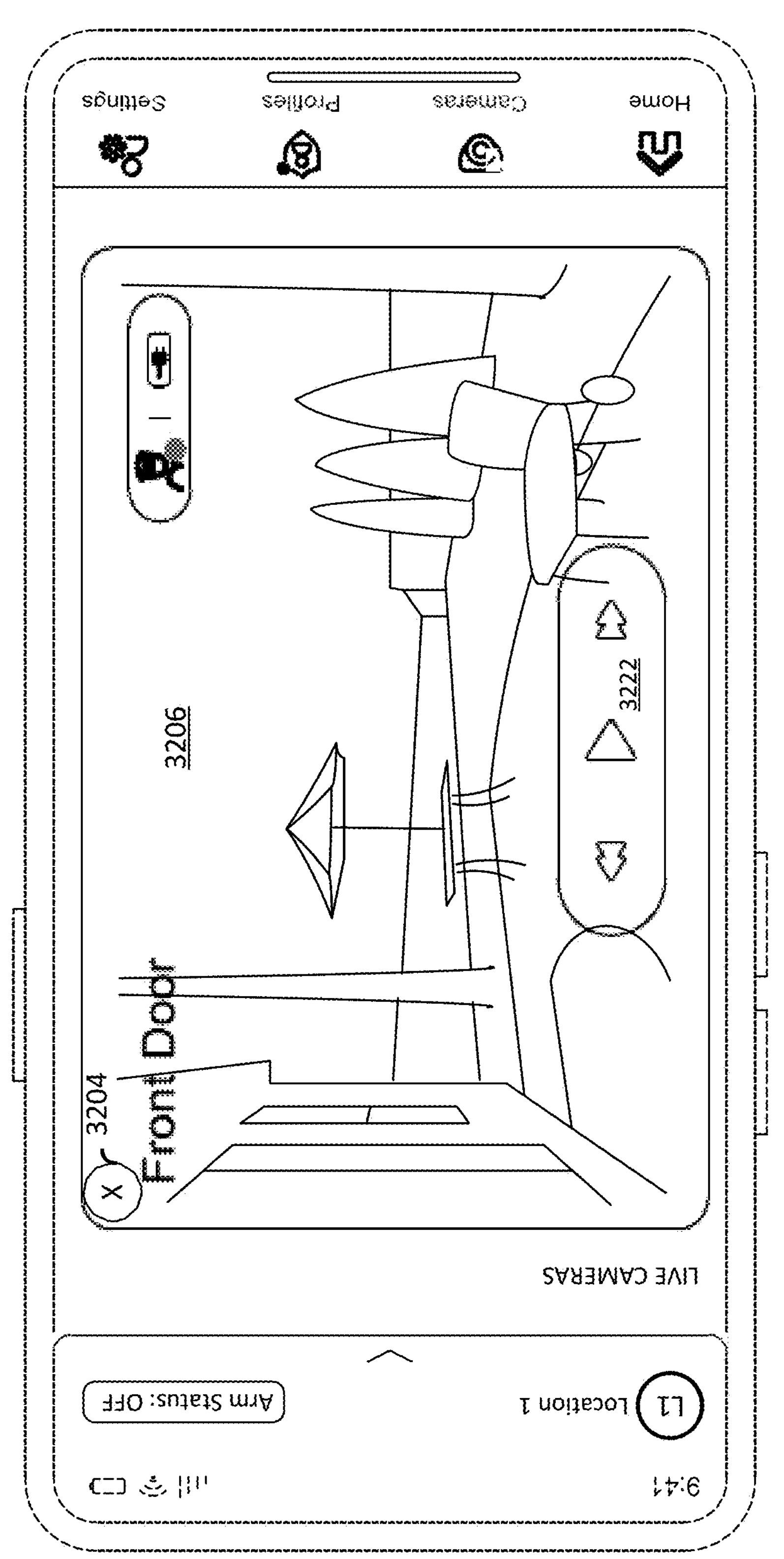
FIG. 32B is a front view of a camera review screen, according to some examples described herein.
Figure 33:
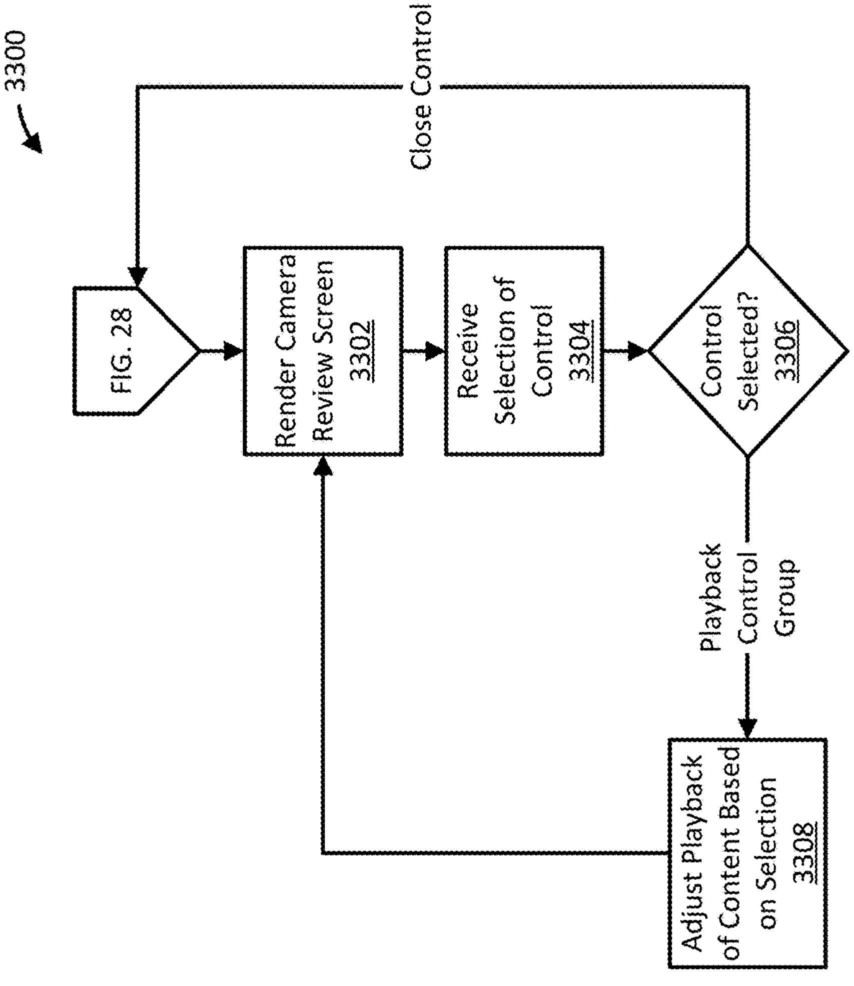
FIG. 33 is a flow diagram illustrating a camera review process, according to some examples described herein.

Continuing with the process 3000, if the app determines that a camera control is selected, the app executes a camera review process. FIG. 33 illustrates an example of such a process, camera review process 3300. As shown in FIG. 33, the process 3300 starts with the app controlling the host mobile computing device to render 3302 a camera review screen via the touchscreen. FIG. 32B illustrates one example of a camera review screen 3200 that can be rendered in some examples. The camera review screen 3200 includes many of the features of the camera control 3108B of FIG. 31. For purposes of brevity, descriptions of those features will not be repeated here. As shown in FIG. 32B, the camera review screen 3200 includes a display area 3206, a close button 3204, and a playback control group 3222. Through the camera review screen 3200 and the controls included therein, the app enables the user to view images captured by a specific camera. The user may select the close button 3204 to navigate to the previous screen.

Returning to the process 3300, the app receives 3304 input selecting a control of the screen 3200. For instance, in some examples, the app receives the input selecting the control by executing the processing described above with reference to the operation 704 of FIG. 7.

Continuing with the process 3300, the app determines 3306 which control of the screen 3200 is selected. For instance, in some examples, the app identifies the control and the type of selection by executing the processing described above with reference to the operation 706 of FIG. 7.

Continuing with the process 3300, if the app determines that the close button 3204 is selected, the app returns to the previously executing process. If the app determines that a control of the playback control group 3222 is selected, the app adjusts 3308 playback of the camera content, within the display area 3206, in accord with the selected control. Adjusting 3308 may include toggling between pause and play, adjusting volume, moving to a different location within the content, etc.

Figure 34:
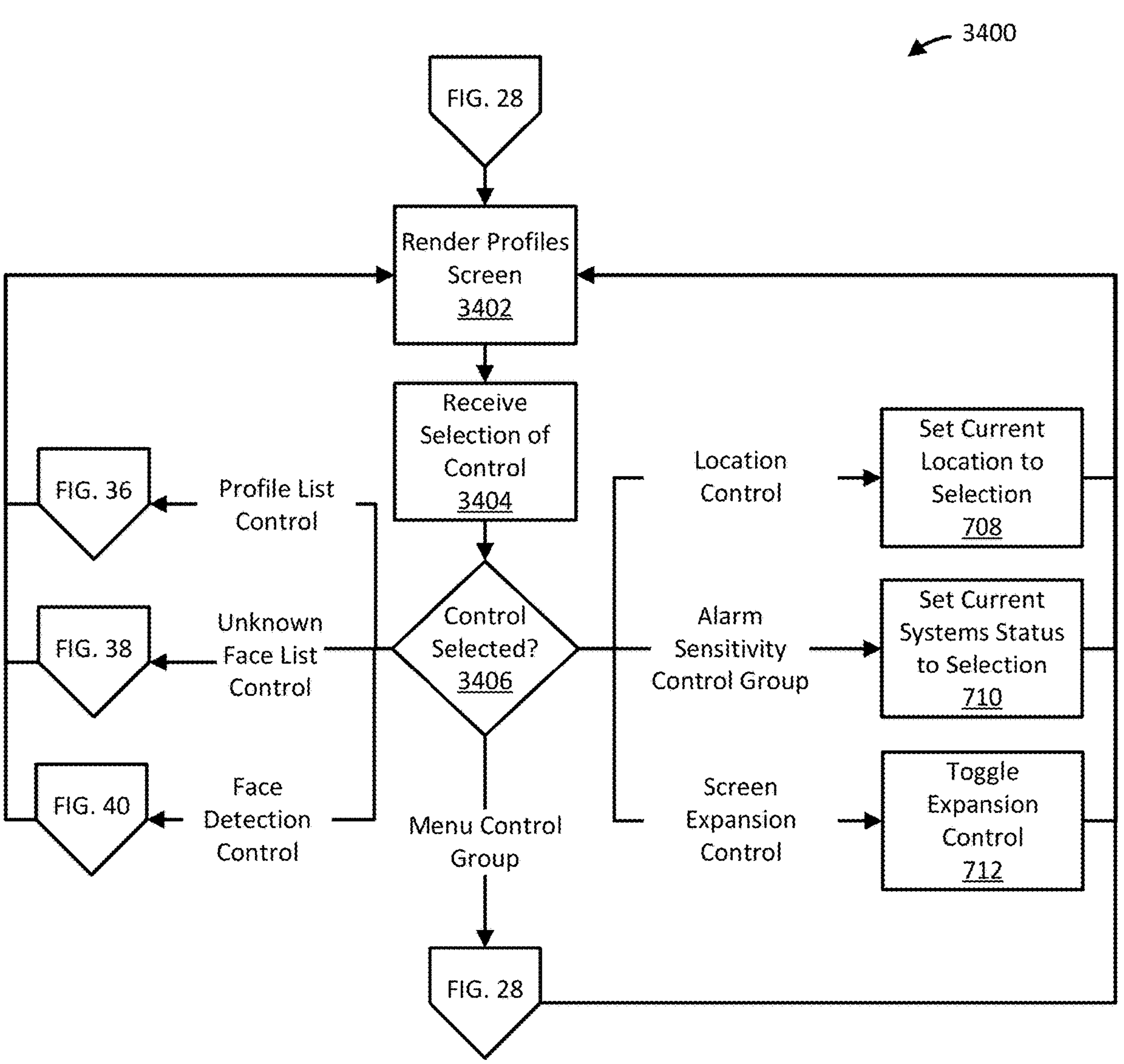
FIG. 34 is a flow diagram illustrating profiles screen provisioning process, according to some examples described herein.
Figure 35:
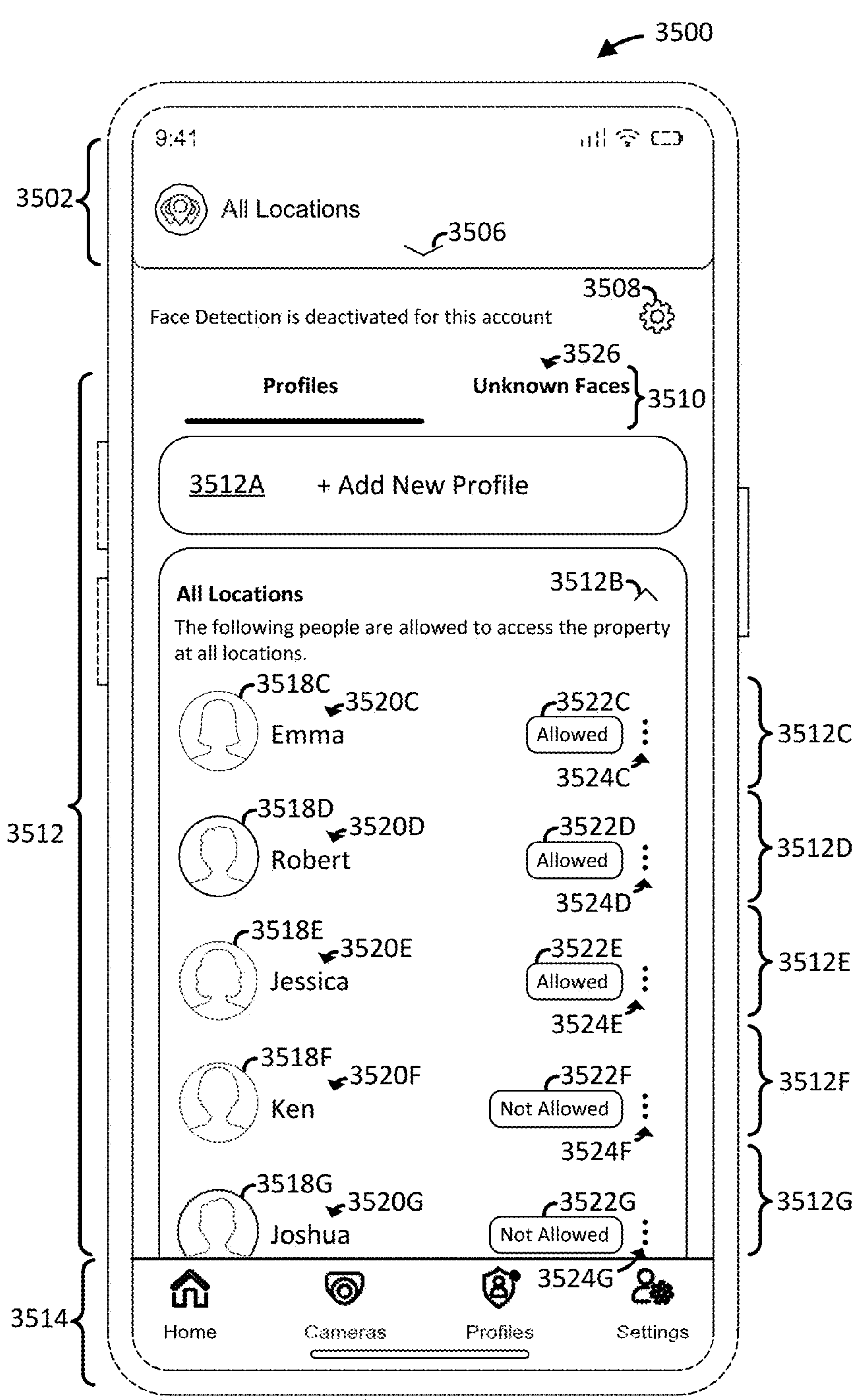
FIG. 35 is a front view of a profiles screen, according to some examples described herein.
Figure 39:
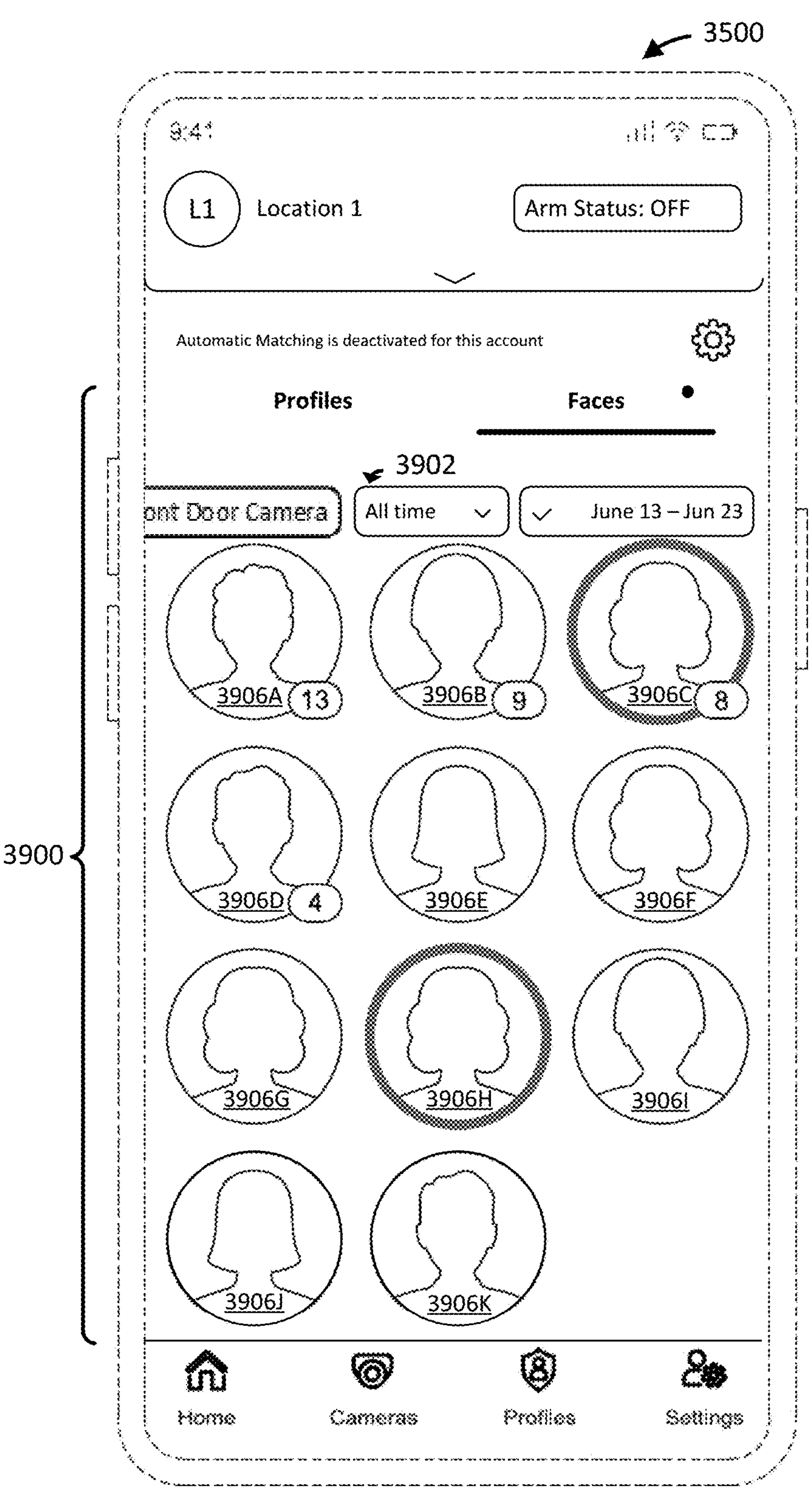
FIG. 39 is another front view of a profiles screen, according to some examples described herein.

Turning now to FIG. 34, the profiles screen provisioning process 3400 is illustrated. As shown in FIG. 34, the process 3400 starts with the app controlling the host mobile computing device to render 3402 a profiles screen via the touchscreen. FIG. 35 illustrates one example of a profiles screen 3500 that can be rendered in some examples. As shown in FIG. 35, the profiles screen 3500 includes a location control group 3502, an expansion control 3506, a face detection configuration control 3508, a profile control group 3510, and a menu control group 3514. The profile control group 3510 includes a profile list control group 3512 and a face list control group 3526, which is illustrated in FIG. 39 and described further below. The profile list control group 3512 includes an add new profile button 3512A, an optional location expansion control 3512B, and profile list entry controls 3512C-3512G. Individual list entry controls include face clip controls 3518 (shown as face clip controls 3518C-3518G), name controls 3520 (shown as name controls 3520C-3520G), status controls 3522 (shown as status controls 3522C-3522G), and edit controls 3524 (shown as edit controls 3524C-3524G).

In some examples, the location control group 3502, the expansion control 3506, and the menu control group 3514 operate within the screen 3500 as do the location control group 802, the expansion control 806, and the menu control group 814 within the screen 800. As such, the location control group 3502, the expansion control 3506, and the menu control group 3514 are not described further here for purposes of brevity.

In some examples, the user can select the face detection configuration control 3508 to navigate to a face detection preferences screen configured to interact with the user to establish or modify face detection preferences. For instance, in some examples, the face detection preferences screen includes controls configured to receive preferences regarding whether to activate or deactivate identification of individual persons by the security system via facial recognition processes.

Figure 37:
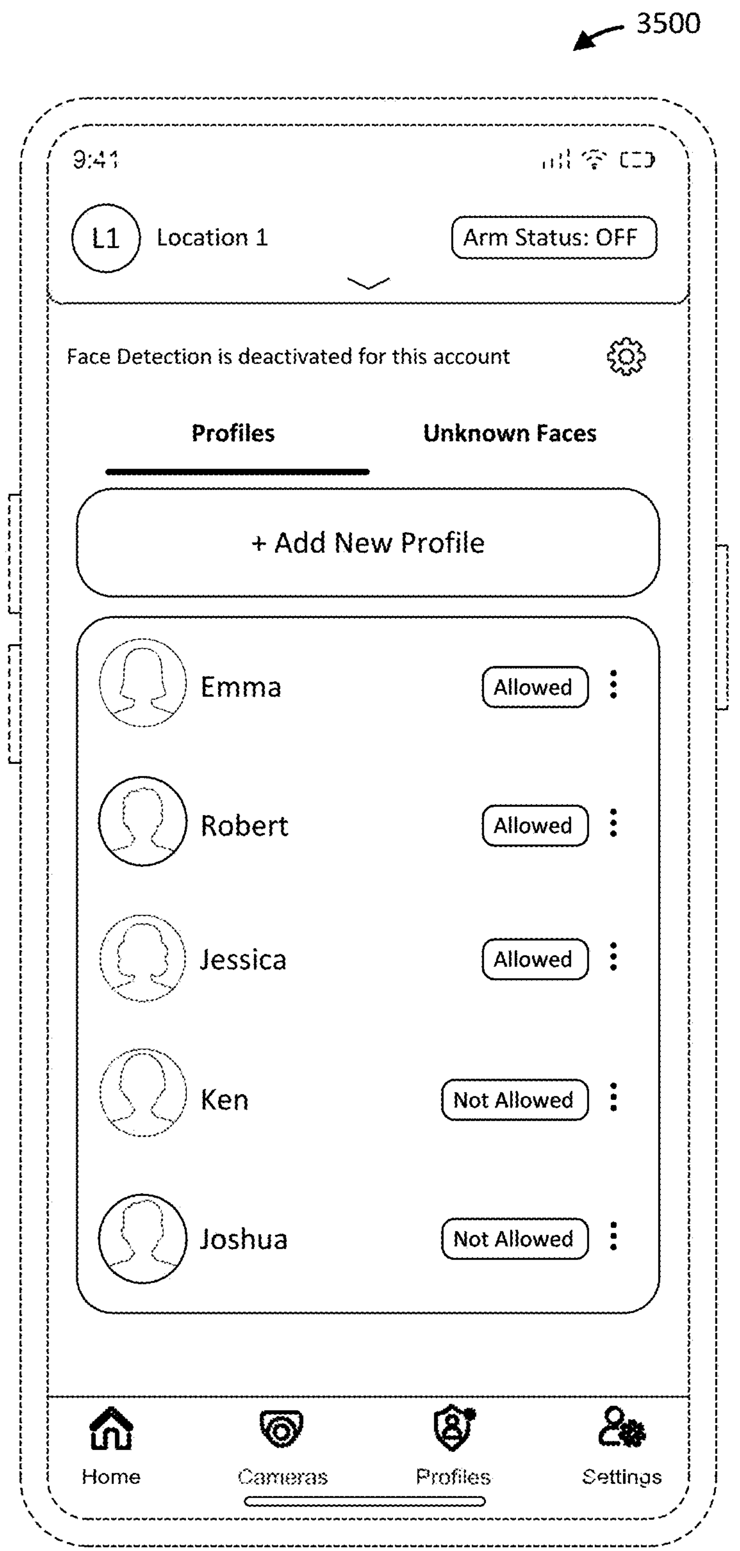
FIG. 37 is another front view of a profiles screen, according to some examples described herein.

In some examples, the user can interact with the profile control group 3510 to access either the profile list control group 3512 or the face list control group 3526. The profile list control group 3512 allows the user to initiate a new profile workflow by selecting the add new profile button 3512A or edit existing profiles by selecting one of the edit controls 3524. To indicate the identity of existing profiles associated with the profile list entry controls 3512C-3512G, individual list controls include a face clip of a profile within the profile face clips controls 3518, a name of the profile within the name controls 3520, and a permission status of the profile for the current location within the status controls 3522. The user can select the expansion control 3512B to expand or contract the profile list entry controls 3512C-3512G. The expansion control 3512B can be omitted from some examples, as illustrated in FIG. 37, which shows the screen 3500 where the currently selected location is L1 rather than all locations, as illustrated in FIG. 35.

Returning to the process 3400, the app receives 3404 input selecting a control of the screen 3500. For instance, in some examples, the app receives the input selecting the control by executing the processing described above with reference to the operation 704 of FIG. 7.

Continuing with the process 3400, the app determines 3406 which control of the screen 3500 is selected. For instance, in some examples, the app identifies the control and the type of selection by executing the processing described above with reference to the operation 706 of FIG. 7.

Continuing with the process 3400, if the app determines that the location control group 3502 is selected, the app sets the location context for the screen 3500 by executing the processing described above with reference to the operation 708 of FIG. 7.

Continuing with the process 3400, if the app determines that the expansion control 3506 is selected, the app executes the processing described above with reference to the operation 712 of FIG. 7.

Continuing with the process 3400, if the app determines that the alarm sensitivity control group (not shown in FIG. 35, but available via the expansion control 3506) is selected, the app executes the processing described above with reference to the operation 710 of FIG. 7.

Continuing with the process 3400, if the app determines that the menu control group 3514 is selected, the app executes the processing described above with reference to the operation 2806 of FIG. 28.

Figure 40:
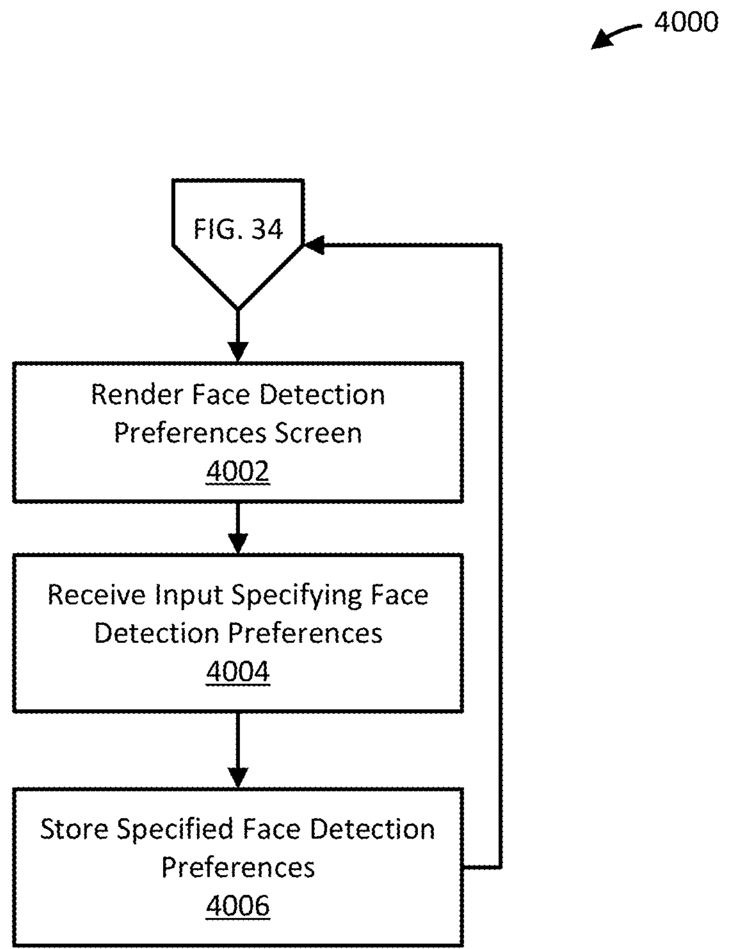
FIG. 40 is a flow diagram illustrating a face detection preferences configuration process, according to some examples described herein.

Continuing with the process 3400, if the app determines that face detection configuration control 3508 is selected, the app executes a face detection configuration process. FIG. 40 illustrates an example of such a process, configuration process 4000. As shown in FIG. 40, the process 4000 starts with the app controlling the host mobile computing device to render 4002 a configuration screen via the touchscreen. This configuration screen may include, for example, controls configured to prompt for and receive selection of face detection preferences to be used by the security system with regard to facial recognition processes.

Continuing with the process 4000, the app receives 4004, via the controls, user input specifying the face detection preferences to be used by the security system and stores 4006 the specified face detection preferences. It should be noted that, in some examples, the operation 4006 may include communication of the face detection preferences to other parts (e.g., the surveillance service and/or location-based devices) of the security system via one or more messages.

Figure 38:
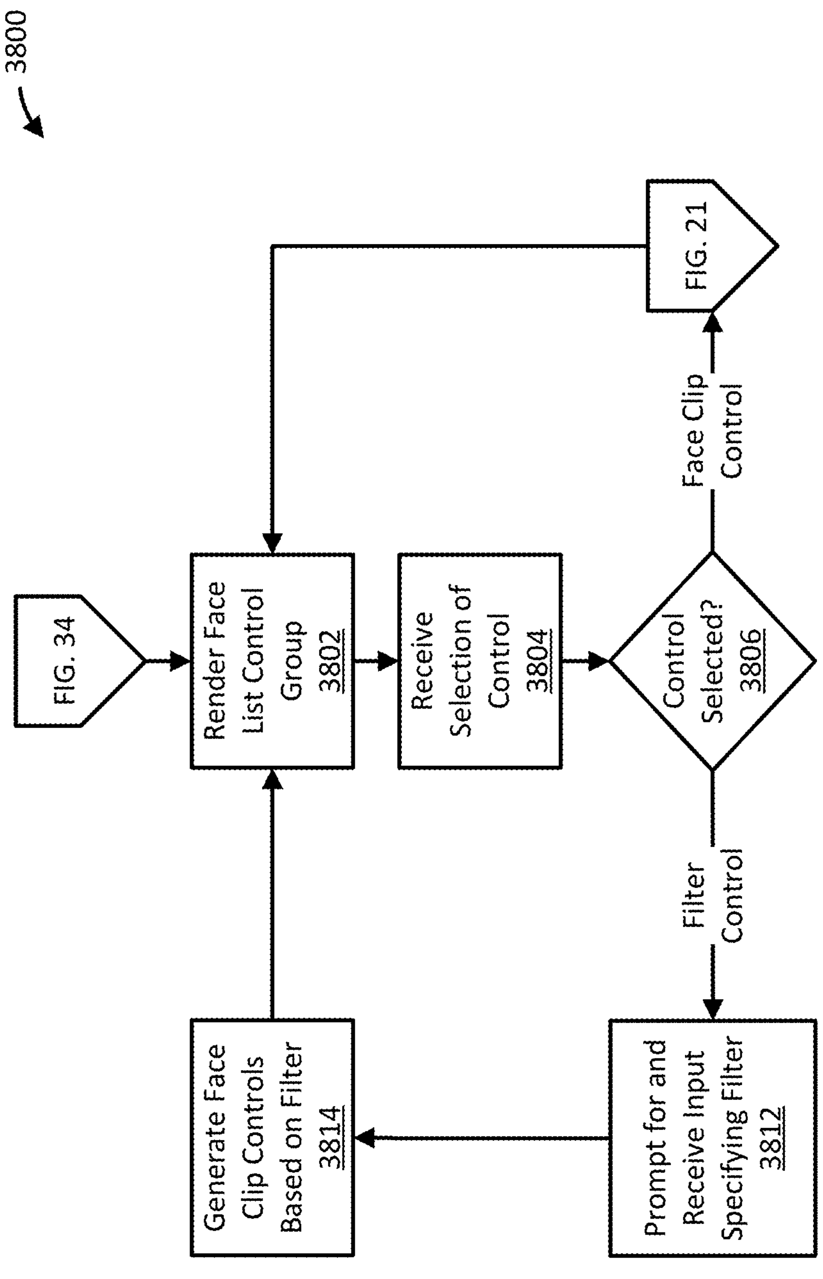
FIG. 38 is a flow diagram illustrating a face list control group handling process, according to some examples described herein.

Returning to the process 3400 of FIG. 34, if the app determines that a control of the unknown face list control group 3526 is selected, the app executes a face clip selection process. FIG. 38 illustrates an example of such a process, a face clip selection process 3800. As shown in FIG. 38, the process 3800 starts with the app controlling the host mobile computing device to render 3802 a faces control group via the touchscreen. FIG. 39 illustrates one example of a faces control group 3900 that can be rendered in some examples. As shown in FIG. 39, the faces control group 3900 includes a date filter control 3902 and face clip controls 3906A-3906K. In some examples, the faces control group 3900 further includes a camera filter control.

In some examples, individual face clip controls within the clip control group 3906 include a face clip (e.g., an image recognized by the security system as depicting a human face). In these examples, individual face clip controls can also include a number indicating a count of distinct face clips stored in the security system for the person. As shown in FIG. 39, the face clip control 3906A indicates that the security system has 13 face clips stored for the person depicted in the face clip control 3906A. Similarly, face clip controls 3906B-3906D indicate security system storage of 9, 8, and 4 face clips for the persons depicted in face clip controls 3906B-3906D. Where the security system stores only a single face clip for a person, no number may be included in the face clip control associated with the person, as illustrated by controls 3906E-3906K.

In some examples, the user can select any one of the controls 3906A-3906K to mark the control for subsequent processing. As shown in FIG. 39, controls 3906C and 3906H are marked. Marked controls can be highlighted (e.g., encircled) in some examples. Alternatively or additionally, in some examples, the user can select (e.g., via a long press operation) a particular face clip control to add to an existing profile or for which to create a new profile.

In some examples, the user can filter the face clip controls 3906A-3906K displayed by interacting with the filter controls described above. As shown in FIG. 39, the camera filter control is set to limit face clips to those acquired via a front door camera and the date filter control 3902 is set to limit face clips to those acquired between June 13th and June 23rd.

Returning to the process 3800, the app receives 3904 input selecting a control of the group 3900. For instance, in some examples, the app receives the input selecting the control by executing the processing described above with reference to the operation 704 of FIG. 7.

Continuing with the process 3800, the app determines 3806 which control of the group 3900 is selected. For instance, in some examples, the app identifies the control and the type of selection by executing the processing described above with reference to the operation 706 of FIG. 7.

Continuing with the process 3800, if the app determines that a face clip control of the face clip controls 3906A-3906K is selected, the app executes a profile selection process, such as the profile selection process 2100 described above with reference to FIG. 21.

Continuing with the process 3800, if the app determines that a filter control (e.g., the filter control 3902 of FIG. 39) of the group 3900 is selected, the app prompts for and receives 3812 input specifying values of attributes (e.g., originating camera/device, date range, etc.) for filtering the face clips prior to generating 3814 and displaying filtered face clip controls.

Figure 36:
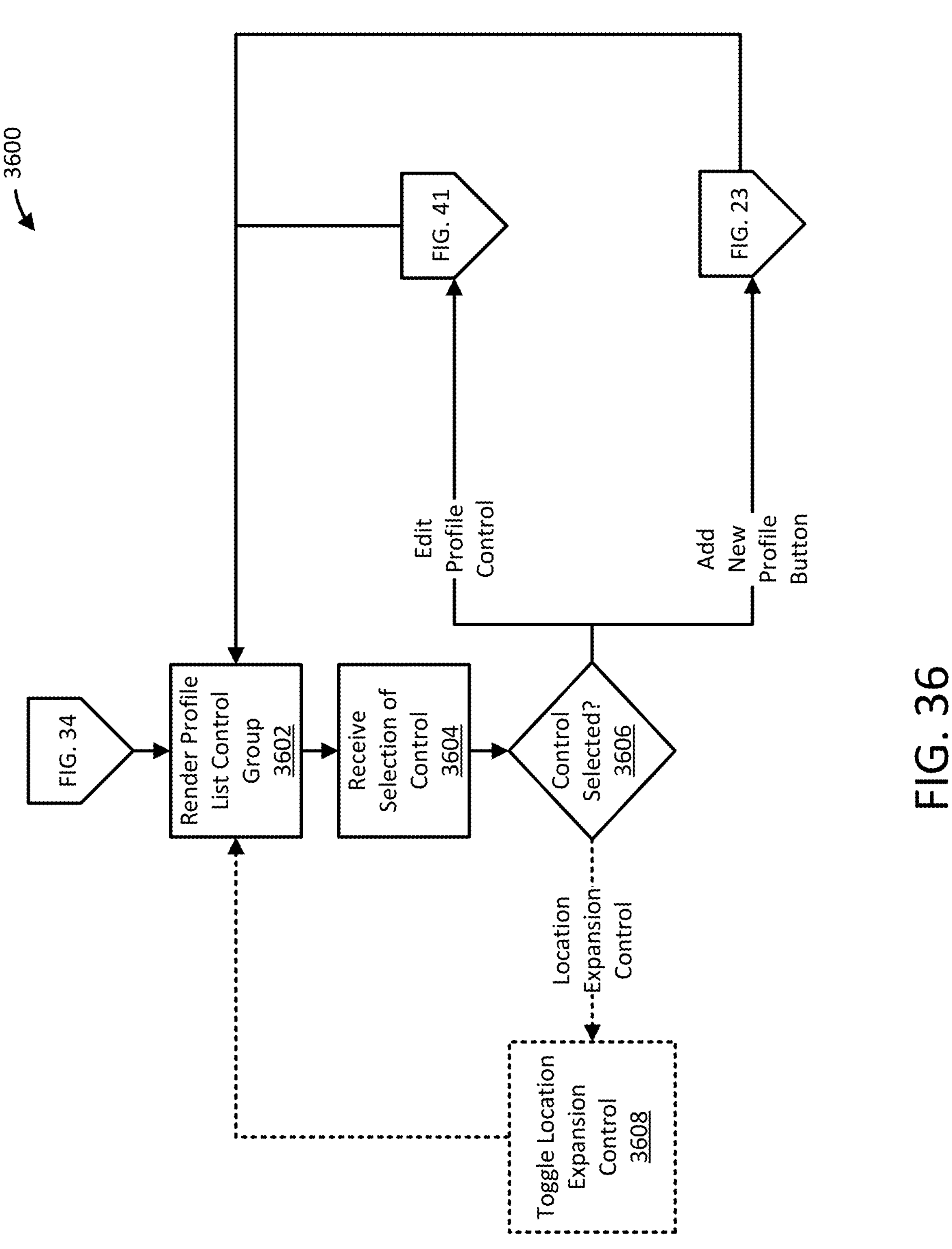
FIG. 36 is a flow diagram illustrating profile list control group handling process, according to some examples described herein.

Returning to the process 3400 of FIG. 34, if the app determines that a control of the profile list control group 3512 is selected, the app executes a profile review process. FIG. 36 illustrates an example of such a process, profile review process 3600. As shown in FIG. 36, the process 3600 starts with the app controlling the host mobile computing device to render 3602 a profiles control group (e.g., the profile list control group 3512 described above with reference to FIG. 35) via the touchscreen.

Continuing with the process 3600, the app receives 3604 input selecting a control of the group 3512. For instance, in some examples, the app receives the input selecting the control by executing the processing described above with reference to the operation 704 of FIG. 7.

Continuing with the process 3600, the app determines 3606 which control of the group 3512 is selected. For instance, in some examples, the app identifies the control and the type of selection by executing the processing described above with reference to the operation 706 of FIG. 7.

Continuing with the process 3600, if the app determines that the add new profile button 3512A is selected, the app begins execution of a new profile workflow by executing a face clip selection process, such as the face clip selection process 2300 described above with reference to FIG. 23.

Continuing with the process 3600, if the app determines that the location expansion control 3512B is selected, the app toggles the location expansion control 3512B between expanded and compressed states. For instance, as shown in FIG. 35, the control 3512B is in an expanded state and the profile list entry controls 3512C-3512G, which are associated with all locations, are shown. If the control 3512B is in a compressed state, the app visualizes the location expansion control 3512B without the profile list entry controls 3512C-3512G underneath. It should be noted that if the location context of the group 3512 is a specific location, some examples of the app omit the location expansion control 3512B, thereby conserving valuable touchscreen display area. FIG. 37 illustrates one such example.

Figure 41:
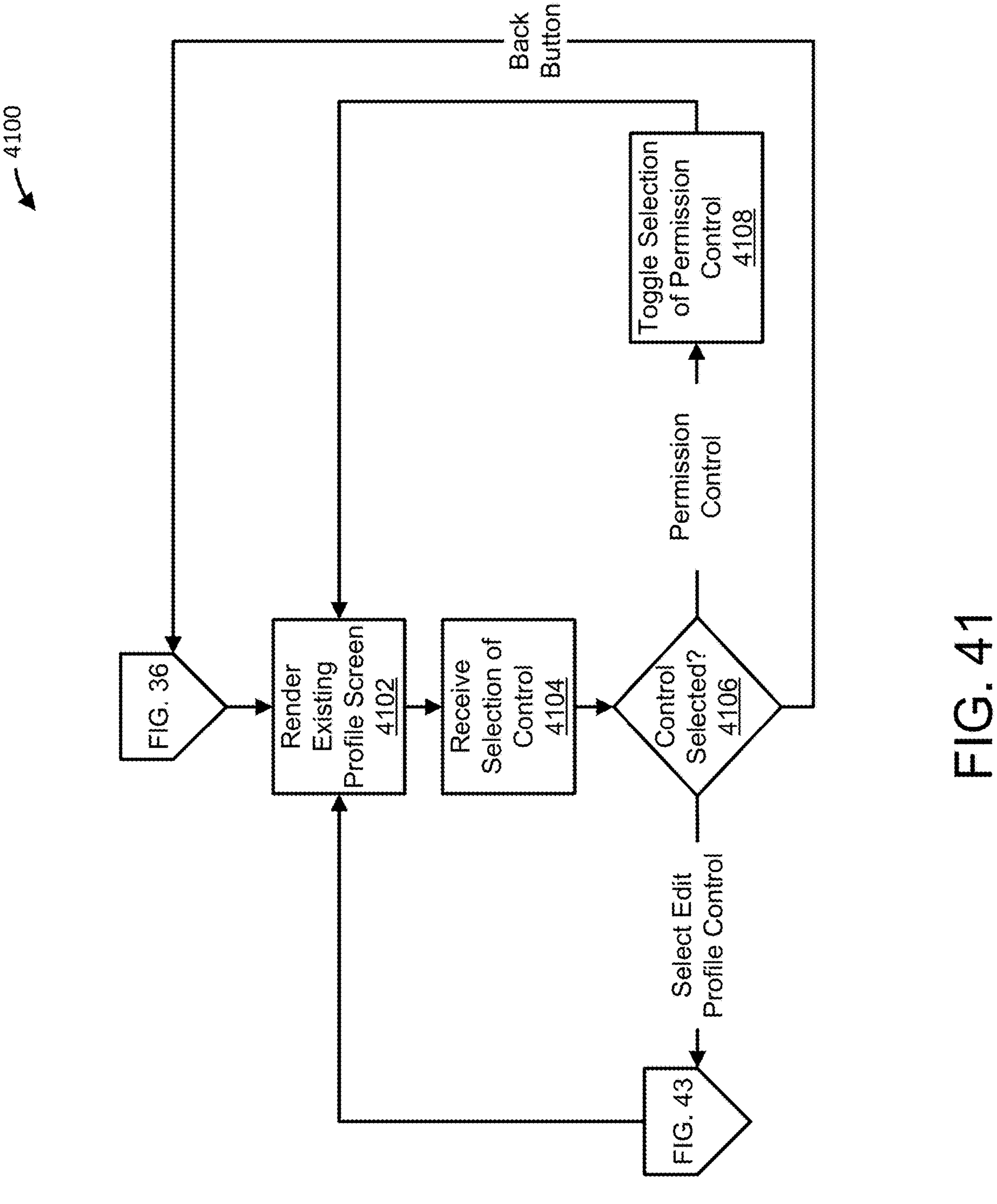
FIG. 41 is a flow diagram illustrating a profile review process, according to some examples described herein.
Figure 42:
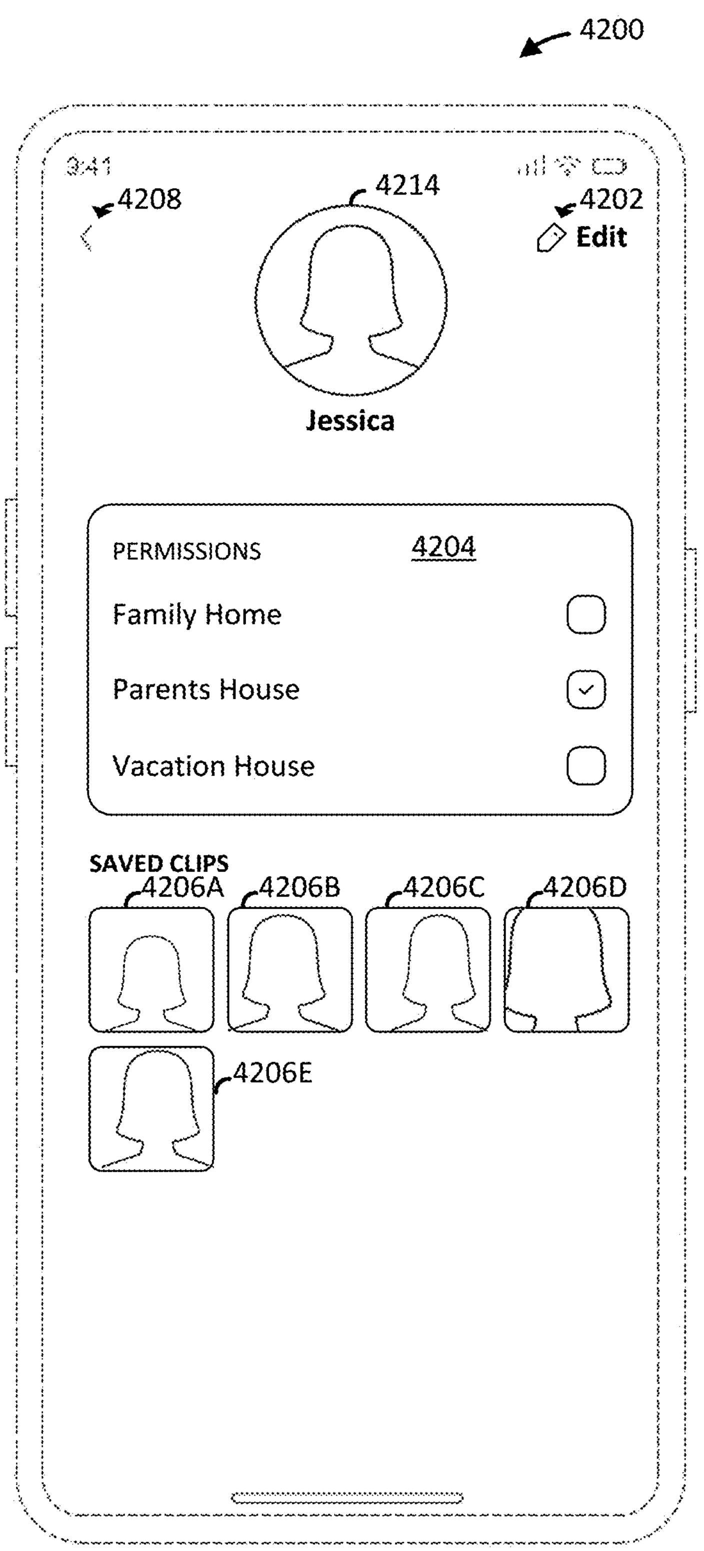
FIG. 42 is a front view of a profile review screen, according to some examples described herein.

Continuing with the process 3600, if the app determines that one of the edit profile controls 3524 is selected, the app executes a profile review process for the profile associated with the selected control. FIG. 41 illustrates an example of such a process, profile review process 4100. As shown in FIG. 41, the process 4100 starts with the app controlling the host mobile computing device to render 4102 a profile review screen via the touchscreen. FIG. 42 illustrates one example of a profile review screen 4200 that can be rendered in some examples. As shown in FIG. 42, the profile review screen 4200 includes an edit control 4202, a permissions list control 4204, saved clip controls 4206A-4206E, a back control 4208, and a profile clip control 4214.

In some examples, the profile clip control 4214 includes a profile name and a face clip representative of the person associated with the profile being viewed. If no face clips have been selected for the profile, the app may include a generic image within the profile clip control 4214. The name can include a textual identifier of the profile (e.g., a person's name). The permissions list control 4204 indicates locations at which the person in the profile is welcome to visit without initiating an alarm. The saved clip controls 4206A-4206E include face clips that are currently associated with the profile.

In some examples, the user can navigate to a screen to edit the existing profile by selecting the edit control 4202. The user can navigate to the previous screen by selecting the back control 4208.

Returning to the process 4100, the app receives 4104 input selecting a control of the screen 4200. For instance, in some examples, the app receives the input selecting the control by executing the processing described above with reference to the operation 704 of FIG. 7.

Continuing with the process 4100, the app determines 4106 which control of the screen 4200 is selected. For instance, in some examples, the app identifies the control and the type of selection by executing the processing described above with reference to the operation 706 of FIG. 7.

Continuing with the process 4100, if the app determines that the back control 4208 is selected, the app returns to the previously executing process. If the app determines that a control of the permissions list control 4204 was selected, the app toggles 4108 marking of the selected control.

Figure 43:
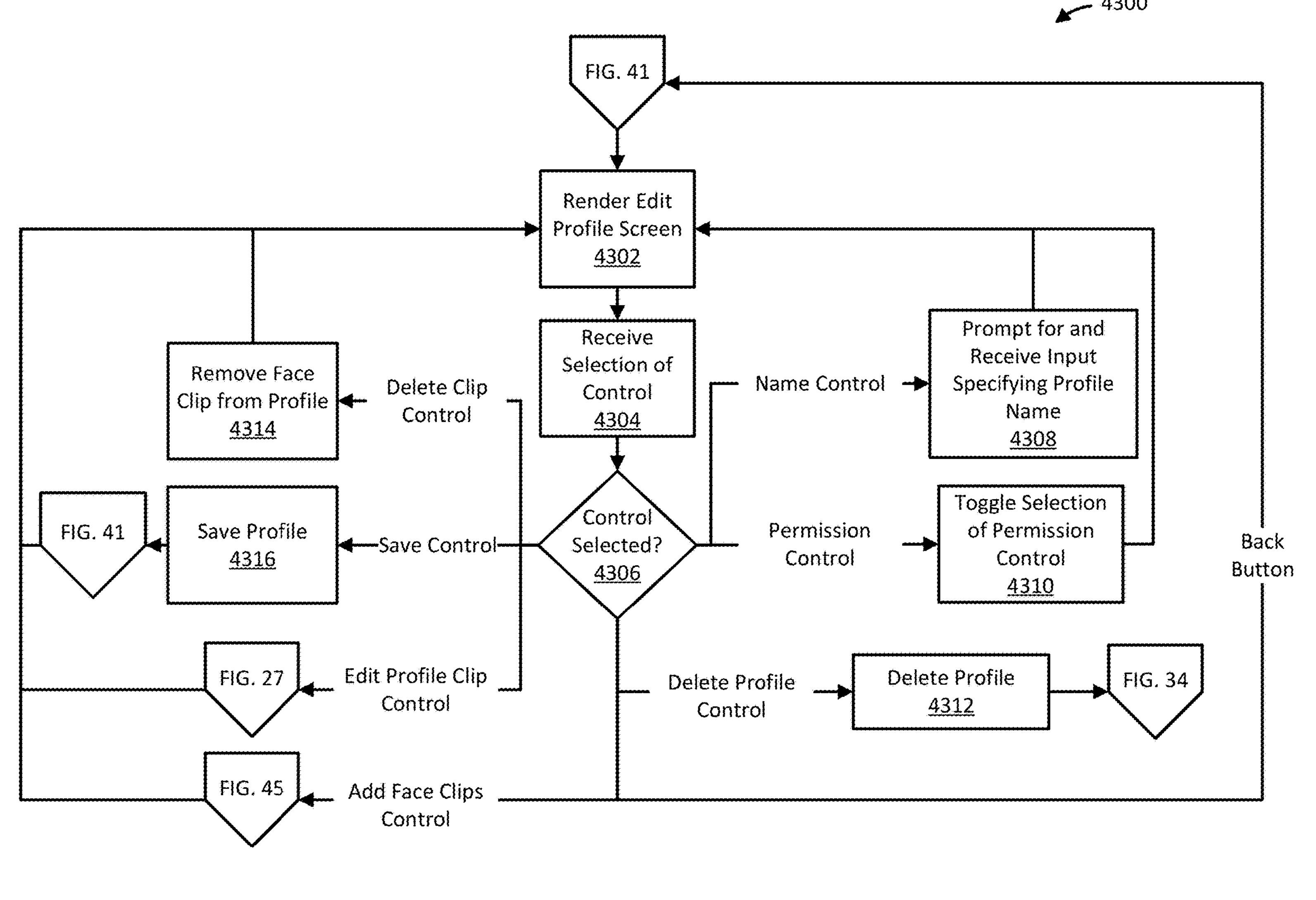
FIG. 43 is a flow diagram illustrating a profile editing, according to some examples described herein.
Figure 44:
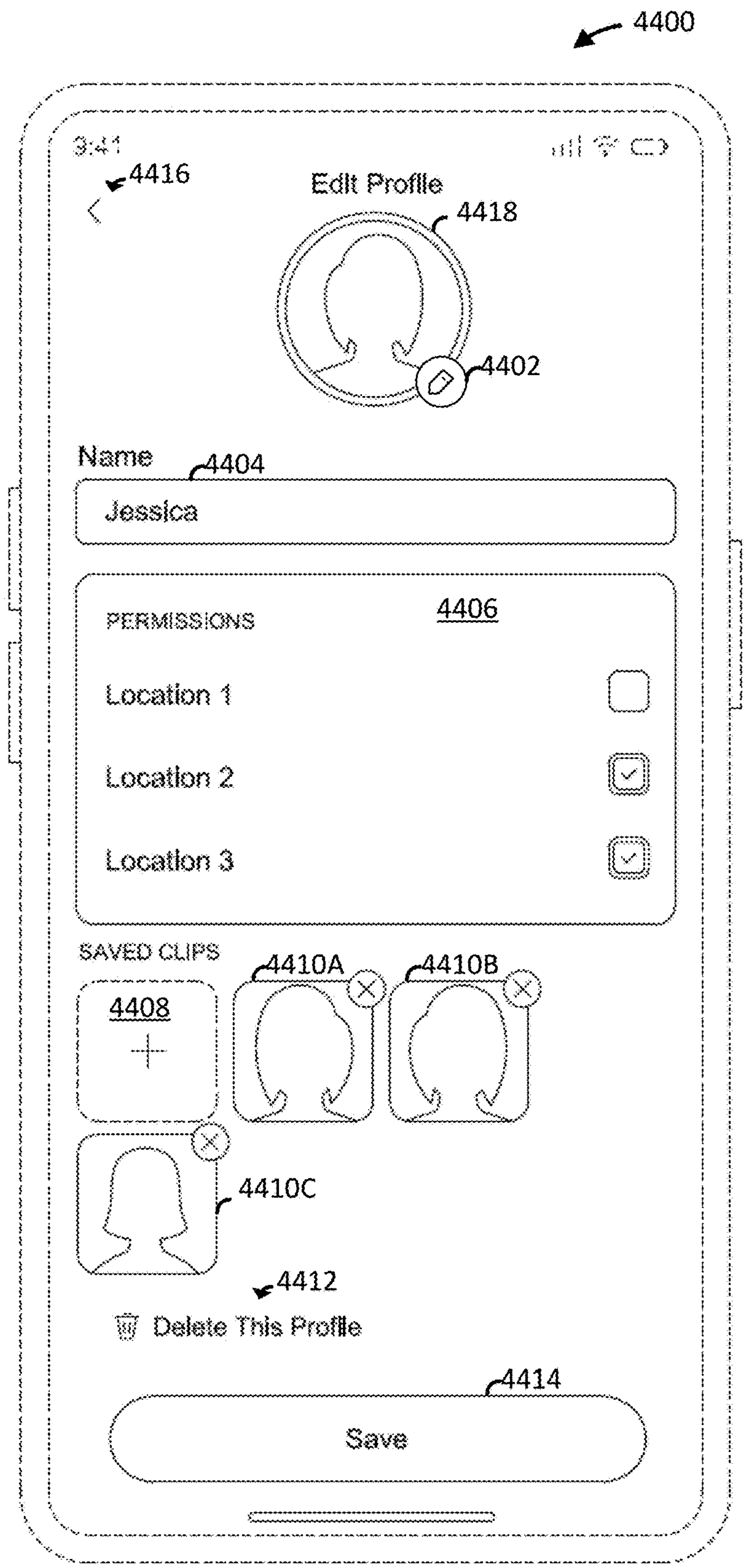
FIG. 44 is a front view of a profile editing screen, according to some examples described herein.

Continuing with the process 4100, if the app determines that the edit profile control 4202 is selected, the app executes a profile editing process. FIG. 43 illustrates an example of such a process, profile editing process 4300. As shown in FIG. 43, the process 4300 starts with the app controlling the host mobile computing device to render 4302 an edit profile screen via the touchscreen. FIG. 44 illustrates one example of an edit profile screen 4400 that can be rendered in some examples. As shown in FIG. 44, the edit profile screen 4400 includes an edit profile clip button 4402, a profile name control 4404, a permissions list control 4406, an add clip control 4408, delete clip controls 4410A-4410C, a delete profile control 4412, a save profile button 4414, a back control 4416, and profile clip control 4418.

In some examples, the profile clip control 4418 includes a face clip representative of the person associated with the profile being edited. If no face clips have been selected for the profile, the app may include a generic image within the profile clip control 4418. The name control 4404 can include a textual identifier of the profile (e.g., a person's name). The permissions list control 4406 indicates locations at which the person in the profile is welcome to visit without initiating an alarm. The delete clip controls 4410A-4410C include face clips that are currently associated with the profile (e.g., by being marked within the screen 2400 of FIG. 24).

In some examples, the user can effectuate a number of changes to the current profile of the save profile screen 4400 via the controls included therein. For instance, in certain examples, the user can change the face clip displayed in the profile clip control by selecting the edit profile clip button 4402. The user can select the name control 4404 to enter a name for the profile. The user can select a control within the permissions list control 4406 to mark a location associated with the control as being welcome to visitation by the person associated with the profile without sounding an alarm. The user can select one of the delete clip controls 4410A-4410C to disassociate the face clip depicted within the control from the profile. The user can navigate to a screen to associate additional face clips with the profile by selecting the add clip control 4408. The user can delete the profile by selecting the delete profile control 4412. The user can save changes made to the profile by selecting the save profile button 4414. The user can navigate to the previous screen by selecting the back control 4416.

Returning to the process 4300, the app receives 4304 input selecting a control of the screen 4400. For instance, in some examples, the app receives the input selecting the control by executing the processing described above with reference to the operation 704 of FIG. 7.

Continuing with the process 4300, the app determines 4306 which control of the screen 4400 is selected. For instance, in some examples, the app identifies the control and the type of selection by executing the processing described above with reference to the operation 706 of FIG. 7.

Continuing with the process 4300, if the app determines that the back button 4416 is selected, the app returns to the previously executing process. If the app determines that the name control 4404 is selected, the app prompts for and receives 4308 input specifying a name for the profile. If the app determines that a control of the permissions list control 4406 was selected, the app toggles 4310 marking of the selected control. If the app determines that the delete profile control 4412 is selected, the app removes 4312 the profile from the security system. If the app determines that a delete clip control (e.g., one of delete clip controls 4410A-4410C) is selected, the app disassociates 4314 the selected face clip depicted within the selected control from the profile. If the app determines that the save profile button 4414 is selected, the app saves 4316 the profile. It should be noted that the operations 4312 and 4316 may involve altering profile information locally and remotely, so that the security system as a whole can utilize the information.

Continuing with the process 4300, if the app determines that the edit profile clip button 4402 is selected, the app executes a configuration process to update the face clip associated with the profile, such as the process 2700 described above with reference to FIG. 27.

Figure 45:
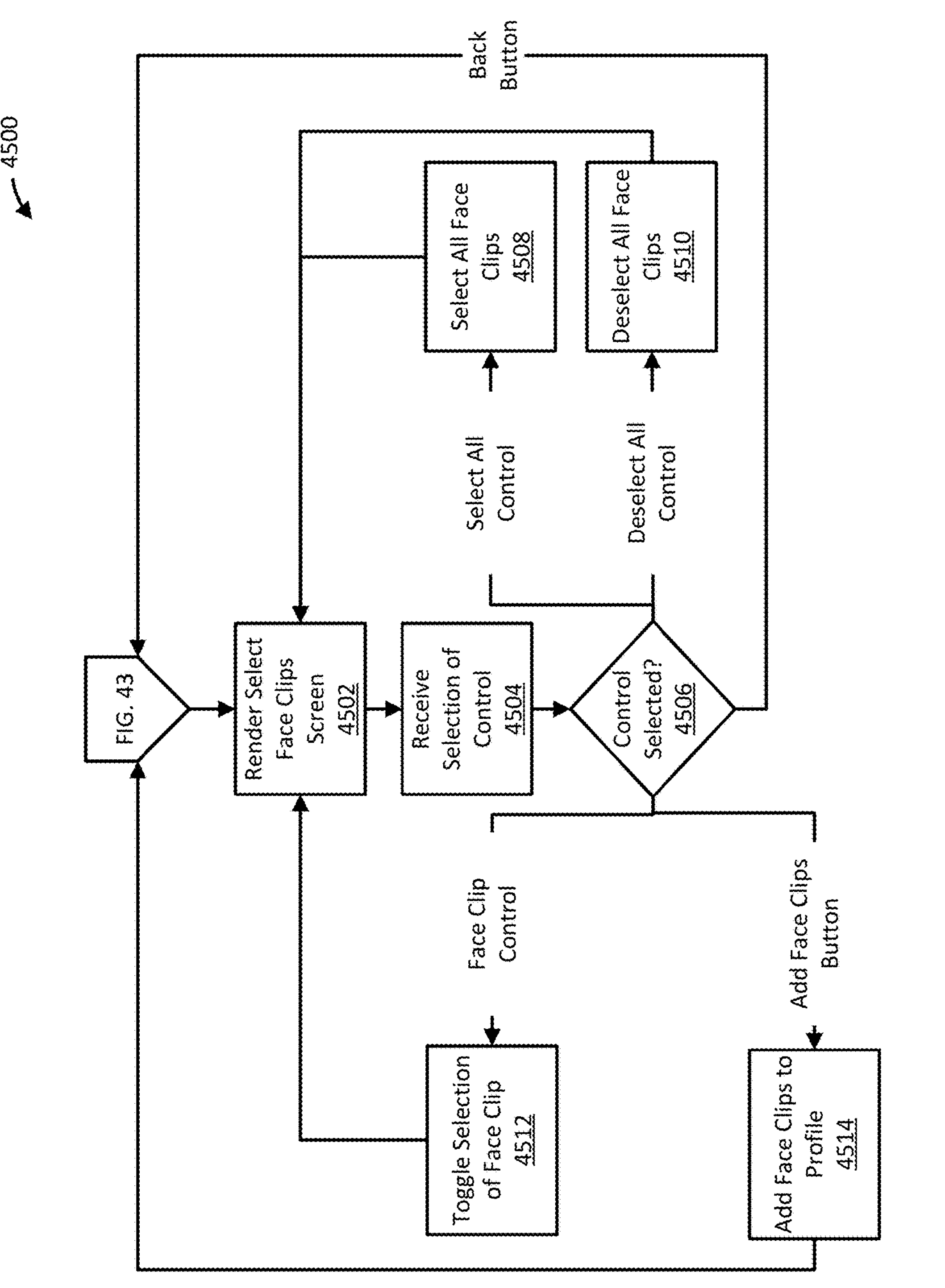
FIG. 45 is a flow diagram illustrating process to add face clips to a profile, according to some examples described herein.
Figure 46:
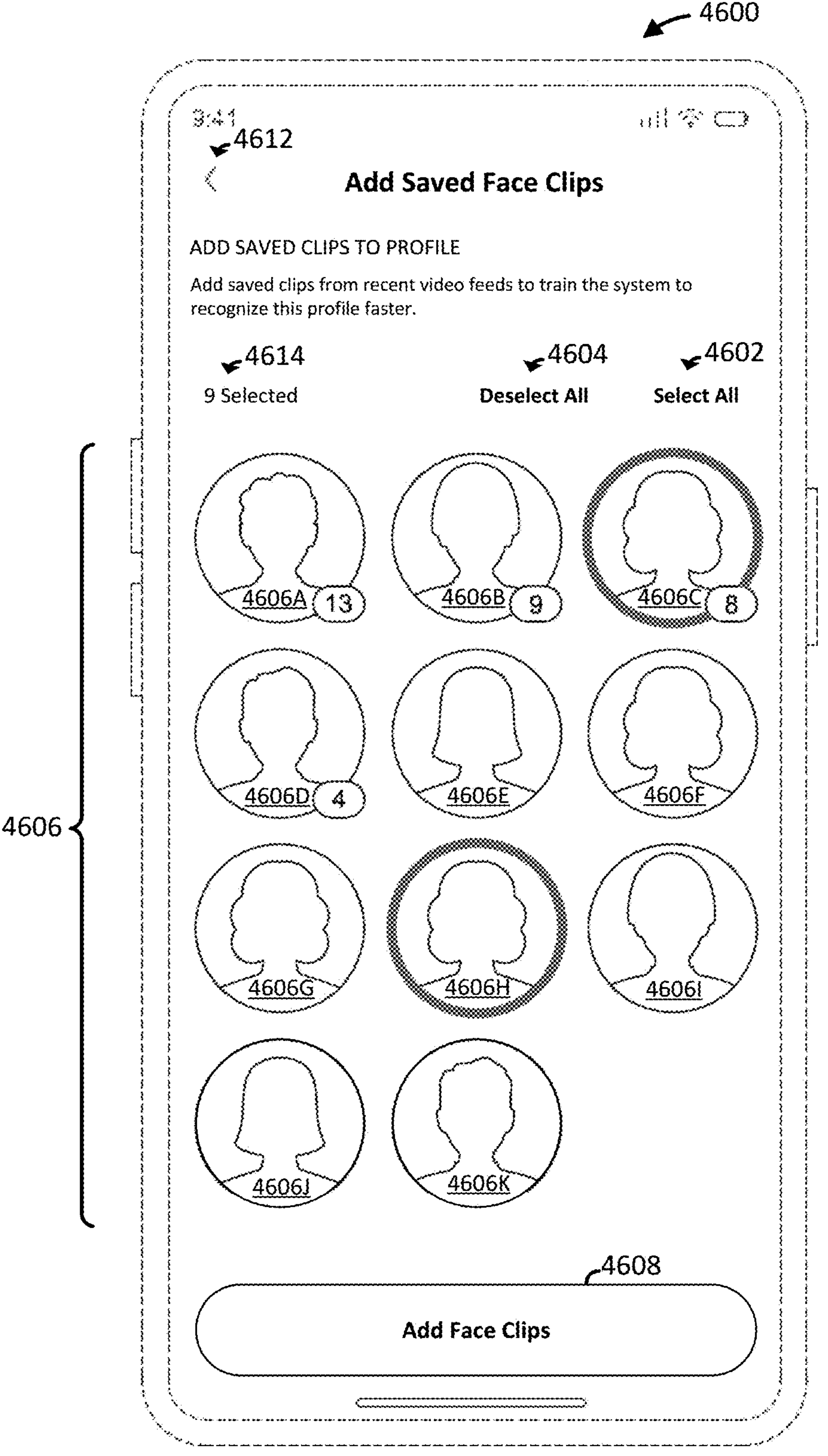
FIG. 46 is a front view of an add face clips screen, according to some examples described herein.

Continuing with the process 4300, if the app determines that the add face clips control 4408 is selected, the app executes a face clip selection process. FIG. 45 illustrates an example of such a process, a face clip selection process 4500. As shown in FIG. 45, the process 4500 starts with the app controlling the host mobile computing device to render 4502 a face clips selection screen via the touchscreen. FIG. 46 illustrates one example of a face clips selection screen 4600 that can be rendered in some examples. As shown in FIG. 46, the screen 4600 includes a select all control 4602, a deselect all control 4604, a clip control group 4606, an add button 4608, a back button 4612, and a total selected control 4614. The clip control group 4606 includes face clip controls 4606A-4606K.

In some examples, individual face clip controls within the clip control group 4606 include a face clip of a person. In these examples, individual face clip controls can also include a number indicating a count of distinct face clips stored in the security system for the person. As shown in FIG. 46, the face clip control 4606A indicates that the security system has 13 face clips stored for the person depicted in the face clip control 4606A. Similarly, face clip controls 4606B-4606D indicate security system storage of 9, 8, and 4 face clips for the persons depicted in face clip controls 4606B-4606D. Where the security system stores only a single face clip for a person, no number may be included in the face clip control associated with the person, as illustrated by controls 4606E-4606K. Further, in some examples, the total selected control 4614 indicates a total number of face clips currently marked for subsequent processing.

In some examples, the user can select any one of the controls 4606A-4606K to mark the control for subsequent processing. As shown in FIG. 46, controls 4606C and 4606H are marked. Marked controls can be highlighted (e.g., encircled) in some examples.

In some examples, the user can select the deselect all control 4604 to unmark all face clip controls within the control group 4606, and the user can select the select all control 4602 to mark all face clip controls within the control group 4606. In certain examples, the user can select the add button 4608 to associate marked face clips with the profile being edited. The user can select the back button 4612 to return to the previous screen.

Returning to the process 4500, the app receives 4504 input selecting a control of the screen 4600. For instance, in some examples, the app receives the input selecting the control by executing the processing described above with reference to the operation 704 of FIG. 7.

Continuing with the process 4500, the app determines 4506 which control of the screen 4600 is selected. For instance, in some examples, the app identifies the control and the type of selection by executing the processing described above with reference to the operation 706 of FIG. 7.

Continuing with the process 4500, if the app determines that the back button 4612 is selected, the app returns to the previously executing process. If the app determines that the select all control 4602 is selected, the app marks 4508 all face clip controls 4606A-4606K. If the app determines that the deselect all control 4604 is selected, the app unmarks 4510 all marked face clip controls 4606A-4606K. If the app determines that one of the face clip controls 4606A-4606K is selected, the app toggles 4512 marking of the selected face clip control for subsequent processing. If the app determines that the add button 4608 is selected, the app associates 4514 the face clips included in the marked face clip controls with the profile.

Figure 47:
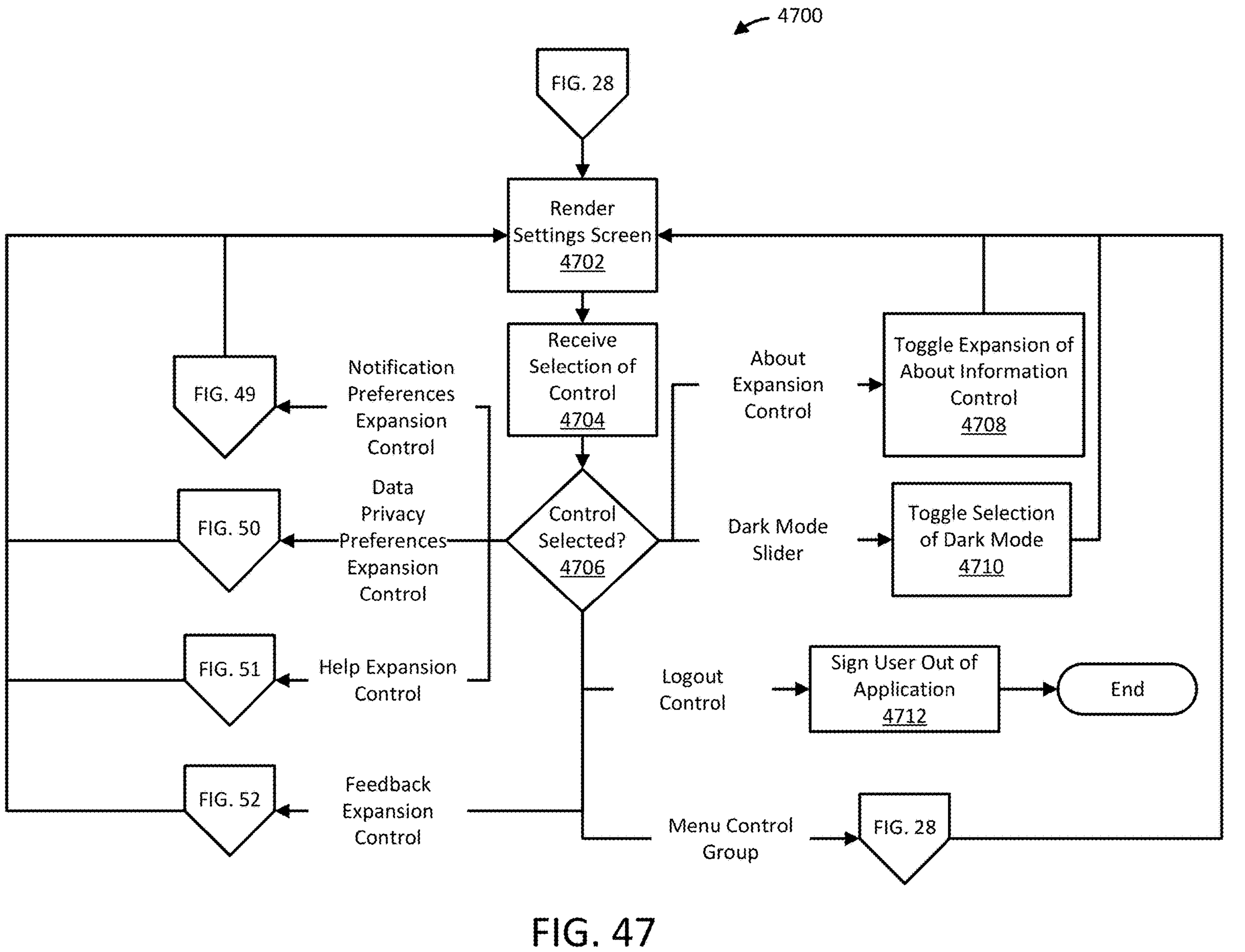
FIG. 47 is a flow diagram illustrating settings screen provisioning process, according to some examples described herein.
Figure 48:
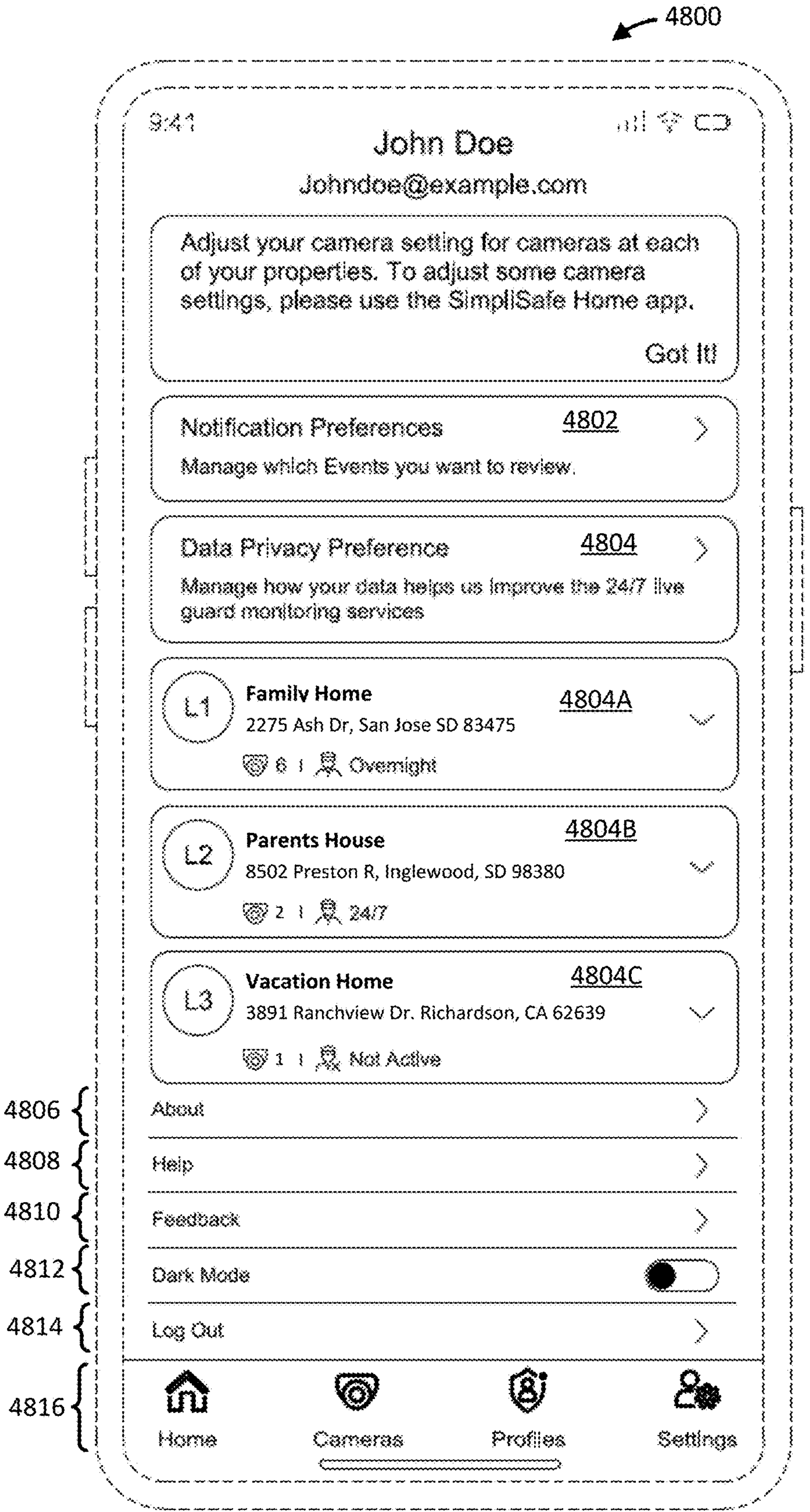
FIG. 48 is a front view of settings screen, according to some examples described herein.

Turning now to FIG. 47, the settings screen provisioning process 4700 is illustrated. As shown in FIG. 47, the process 4700 starts with the app controlling the host mobile computing device to render 4702 a settings screen via the touchscreen. FIG. 48 illustrates one example of a settings screen 4800 that can be rendered in some examples. As shown in FIG. 48, the settings screen 4800 includes a notification preferences control group 4802, a data privacy control group 4804, an about control 4806, a help control 4808, a feedback control 4810, a dark mode slider 4812, a log out control 4814, and a menu control group 4816.

In some examples, the menu control group 4816 operates within the screen 4800 as does the menu control group 814 within the screen 800. As such, the menu control group 4816 is not described further here for purposes of brevity.

In some examples, the user can select the notification preferences control group 4802 to access (e.g., via expansion of the group 4802) notification preferences controls configured to interact with the user to establish or modify notification preferences. For instance, in some examples, these notification preferences include preferences regarding push notifications, such as whether to notify the user when a reportable event (e.g., an alarm) occurs, whether to push notifications through muted or silenced phone settings, and/or whether to notify the user when a malfunction of the security system occurs.

In some examples, the user can select the data privacy preferences control group 4804 to access (e.g., via expansion of the group 4804) privacy preferences controls configured to interact with the user to establish or modify privacy preferences. For instance, in some examples, these privacy preferences include preferences regarding whether particular cameras are monitored by monitoring personnel and, if so, at what times. As shown in FIG. 48, the group 4804 is expanded and displays privacy preference controls 4804A-4804C. Individual privacy preference controls 4804A-4804C include textual identifiers of the locations (name and address), the number of cameras being monitored, and the type of monitoring service being carried out. In certain examples, the user can edit the privacy preferences for a location by selecting the privacy preference control associated with the location.

In some examples, the user can select the about control 4806 to access (e.g., via expansion of the control 4806) information about the app version and, in some examples, numbers, models, and software versions for location-based devices included in the security system. The user can select the help control 4808 to access (e.g., via expansion of the group 4808) help controls configured to interact with the user to receive and respond to help requests. The user can select the feedback control 4810 to access (e.g., via expansion of the control 4810) feedback controls configured to interact with the user to receive and record user feedback. The user can configure the app to execute in dark mode by selecting the slider 4812. The user can log out of the app by selecting the log out control 4814.

Returning to the process 4700, the app receives 4704 input selecting a control of the screen 4800. For instance, in some examples, the app receives the input selecting the control by executing the processing described above with reference to the operation 704 of FIG. 7.

Continuing with the process 4700, the app determines 4706 which control of the screen 4800 is selected. For instance, in some examples, the app identifies the control and the type of selection by executing the processing described above with reference to the operation 706 of FIG. 7.

Continuing with the process 4700, if the app determines that the menu control group 4816 is selected, the app executes the processing described above with reference to the operation 2806 of FIG. 28.

Continuing with the process 4700, if the app determines that the about control 4806 is selected, the app toggles 4708 the state of the about control between expanded and compressed states, thereby visualizing or obscuring information about the app, such as its current version. If the app determines that the dark mode slider 4812 is selected, the app toggles 4710 its display mode between light and dark modes. If the app determines that the logout control 4814 is selected, the app logs the currently authenticated user out of the app. In some examples, the app ceases execution subsequent to the operation 4712.

Figure 49:
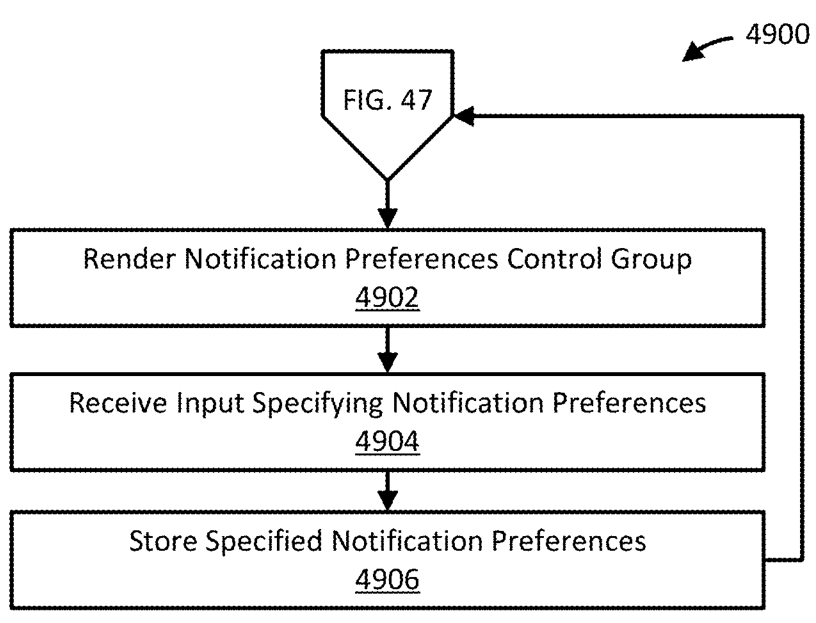
FIG. 49 is a flow diagram illustrating a notification preferences configuration process, according to some examples described herein.

Continuing with the process 4700, if the app determines that the notification preferences control group 4802 is selected, the app toggles the group 4802 between an expanded and compressed state. If the state toggled to is the expanded state, the app executes a configuration process to update notification preferences. FIG. 49 illustrates an example of such a process, configuration process 4900. As shown in FIG. 49, the process 4900 starts with the app controlling 4902 the host mobile computing device to render a notification preferences control group. This notification preferences control group may include, for example, controls configured to prompt for and receive notification configuration information. This notification configuration information may specify, for example, whether a user wishes to receive push notifications at all, whether to notify the user when a reportable event (e.g., an alarm) occurs, whether to push notifications through muted or silenced phone settings, and/or whether to notify the user when a malfunction of the security system occurs. Other examples of notification configuration information will be apparent with the benefit of this disclosure.

Continuing with the process 4900, the app receives 4904, via the controls, user input specifying the notification configuration information and stores 4906 the notification configuration information. It should be noted that, in some examples, the operation 4906 may include communication of the notification information to other parts (e.g., the surveillance service and/or the location-based devices) of the security system via one or more messages. These other parts of the security system may apply the notification configuration information to, for example, cease or start communication of push notifications to the host mobile computing device. Concluding the process 4900, the app resumes execution of the process 4700.

Figure 50:
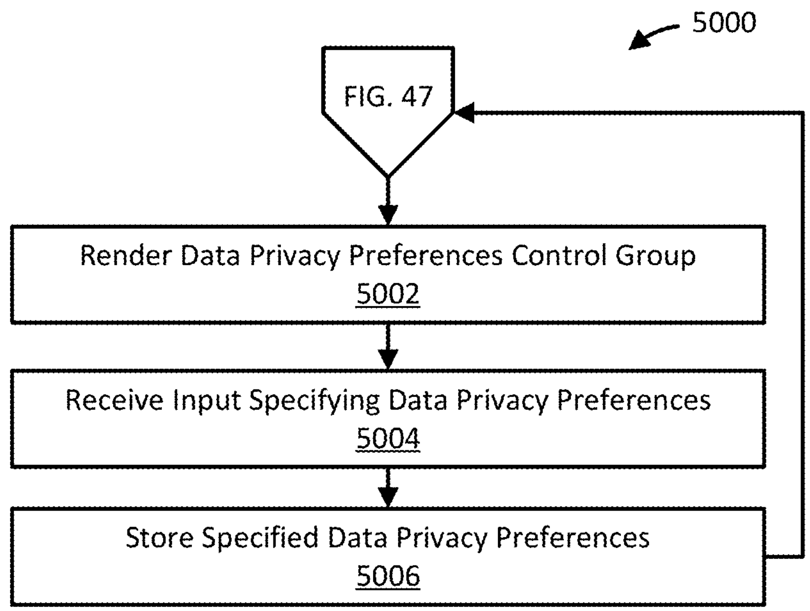
FIG. 50 is a flow diagram illustrating a data privacy preferences configuration process, according to some examples described herein.

Continuing with the process 4700, if the app determines that the data privacy preferences control group 4804 is selected, the security toggles the group 4804 between an expanded and compressed state. If the state toggled to is the expanded state, the app executes a configuration process to update data privacy preferences. FIG. 50 illustrates an example of such a process, configuration process 5000. As shown in FIG. 50, the process 5000 starts with the app controlling 5002 the host mobile computing device to render a data privacy preferences control group. This data privacy preferences control group may include, for example, controls (e.g., the privacy preference controls 4804A-4804C) configured to prompt for and receive data privacy configuration information. This data privacy configuration information may specify, for example, a level of service provided by monitoring personnel at a location and/or for specific location-based devices at the location. Other examples of data privacy configuration information will be apparent with the benefit of this disclosure.

Continuing with the process 5000, the app receives 5004, via the controls, user input specifying the data privacy configuration information and stores 5006 the data privacy configuration information. It should be noted that, in some examples, the operation 5006 may include communication of the data privacy information to other parts (e.g., the surveillance service and/or the location-based devices) of the security system via one or more messages. These other parts of the security system may apply the data privacy configuration information to, for example, cease or start communication of information acquired by location-based devices to monitoring interfaces and/or deny or grant access to location-based devices via a monitoring interface. Concluding the process 5000, the app resumes execution of the process 4700.

Figure 51:
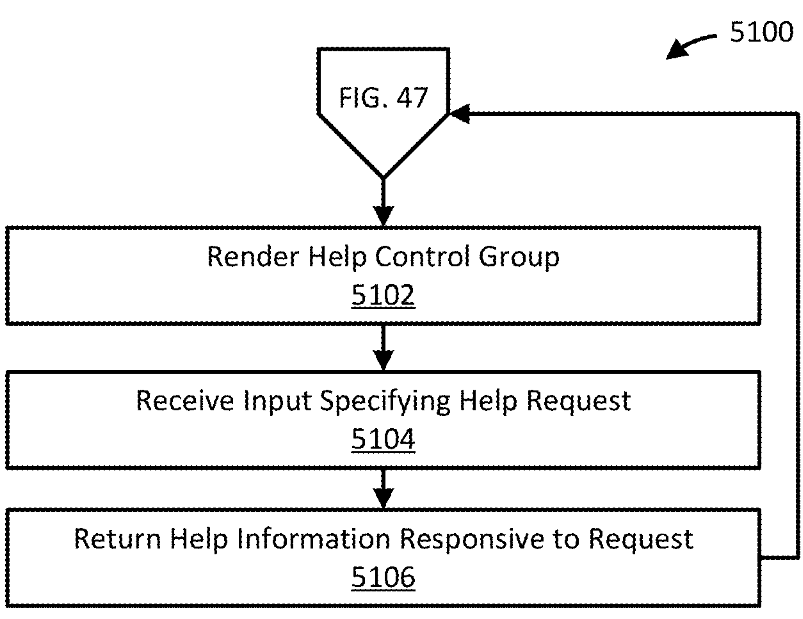
FIG. 51 is a flow diagram illustrating help request process, according to some examples described herein.

Continuing with the process 4700, if the app determines that the help control group 4808 is selected, the security toggles the group 4808 between an expanded and compressed state. If the state toggled to is the expanded state, the app executes a help request process. FIG. 51 illustrates an example of such a process, help request process 5100. As shown in FIG. 51, the process 5100 starts with the app controlling 5102 the host mobile computing device to render a help request control group. This help request control group may include, for example, controls configured to prompt for and receive help request information. This help request information may specify, for example, a query regarding one or more features of the security system. Other examples of help request information will be apparent with the benefit of this disclosure.

Continuing with the process 5100, the app receives 5104, via the controls, user input specifying the help request information and returns 5106 a response to the help request. The response returned can vary between examples. For instance, in some examples, the response may include FAQ information related to the topic of the help request. Alternatively or additionally, the response by include an interactive, conversation response generated by helpdesk personnel or a helpdesk chatbot. As such, the operation 5106 may include communication of the help request information to other parts (e.g., the surveillance service and/or the location-based devices) of the security system via one or more messages. Concluding the process 5100, the app resumes execution of the process 4700.

Figure 52:
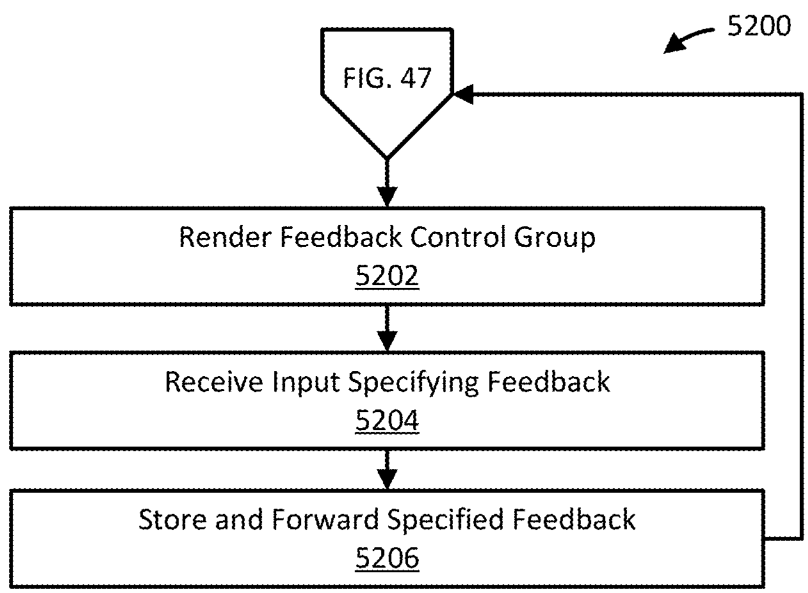
FIG. 52 is a flow diagram illustrating feedback provision process, according to some examples described herein.

Continuing with the process 4700, if the app determines that the feedback control 4810 is selected, the security toggles the control 4810 between an expanded and compressed state. If the state toggled to is the expanded state, the app executes a feedback collection process. FIG. 52 illustrates an example of such a process, feedback collection process 5200. As shown in FIG. 52, the process 5200 starts with the app controlling 5202 the host mobile computing device to render a feedback control group. The feedback control group may include, for example, controls configured to prompt for and receive feedback information. This feedback information may specify, for example, suggestions for improvement of features of the security system. Other examples of feedback information will be apparent with the benefit of this disclosure.

Continuing with the process 5200, the app receives 5204, via the controls, user input specifying the feedback information and stores and forwards 5206 the feedback information to a centralized repository of feedback information maintained at a data center (e.g., the data center environment 124 of FIG. 1). As such, the operation 5206 may include communication of the feedback information to other parts (e.g., the surveillance service) of the security system via one or more messages. Concluding the process 5200, the app resumes execution of the process 4700.

Figure 54:
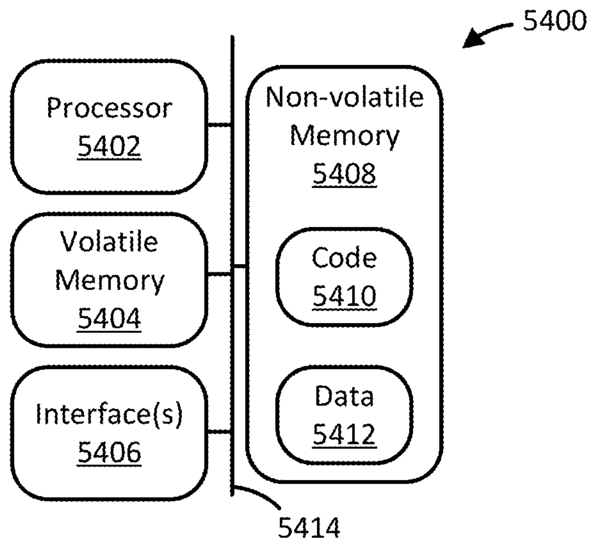
FIG. 54 is a schematic diagram of a computing device, according to some examples described herein.

Turning now to FIG. 54, a computing device 5400 is illustrated schematically. As shown in FIG. 54, the computing device includes at least one processor 5402, volatile memory 5404, one or more interfaces 5406, non-volatile memory 5408, and an interconnection mechanism 5414. The non-volatile memory 5408 includes code 5410 and at least one data store 5412.

In some examples, the non-volatile (non-transitory) memory 5408 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 5410 stored in the non-volatile memory can include an operating system and one or more applications or programs that are configured to execute under the operating system. Alternatively or additionally, the code 5410 can include specialized firmware and embedded software that is executable without dependence upon a commercially available operating system. Regardless, execution of the code 5410 can result in manipulated data that may be stored in the data store 5412 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 54, the processor 5402 can be one or more programmable processors to execute one or more executable instructions, such as a computer program specified by the code 5410, to control the operations of the computing device 5400. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 5404) and executed by the circuitry. In some examples, the processor 5402 is a digital processor, but the processor 5402 can be analog, digital, or mixed. As such, the processor 5402 can execute the function, operation, or sequence of operations using digital values and/or using analog signals. In some examples, the processor 5402 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 5402 that are multicore can provide functionality for parallel, simultaneous execution of instructions or for parallel, simultaneous execution of one instruction on more than one piece of data.

Continuing with the example of FIG. 54, prior to execution of the code 5410 the processor 5402 can copy the code 5410 from the non-volatile memory 5408 to the volatile memory 5404. In some examples, the volatile memory 5404 includes one or more static or dynamic random access memory (RAM) chips and/or cache memory (e.g. memory disposed on a silicon die of the processor 5402). Volatile memory 5404 can offer a faster response time than a main memory, such as the non-volatile memory 5408.

Through execution of the code 5410, the processor 5402 can control operation of the interfaces 5406. The interfaces 5406 can include network interfaces. These network interfaces can include one or more physical interfaces (e.g., a radio, an ethernet port, a USB port, etc.) and a software stack including drivers and/or other code 5410 that is configured to communicate with the one or more physical interfaces to support one or more LAN, PAN, and/or WAN standard communication protocols. The communication protocols can include, for example, TCP and UDP among others. As such, the network interfaces enable the computing device 5400 to access and communicate with other computing devices via a computer network.

The interfaces 5406 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 5410 that is configured to communicate with the user input and/or output devices. As such, the user interfaces enable the computing device 5400 to interact with users to receive input and/or render output. This rendered output can include, for instance, one or more GUIs including one or more controls configured to display output and/or receive input. The input can specify values to be stored in the data store 5412. The output can indicate values stored in the data store 5412.

Continuing with the example of FIG. 54, the various features of the computing device 5400 described above can communicate with one another via the interconnection mechanism 5414. In some examples, the interconnection mechanism 5414 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising rendering, via a touchscreen, an image captured by a device, the image including at least a portion of a person at a location under surveillance by a system that includes the device. The method further comprises receiving, via the touchscreen, input that associates the image with a profile of a person authorized to be present at the location. The method further comprises applying a setting that defines how the system responds to detection of the person authorized to be present at the location in response to the input.

Example 2 is the method of Example 1, wherein a mode of operation specifies that the system will suppress an event upon detecting the person authorized to be present at the location.

Example 3 is the method of Example 2, wherein suppressing the event comprises withholding notification of the event to a monitor interface that forms part of the system.

Example 4 is the method of Example 1, further comprising (a) receiving, via the touchscreen, input indicative of a selection of the image captured by the device; and (b) rendering, via the touchscreen, an identifier of the person authorized to be present at the location and an icon configured to receive the input that associates the image with the profile of the person authorized to be present at the location.

Example 5 is the method of Example 1, further comprising (a) rendering, via the touchscreen, a first control configured to receive a selection of the profile of the person authorized to be present at the location; and (b) rendering, via the touchscreen, a second control configured to receive a command to create a new profile.

Example 6 is the method of Example 1, further comprising (a) rendering, via the touchscreen, a control configured to initiate creation of the profile; and (b) rendering, via the touchscreen, a plurality of face clip controls, each of which represents one or more previously-captured images of people observed to be present at the location; wherein the input that associates the image with the profile includes a selection of one or more of the face clip controls.

Example 7 is the method of Example 1, further comprising rendering, via the touchscreen, a save profile screen that includes: (a) a first control configured to receive an identifier of the person authorized to be present at the location; (b) a listing of one or more images associated with the profile, the listing including the image captured by the device; and (c) a second control configured to receive the input that associates the image with the profile.

Example 8 is a method comprising rendering, via a touchscreen, a first graphical user interface comprising an alarm sensitivity control for a system that provides surveillance at a location, the alarm sensitivity control configured to receive a selection of a mode that defines a current operating mode of the system. The method further comprises rendering, via the touchscreen, a second graphical user interface comprising a status control group for the system, wherein the status control group lists a plurality of components of the system including a camera, and for individual components, a monitoring status based on the current operating mode of the system. The method further comprises receiving, via the touchscreen, the selection of the mode that defines the current operating mode of the system to disable or enable an operation of the camera. The method further comprises applying the selection to cause the system to operate in the current operating mode.

Example 9 is the method of Example 8, wherein (a) the first graphical user interface further comprises a location selection control; (b) the method further comprises receiving, via the touchscreen, a location selection of the location via the location selection control; and (c) applying the selection of the mode causes components of the system at the location to operate in the current operating mode without affecting operation of components of the system that are not at the location.

Example 10 is the method of Example 8, further comprising (a) receiving, via the touchscreen, selection of a view-all control that is included in the second graphical user interface; and (b) rendering, via the touchscreen, a status interface that lists the monitoring status for at least one of the components for each of a plurality of operating modes.

Example 11 is the method of Example 10, wherein the plurality of operating modes includes the current operating mode.

Example 12 is the method of Example 8, wherein the alarm sensitivity control includes (a) a first sensitivity control associated with a home operating mode in which the camera is disabled; and (b) a second sensitivity control associated with an away operating mode in which the camera is enabled.

Example 13 is the method of Example 8, wherein (a) the first graphical user interface includes an expansion control; and (b) the second graphical user interface is rendered in response to selection of the expansion control.

Example 14 is the method of Example 8, further comprising, after receiving the selection of the mode that defines the current operating mode of the system, updating the monitoring status of at least one of the components in the second graphical user interface.

Example 15 is a method comprising rendering, via a display, a graphical user interface including (a) a location control that is representative of a surveilled location that is monitored by a system, wherein the system includes a camera at the surveilled location and a monitor interface capable of receiving content acquired by the camera, and (b) a camera status indicator that provides monitoring status information that is representative of a setting that determines when the content acquired by the camera is available for playback by the monitor interface. The method further comprises receiving, via the display, a command to modify the setting. The method further comprises applying the command to modify the setting that determines when the content acquired by the camera is available for playback by the monitor interface.

Example 16 is the method of Example 15, further comprising rendering, via the display, the content captured by the camera at the surveilled location, wherein the monitoring status information indicates whether the content is available for playback by the monitor interface.

Example 17 is the method of Example 15, wherein (a) the location control includes an image captured by the camera; and (b) the monitoring status information indicates whether the monitor interface has displayed the image captured by the camera.

Example 18 is the method of Example 15, wherein rendering the camera status indicator comprises displaying a schedule of when the content acquired by the camera is available for playback by the monitor interface.

Example 19 is the method of Example 15, wherein (a) the graphical user interface comprises a plurality of location controls for a corresponding plurality of surveilled locations monitored by the system; and (b) each of the plurality of location controls has a corresponding camera status indicator that provides monitoring status information for content collected at the corresponding surveilled location.

Example 20 is the method of Example 15, wherein (a) the graphical user interface further comprises a data privacy preferences control group configured to receive the command to modify the setting that determines when the content acquired by the camera is available for playback by the monitor interface; and (b) the command specifies a level of service to be provided by the monitor interface with respect to the surveilled location.

Use of ordinal terms such as “first”, “second”, “third”, etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of “including”, “comprising”, “having”, “containing”, “involving”, and variations thereof is meant to encompass the items listed thereafter and equivalents thereof as well as additional items. References to “or” can be construed as inclusive so that any terms described using “or” can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:

rendering, via a touchscreen, an image captured by a device, the image including at least a portion of an observed person at a location under surveillance by a system that includes the device;

rendering, via the touchscreen, a plurality of profile images, individual profile images of the plurality of profile images representing a previously defined profile of one of a plurality of recognized people authorized to be present at the location;

receiving, via the touchscreen, input that associates the image captured by the device with a selected one of the previously defined profiles, the selected profile defined for a particular one of the plurality of recognized people authorized to be present at the location;

applying, in response to the input, a setting that defines how the system responds to detection of one of the plurality of recognized people authorized to be present at the location, wherein the setting specifies that the system will withhold remote notification of the detection to a remote monitoring interface that forms part of the system; and rendering, via the touchscreen, a save profile screen that includes:

a first control configured to receive an identifier of the particular one of the plurality of recognized people authorized to be present at the location;

a listing of one or more images associated with the selected profile, the listing including the image captured by the device; and a second control configured to receive the input that associates the image captured by the device with the selected profile.

2. The method of claim 1, further comprising:

receiving, via the touchscreen, input indicative of a selection of the image captured by the device; and rendering, via the touchscreen, the identifier of the particular one of the plurality of recognized people authorized to be present at the location and an icon configured to receive the input that associates the image with the selected profile.

3. The method of claim 1, further comprising:

rendering, via the touchscreen, a first control configured to receive a selection of the selected profile; and rendering, via the touchscreen, a second control configured to receive a command to create a new profile.

4. The method of claim 1, further comprising:

rendering, via the touchscreen, a plurality of face clip controls, each of which represents one or more previously-captured images of people observed to be present at the location;

wherein the input that associates the image captured by the device with the selected profile includes a selection of one or more of the face clip controls.

5. The method of claim 1, further comprising, before receiving the input, rendering, via the touchscreen, data that identifies the profile of the particular one of the plurality of recognized people authorized to be present at the location.

6. A computing system comprising a memory and at least one processor coupled with the memory, the at least one processor configured to:

render, via a touchscreen, an image captured by a device, the image including at least a portion of an observed person at a location under surveillance by a system that includes the device;

render, via the touchscreen, a plurality of profile images, individual profile images of the plurality of profile images representing a previously defined profile of one of a plurality of recognized people authorized to be present at the location;

receive, via the touchscreen, input that associates the image captured by the device with a selected one of the previously defined profiles, the selected profile defined for a particular one of the plurality of recognized people authorized to be present at the location;

apply, in response to the input, a setting that defines how the system responds to detection of one of the plurality of recognized people authorized to be present at the location, wherein the setting specifies that the system will withhold remote notification of the detection to a remote monitoring interface that forms part of the system; and render, via the touchscreen, a save profile screen that includes:

a first control configured to receive an identifier of the particular one of the plurality of recognized people authorized to be present at the location;

a listing of one or more images associated with the selected profile, the listing including the image captured by the device; and a second control configured to receive the input that associates the image captured by the device with the selected profile.

7. The computing system of claim 6, wherein the at least one processor is further configured to:

receive, via the touchscreen, input indicative of a selection of the image captured by the device; and render, via the touchscreen, the identifier of the particular one of the plurality of recognized people authorized to be present at the location and an icon configured to receive the input that associates the image with the selected profile.

8. The computing system of claim 6, wherein the at least one processor is further configured to:

render, via the touchscreen, a first control configured to receive a selection of the selected profile; and render, via the touchscreen, a second control configured to receive a command to create a new profile.

9. The computing system of claim 6, wherein the at least one processor is further configured to:

render, via the touchscreen, a plurality of face clip controls, each of which represents one or more previously-captured images of people observed to be present at the location;

wherein the input that associates the image captured by the device with the selected profile includes a selection of one or more of the face clip controls.

10. The computing system of claim 6, wherein the at least one processor is further configured to, before receiving the input, render, via the touchscreen, data that identifies the profile of the particular one of the plurality of recognized people authorized to be present at the location.

11. One or more non-transitory computer readable media storing sequences of instructions executable by at least one processor to:

render, via a touchscreen, an image captured by a device, the image including at least a portion of an observed person at a location under surveillance by a system that includes the device;

render, via the touchscreen, a plurality of profile images, individual profile images of the plurality of profile images representing a previously defined profile of one of a plurality of recognized people authorized to be present at the location;

receive, via the touchscreen, input that associates the image captured by the device with a selected one of the previously defined profiles, the selected profile defined for a particular one of the plurality of recognized people authorized to be present at the location;

apply, in response to the input, a setting that defines how the system responds to detection of one of the plurality of recognized people authorized to be present at the location, wherein the setting specifies that the system will withhold remote notification of the detection to a remote monitoring interface that forms part of the system; and render, via the touchscreen, a save profile screen that includes:

a first control configured to receive an identifier of the particular one of the plurality of recognized people authorized to be present at the location;

a listing of one or more images associated with the selected profile, the listing including the image captured by the device; and a second control configured to receive the input that associates the image captured by the device with the selected profile.

12. The one or more non-transitory computer readable media of claim 11, wherein the sequences of instructions are further executable by the at least one processor to:

render, via the touchscreen, a first control configured to receive a selection of the selected profile; and render, via the touchscreen, a second control configured to receive a command to create a new profile.

13. The one or more non-transitory computer readable media of claim 11, wherein the sequences of instructions are further executable by the at least one processor to:

receive, via the touchscreen, input indicative of a selection of the image captured by the device; and render, via the touchscreen, the identifier of the particular one of the plurality of recognized people authorized to be present at the location and an icon configured to receive the input that associates the image with the selected profile.

14. The one or more non-transitory computer readable media of claim 11, wherein the sequences of instructions are further executable by the at least one processor to, before receiving the input, render, via the touchscreen, data that identifies the profile of the particular one of the plurality of recognized people authorized to be present at the location.

15. The one or more non-transitory computer readable media of claim 11, wherein:

the sequences of instructions are further executable by the at least one processor to render, via the touchscreen, a plurality of face clip controls, each of which represents one or more previously-captured images of people observed to be present at the location; and the input that associates the image captured by the device with the selected profile includes a selection of one or more of the face clip controls.

* * * * *